United States Patent [19]

Bell et al.

[11] Patent Number: 5,442,146

[45] Date of Patent: Aug. 15, 1995

[54] COUNTING SCALE AND LOAD CELL ASSEMBLY THEREFOR

[75] Inventors: David Bell, Santa Rosa; Robert G. Allard, Healdsburg; Ronald A. Rodgers, Sebastopol; Victor E. Hipkiss, Sonoma, all of Calif.; Thomas H. Johnson, Winnebago, Minn.

[73] Assignee: Weigh-Tronix, Inc., Fairmount, Minn.

[21] Appl. No.: 64,551

[22] Filed: May 19, 1993

Related U.S. Application Data

[63] Continuation-in-part of Ser. No. 863,162, Apr. 3, 1992, Pat. No. 5,313,023, and a continuation-in-part of Ser. No. 862,827, Apr. 3, 1992, Pat. No. 5,336,854.

[51] Int. Cl.[6] ............................................. G01G 3/14
[52] U.S. Cl. ......................... 177/210 FP; 73/862.59; 310/321
[58] Field of Search .............. 177/210 FP; 73/862.59; 310/321

[56] References Cited

U.S. PATENT DOCUMENTS

| | | |
|---|---|---|
| D. 256,342 | 8/1980 | Gard . |
| D. 256,343 | 8/1980 | Gard . |
| D. 275,558 | 9/1984 | Pearson . |
| 3,140,450 | 7/1964 | Tavis . |
| 3,161,046 | 12/1964 | Farley . |
| 3,238,789 | 3/1966 | Erdley . |
| 3,269,192 | 8/1966 | Southworth, Jr. et al. . |
| 3,274,828 | 9/1966 | Pulvari . |
| 3,332,506 | 7/1967 | Bradfield . |
| 3,366,191 | 1/1968 | Reid et al. . |
| 3,399,572 | 9/1968 | Riordan et al. . |
| 3,404,744 | 10/1968 | Williams . |
| 3,413,859 | 12/1968 | Riordan . |
| 3,434,090 | 3/1969 | Chelner . |
| 3,440,888 | 4/1969 | Southworth, Jr. et al. . |
| 3,465,597 | 9/1969 | Riordan et al. . |
| 3,470,400 | 9/1969 | Weisbord . |
| 3,479,536 | 11/1969 | Norris . |
| 3,486,383 | 12/1969 | Riordan . |
| 3,505,866 | 4/1970 | Weisbord et al. . |
| 3,513,356 | 5/1970 | Newell . |
| 3,529,470 | 9/1970 | Agar . |
| 3,541,849 | 11/1970 | Corbett . |
| 3,552,511 | 1/1971 | Marcheso et al. . |
| 3,557,891 | 1/1971 | Klopfenstein . |
| 3,604,525 | 9/1971 | Blethen et al. . |
| 3,621,713 | 11/1971 | Wirth et al. . |
| 3,684,875 | 8/1972 | Smith et al. . |
| 3,685,604 | 8/1972 | Smith et al. . |
| 3,712,395 | 1/1973 | Streater et al. . |

(List continued on next page.)

FOREIGN PATENT DOCUMENTS 0016238  3/1979  European Pat. Off. .

(List continued on next page.)

OTHER PUBLICATIONS

Copy of International Search Report for International Application No. PCT/US92/08563.

(List continued on next page.)

Primary Examiner—Benjamin R. Fuller
Assistant Examiner—Randy W. Gibson
Attorney, Agent, or Firm—Merchant, Gould, Smith, Edell, Welter & Schmidt

[57] ABSTRACT

The invention is directed to a counting scale which implements a load cell assembly for the measurement of weight used in counting calculations. A load cell in such an assembly has a beam structure with beams positioned parallel to each other in at least one plane. Generally, these parallel beams are attached to a stationary base and have sensing means attached between the two beams and the base. These sensing means are preferably resonators which have resonant frequencies that vary in response to an applied force on the load cell. A controller is included in the assembly to drive these resonators, convert their frequency outputs to digital values, and correct for various environmental effects, to obtain an accurate weight measurement for use in the counting scale.

35 Claims, 40 Drawing Sheets

U.S. PATENT DOCUMENTS

| | | |
|---|---|---|
| 3,716,706 | 2/1973 | Gray . |
| 3,724,572 | 4/1973 | Saner . |
| 3,742,418 | 6/1973 | Randolph, Jr. . |
| 3,786,884 | 1/1974 | Allenspach . |
| 3,788,410 | 1/1974 | Allenspach et al. . |
| 3,789,937 | 2/1974 | Strobel et al. . |
| 3,826,931 | 7/1974 | Hammond . |
| 3,863,497 | 2/1975 | Van de Vaart . |
| 3,869,004 | 3/1975 | Gallo . |
| 3,885,427 | 5/1975 | Melcher et al. . |
| 3,897,681 | 8/1975 | Meier . |
| 3,902,374 | 9/1975 | Hoffman et al. . |
| 3,915,248 | 10/1975 | Paelian . |
| 3,951,221 | 4/1976 | Rock . |
| 3,963,082 | 6/1976 | Meier . |
| 3,969,640 | 7/1976 | Staudte . |
| 3,991,840 | 11/1976 | Rawcliffe . |
| 3,998,104 | 12/1976 | Albert . |
| 4,009,608 | 3/1977 | Ormond . |
| 4,014,397 | 3/1977 | Langevin . |
| 4,020,686 | 5/1977 | Brendel . |
| 4,026,158 | 5/1977 | Albert et al. . |
| 4,039,969 | 8/1977 | Martin . |
| 4,041,289 | 8/1977 | Brosh et al. . |
| 4,043,190 | 8/1977 | Gallo . |
| 4,064,744 | 12/1977 | Kistler . |
| 4,075,887 | 2/1978 | Gallo . |
| 4,088,014 | 5/1978 | Wirth et al. . |
| 4,089,058 | 5/1978 | Murdock . |
| 4,089,217 | 5/1978 | Rahav et al. . |
| 4,104,920 | 8/1978 | Albert et al. . |
| 4,107,985 | 8/1978 | Sommer . |
| 4,109,534 | 8/1978 | Albert . |
| 4,139,070 | 2/1979 | Hanson et al. . |
| 4,143,727 | 3/1979 | Jacobson . |
| 4,144,747 | 3/1979 | Datwyler, Jr. . |
| 4,167,686 | 9/1979 | Fukuyo . |
| 4,170,270 | 10/1979 | Sette et al. . |
| 4,179,004 | 12/1979 | Ebbinge . |
| 4,181,011 | 1/1980 | Brendel . |
| 4,196,784 | 4/1980 | Suzuki et al. . |
| 4,215,570 | 8/1980 | EerNisse . |
| 4,219,089 | 8/1980 | Gard et al. . |
| 4,221,131 | 9/1980 | Albert . |
| 4,237,988 | 12/1980 | Blawert et al. . |
| 4,239,088 | 12/1980 | Check et al. . |
| 4,262,193 | 4/1981 | Ozawa . |
| 4,297,872 | 11/1981 | Ikeda et al. . |
| 4,299,122 | 11/1981 | Ueda et al. . |
| 4,300,648 | 11/1981 | Gallo et al. . |
| 4,321,500 | 3/1982 | Paros et al. . |
| 4,338,825 | 7/1982 | Amlani et al. . |
| 4,350,918 | 9/1982 | Sato . |
| 4,362,961 | 12/1982 | Gerber . |
| 4,372,173 | 2/1983 | EerNisse et al. . |
| 4,375,243 | 3/1983 | Doll . |
| 4,377,765 | 3/1983 | Kogure et al. . |
| 4,384,495 | 5/1983 | Paros . |
| 4,386,535 | 6/1983 | Albert . |
| 4,406,966 | 9/1983 | Paros . |
| 4,415,827 | 11/1983 | Chuang . |
| 4,429,248 | 1/1984 | Chuang . |
| 4,430,894 | 2/1984 | Albert et al. . |
| 4,435,666 | 3/1984 | Fukui et al. . |
| 4,445,065 | 4/1984 | Albert . |
| 4,446,394 | 5/1984 | Albert . |
| 4,447,853 | 5/1984 | Tomuro et al. . |
| 4,448,546 | 5/1984 | Paros . |
| 4,454,770 | 6/1984 | Kistler . |
| 4,459,042 | 7/1984 | Paros . |
| 4,467,651 | 8/1984 | Peters et al. . |
| 4,469,979 | 9/1984 | Chuang . |
| 4,479,385 | 10/1984 | Koehler . |
| 4,479,391 | 10/1984 | Banik et al. . |
| 4,493,384 | 1/1985 | Yano et al. . |
| 4,497,386 | 2/1985 | Meier . |

(List continued on next page.)

FOREIGN PATENT DOCUMENTS

| | | |
|---|---|---|
| 0096653 | 12/1983 | European Pat. Off. . |
| 0167055 | 1/1986 | European Pat. Off. . |
| 2660433 | 10/1991 | France . |
| 2335658 | 1/1975 | Germany . |
| 3119806 | 12/1982 | Germany . |
| 3336250 | 4/1984 | Germany . |
| 556621 | 11/1974 | Switzerland . |
| 1322871 | 7/1973 | United Kingdom . |
| 1379670 | 1/1975 | United Kingdom . |
| 2057149 | 3/1981 | United Kingdom . |
| 559136 | 8/1977 | U.S.S.R. . |

OTHER PUBLICATIONS

W. C. Albert et al., "Vibrating Beam Accerelometer for Strapdown Applications", *IEEE 1982 Position Location and Navigation Symposium,* 319–322 (1982).

S. S. Chuang, "Force Sensor Using Double–Ended (List continued on next page.)

U.S. PATENT DOCUMENTS

| | | |
|---|---|---|
| 4,503,922 | 3/1985 | Brosh et al. ............ 177/210 FP X |
| 4,526,247 | 7/1985 | EerNisse et al. . |
| 4,535,638 | 8/1985 | EerNisse et al. . |
| 4,538,461 | 9/1985 | Juptner et al. . |
| 4,544,858 | 10/1985 | Nishiguchi et al. . |
| 4,558,756 | 12/1985 | Seed . |
| 4,587,853 | 5/1986 | Komoto et al. . |
| 4,592,663 | 6/1986 | EerNisse et al. . |
| 4,598,781 | 7/1986 | Tramposch . |
| 4,614,245 | 9/1986 | Yamanaka . |
| 4,623,813 | 11/1986 | Naito et al. . |
| 4,629,016 | 12/1986 | Knothe et al. . |
| 4,656,383 | 4/1987 | Albert . |
| 4,658,174 | 4/1987 | Albert . |
| 4,658,175 | 4/1987 | Albert . |
| 4,669,320 | 6/1987 | Simonsen . |
| 4,685,525 | 8/1987 | Knothe et al. . |
| 4,710,668 | 12/1987 | Fima et al. . |
| 4,718,275 | 1/1988 | Norling . |
| 4,724,351 | 2/1988 | EerNisse et al. . |
| 4,727,752 | 3/1988 | Peters . |
| 4,743,790 | 5/1988 | Albert . |
| 4,750,363 | 6/1988 | Norling . |
| 4,751,849 | 6/1988 | Paros et al. . |
| 4,766,768 | 8/1988 | Norling et al. . |
| 4,782,456 | 11/1988 | Poussier et al. . |
| 4,785,215 | 11/1988 | Blech . |
| 4,804,875 | 2/1989 | Albert ............... 310/323 |
| 4,810,922 | 3/1989 | Hirsch . |
| 4,815,547 | 3/1989 | Dillon et al. ............ 177/25.14 |
| 4,838,369 | 6/1989 | Albert . |
| 4,872,343 | 10/1989 | Peters et al. ............ 73/862.59 X |
| 4,879,914 | 11/1989 | Norling . |
| 4,891,982 | 1/1990 | Norling . |
| 4,912,990 | 4/1990 | Norling . |
| 4,929,860 | 5/1990 | Hulsing, II et al. . |
| 4,947,694 | 8/1990 | Kirman et al. . |
| 4,970,903 | 11/1990 | Hanson . |
| 4,980,598 | 12/1990 | Albert . |
| 5,005,413 | 4/1991 | Novack et al. . |
| 5,036,715 | 8/1991 | Hanson . |
| 5,109,175 | 4/1992 | Albert . |
| 5,113,698 | 5/1992 | Grlj et al. . |

OTHER PUBLICATIONS

Tuning Fork Quartz Crystals", *Proceedings of the 37th Symposium on Frequency Control*, 248–254 (1983).

W. C. Albert, "Forcing Sensing Using Quartz Crystal Flexure Resonators", *Proceedings of the 38th Annual Frequency Control Symposium*, 233–239 (1984).

T. Ueda et al., *Measurement* 3(2):89–94 (1985).

W. J. Kass et al., "Double–Ended Tuning Fork Quartz Accerelometer", *Proceedings of the 40th Annual Frequency Control Symposium*, 230–236 (1986).

L. D. Clayton et al., *IEEE Transactions on Ultrasonics, Ferroelectrics, and Frequency Control* UFFC–34(2):243–252 (1987).

B. L. Norling, *Navigation: Journal of the Institute of Navigation* 34(4):337–353 (1987–88).

W. C. Albert, "A Low Cost Force Sensing Crystal Resonator Applied to Weighing", *Proceedings of the 42nd Annual Frequency Control Symposium*, 78–84 (1988).

E. D. Reedy, Jr. et al., "Finite–Element Analysis of a Quartz Digital Accerelometer", *IEEE Transactions on Ultrasonics Ferroelectrics, and Frequency Control*, 37(5):464–474 (1990).

E. P. EerNisse et al., *Sensors*, 40–42 Aug. (1992).

Micro Crystal Literature, "Quartz Force Transducer Double–Ended Tuning Fork" (Nov. 1986).

Measurements Group, Inc. Literature, "Tech Note TN–507, Wheatstone Bridge Nonlinearity, Errors Due to Wheatstone Bride Nonlinearity" (1982).

Patent Abstrats of Japan, vol. 7, No. 184 (P–216) (1329) 13 Aug. 1983 & JP,A,58 085 127 (Kiyouwa Dengiyou K.K.) 12 May 1983.

Weigh–Tronix, Model 8230 Counting Scale Spec Sheet (1991).

Weigh–Tronix, Model 8250 Counting Scale Spec Sheet (1991).

Weigh–Tronix, Model PC–800 Counting Scale Spec Sheet (1992).

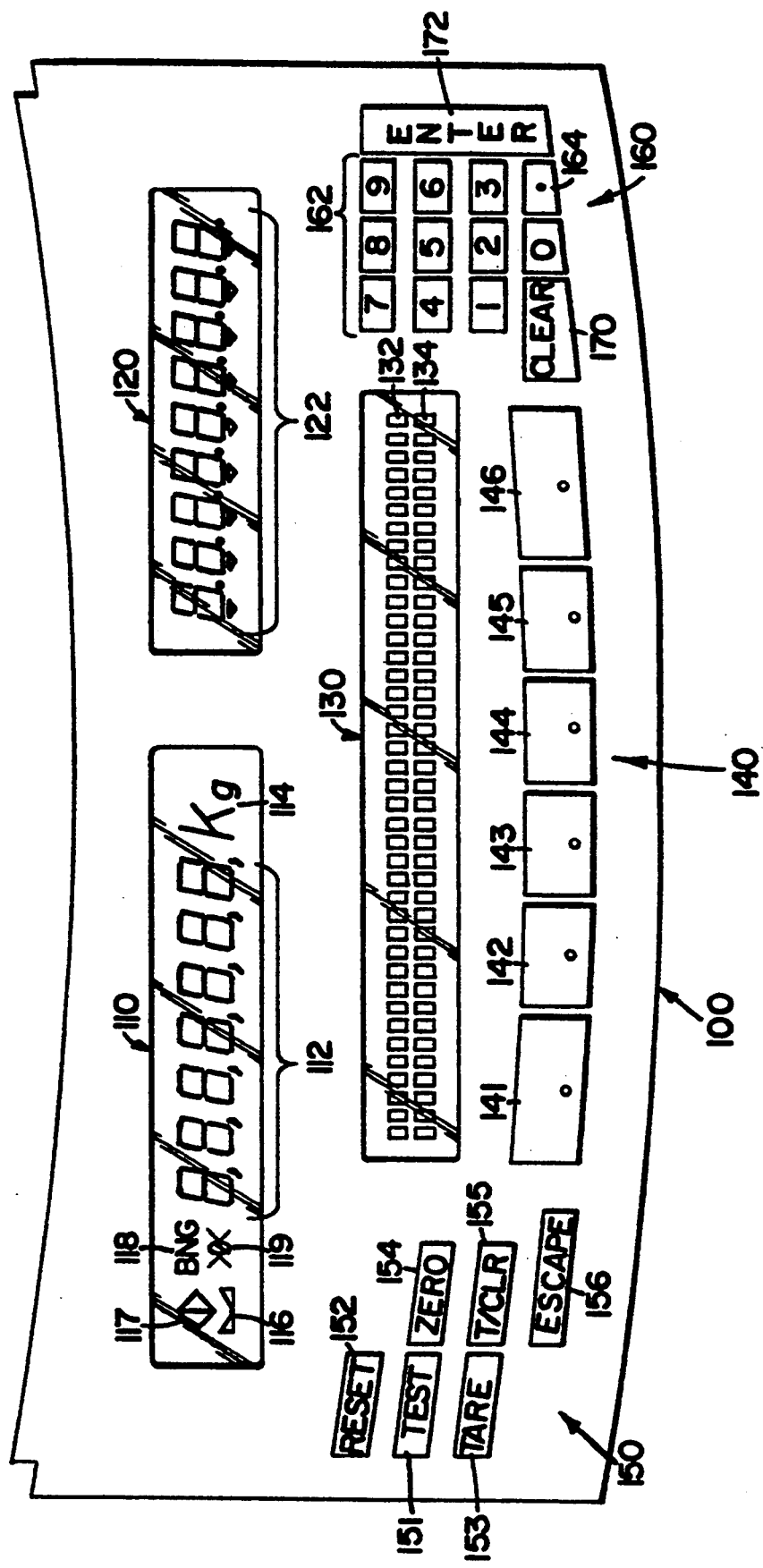

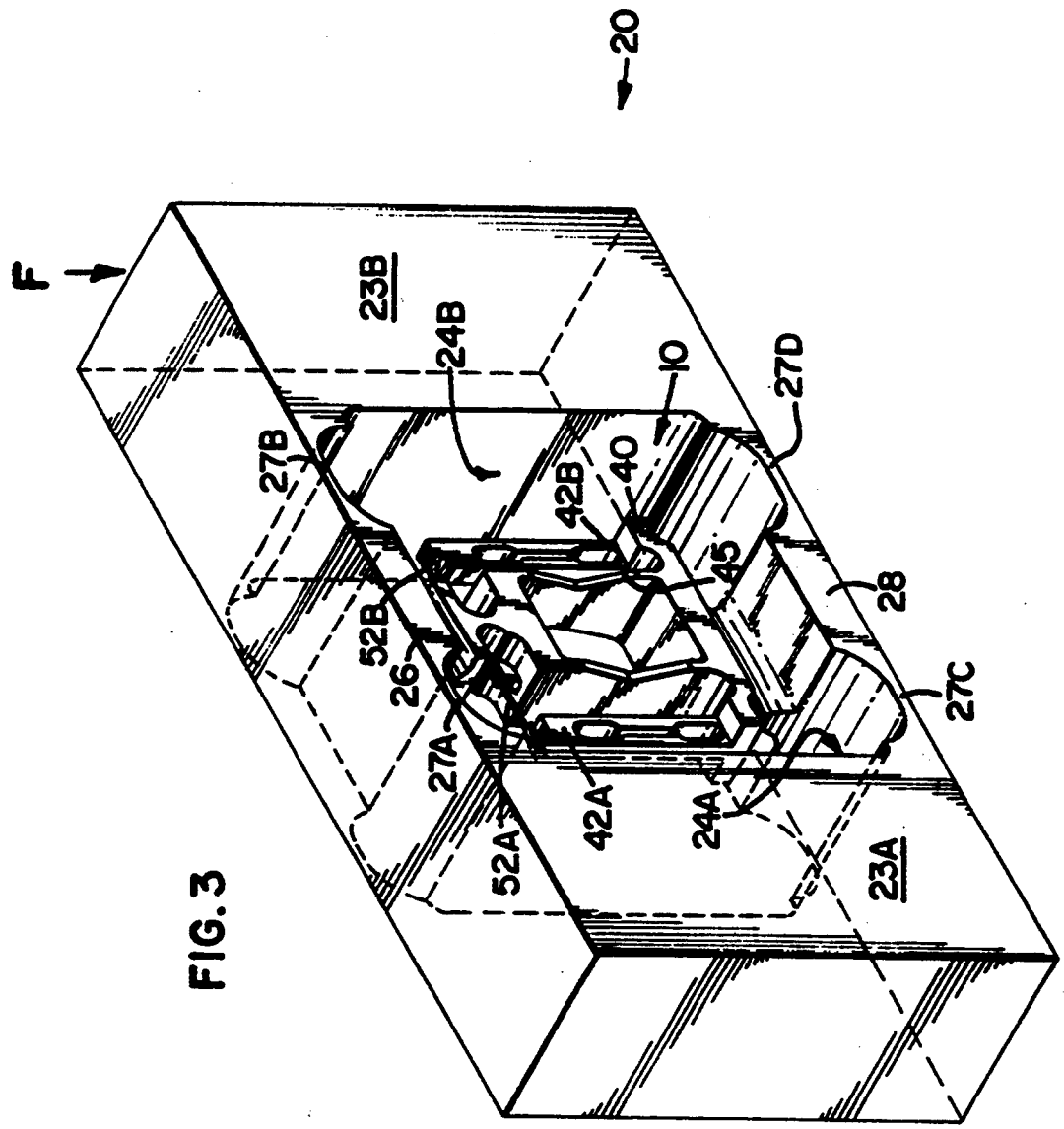

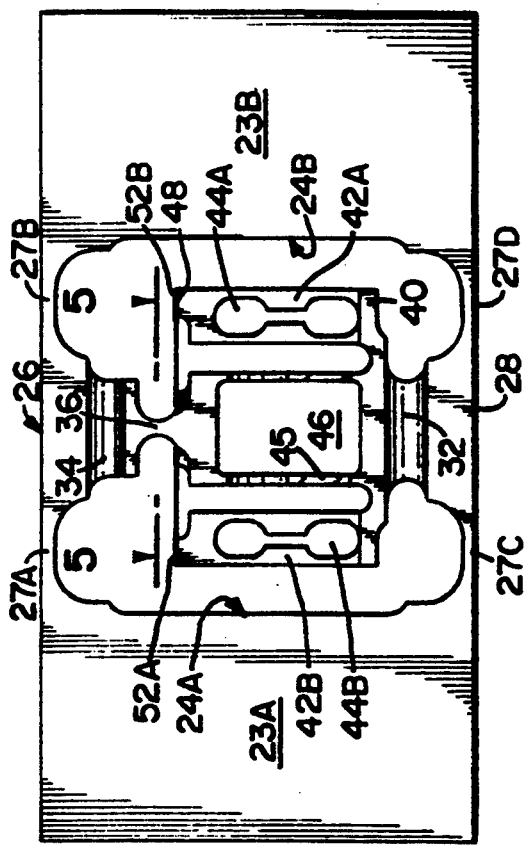
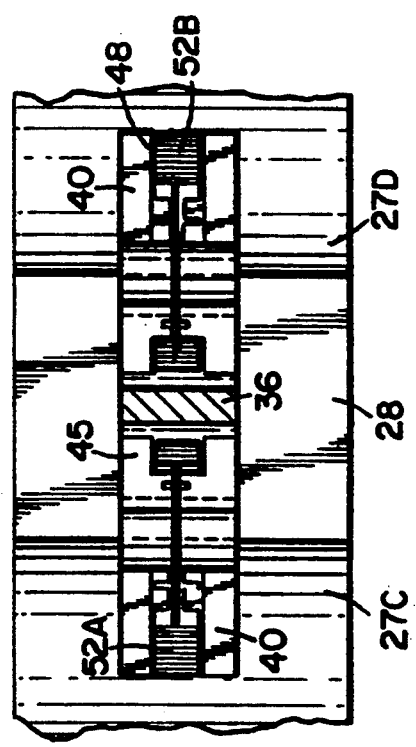
FIG. 4
FIG. 5

COUNTING SCALE AND LOAD CELL ASSEMBLY THEREFOR

The present application is a continuation-in-part application of U.S. patent application Ser. Nos. 07/863,162 and 07/862,827 filed on Apr. 3, 1992, now U.S. Pat. Nos. 5,313,023 and 5,336,854.

FIELD OF THE INVENTION

The invention is directed to counting scales, and in particular is directed to counting scales and load cell assemblies for use therewith. Further, the invention is directed to load cell assemblies which exhibit high resistance to environmental interferences.

BACKGROUND OF THE INVENTION

Counting scales are generally known in the art, and are typically used to determine the number of parts in batches of identical pieces. They are useful in many manufacturing, packaging and other commercial and industrial applications. Such scales can be particularly useful for determining the number of parts in large quantities of relatively small parts such as screws or washers, for example.

Counting scales basically operate by measuring the weight of a quantity of parts, and then computing the number of parts by dividing this measured weight by the weight of each individual part. Generally, the weight of each part, or piece weight, can be determined by a counting scale in a number of ways. For example, the piece weight can be calculated by a sample method, whereby a known quantity of parts are placed on the scale, and the piece weight is calculated by dividing the measured weight of the known quantity by the number of parts placed on the scale. This sample method can be a bulk sample method, where all the sample parts are placed on the scale at the same time, and the piece weight is computed when the scale becomes stable. Alternatively, a dribble sample method may be used, where the sample parts are counted onto the scale (i.e. it is not necessary to place them all on the scale at the same time) then a key on the scale is pressed to initiate the piece weight calculation. In either sample method, if the sample size is too small to meet a minimum desired accuracy, the counting scale will typically prompt an operator to add additional pieces. The piece weight can also be obtained by keying in a known piece weight, or by obtaining the piece weight from a database in which it has been previously stored.

One problem associated with many prior art high resolution counting scales is that they are often not particularly easy to operate. Many have rather cryptic operating systems, and their user interface is often difficult to master and understand. Also, many prior art high resolution counting scales are limited in such areas as expandability or connectivity-to other devices.

A need therefore exists for a counting scale which is easy to operate, and which takes advantage of many of the recent advances in user interfaces. Further, a need exists for a counting scale which is expandable and which is capable of communicating with a number of external devices, to create a "system" approach to counting scales.

Many counting scales seen in the prior art typically use an analog-type weighing device, such as a strain gauge, to measure weights. However, a number of drawbacks exist with these analog-type devices.

First, such analog-type devices are limited in accuracy and precision. Especially when dealing with very small parts, it is necessary to have great accuracy and precision in order to reliably compute the number of parts in a given sample. Strain gauge devices typically are limited to at best an accuracy of one division in six thousand. Also, the higher accuracy strain gauge devices can often take a number of seconds to settle and come to a stable weight reading. It is preferable in many manufacturing environments to obtain reliable counts as quickly as possible so that many batches of parts can be counted.

In addition, strain gauge type devices often require several minutes (as much as 30 minutes) upon initial power-up in order to give reliable and repeatable readings. It is preferred that a counting scale be usable as soon as possible after power-up so an operator does not have to wait long to use the scale.

Stain gauge devices are also sensitive to environmental conditions such as temperature, humidity and age, which may affect modulus, hysteresis, or anelastic material properties of the devices. Such sensitivity to the environment reduces the accuracy of whatever scales such devices are used in and requires counting scales using such devices to be recalibrated from time to time.

Therefore, there exists a need for a counting scale which is capable of accurately and precisely computing the number of pieces in a sample of unknown quantity. Further, a need exists for a counting scale which can count a number of very small parts quickly and accurately, and which has reduced sensitivity to environmental conditions.

It has been found that digital-type force transducers or load cells provide a number of advantages over analog-type strain gauge devices. Often these digital-type weigh devices provide more accuracy and precision, less sensitivity to environmental conditions, and quicker response times.

In the area of force measurement, a number of such load measuring devices and cells are known in the art. For example, Gallo, U.S. Pat. No. 4,043,190, discloses a meter for measuring mass or force wherein the sensed displacement acts indirectly on the tension of the two transversely vibrating electrically excited strings. Sette et al, U.S. Pat. No. 4,170,270, disclose an apparatus for preventing the overload of a load cell used to measure deflection. Blawert et al, U.S. Pat. No. 4,237,988, similarly disclose an overload protection device for precision, scales. Paros, U.S. Pat. No. 4,384,495, discloses a mounting structure for double bar resonators to ensure symmetrical loading of the resonator responsive to external forces. Also, Paros, U.S. Pat. No. 4,751,849 discloses various mounting structures for use with force sensitive resonators.

Further, Streater et al, U.S. Pat. No. 3,712,395, disclose a weight sensing cell which includes two differentially loaded vibrating members. Suzuki et al, U.S. Pat. No. 4,196,784, disclose a weighing scale having an interior load cell. Great Britain Patent No. 1,322,871 discloses a force measuring apparatus having a pretension string which is excited to a state of transverse oscillation by an electronic circuit. Gallo, U.S. Pat. No. 4,300,648, also discloses a meter for sensing mass and force comprising two flat springs lying in a parallel plane. Pulvari, U.S. Pat. No. 3,274,828, discloses a force sensor based on piezoelectric oscillators.

Also, Reid et al, U.S. Pat. No. 3,366,191, disclose a weighing apparatus which relies on a bridge circuit.

Norris, U.S. Pat. No. 3,479,536, discloses a piezoelectric force transducer which is a piezoelectric vibratory beam mounted to receive compressive and tensile forces along its length. Agar, U.S. Pat. No. 3,529,470, discloses a force transducer having a composite strut with two bars which are to be maintained in transverse vibration at a common resonance frequency by electrical feedback wherein the frequency of vibration indicates the force applied to the composite strut. Corbett, U.S. Pat. No. 3,541,849, discloses an oscillating crystal force transducer. Wirth et al, U.S. Pat. No. 3,621,713, disclose an instrument for measuring masses and forces which when stressed by a load shows variation in frequency.

Saner, U.S. Pat. No. 3,724,572, Van de Vaart et al, U.S. Pat. No. 3,853,497, Melcher et al, U.S. Pat. No. 3,885,427, and Paelian, U.S. Pat. No. 3,915,248, all disclose a weighing system which functions by force or weight being transmitted to frequency sensitive elements. Meier, U.S. Pat. No. 3,963,082, Wirth et al, U.S. Pat. No. 4,088,014, Jacobson, U.S. Pat. No. 4,143,727, Ebbinge, U.S. Pat. No. 4,179,004, all disclose force sensing load cell.

Finally, Eer Nisse, U.S. Pat. No. 4,215,570, discloses a miniature quartz resonator force transducer having the shape of a double ended tuning fork. Ueda et al, U.S. Pat. No. 4,299,122, disclose a force transducer based on a vibrator having a pair of plate-shaped vibrating pieces parallel with each other. Paros et al, U.S. Pat. No. 4,321,500, disclose a longitudinal isolation system. Eer Nisse et al, U.S. Pat. No. 4,372,173, disclose a resonator force transducer which includes a pair of elongate generally parallel bars coupled at their ends with a double ended tuning fork arrangement.

Recently, quartz double-ended tuning forks have been used as force sensors in environments where the tension resisted the movement of the loaded structure, or the tension was produced by strain within the loaded structure. Levered systems and parallel guiding structures have been used where the force applied to the force sensing crystal was a fraction of applied load. The force sensing crystal was generally small since the force required to cause adequate frequency change in the resonant double-ended quartz tuning fork did not need to be great.

However, the loaded structure had to be massive to resist effects of undesirable lateral deflection. The flexing portions of these structures which acted as parallel bending beams or bending fulcrums carried some load since the force sensing crystal and its bonded joints deflected when tension was applied to the crystal.

The prior art load cells were dependent on the stability of the loaded structure and the bonding joints, over temperature and time, for output stability. For example, Albert, U.S. Pat. No. 4,838,369 discloses a load cell intended to provide a linear relationship between the signal generated and the force sensed. Albert uses a specific crystal design attached by screws to the frame of the load cell which creates a frictional joint resulting in inadequate zero return and cell precision. Albert relies on a longitudinally rigid structure to resist interferences from varying load positions. The load cell of Albert is designed so that force expended on the load cell, when stressed, results in work or energy loss within the screw joints. In turn, this phenomenon also results in poor zero return and precision.

Without attention to material similarly, non-strain sensitive designs, and reduction or cancellation of creep and hysteresis, Albert cannot provide a load cell which truly negates material and temperature effects.

Generally, material aging in these apparatus often caused long term performance to suffer after calibration. Further, these apparatus were limited in resolution by the degree in which anelastic creep and strain hysteresis were compensated for in their design. The quartz crystal bonding joints would often compensate for creep and hysteresis caused by the loaded structure with their own counteracting creep and hysteresis. When the quartz crystals were bonded using adhesives such as epoxies, stresses were introduced in the glue joints and crystal because of differential expansion between the base and the quartz and epoxy shrinkage during curing.

Further, as these stresses relaxed over time, the characteristics of the bonded joint changed because of the nonlinear stress-strain curve of the adhesive. This caused the load cell to have excessive zero and span shift over time until the glue joint stresses had relaxed. Differential expansion between the quartz and the structural material would cause the force sensor to have an output due to the temperature as well as applied load.

As a result, a need exists for a load cell which can compensate for changes in modulus of elasticity, anelastic creep, and strain hysteresis occurring in the elements of the cell due to stresses created by the environment of application.

Greater resistance to environmental conditions, and a resulting greater accuracy and precision, can be obtained by digitally processing the frequency outputs of a digital-type load cell. In the context of the present invention, a load cell or other digital-type force transducer, coupled with an associated driving and digital processing controller, comprises a "load cell assembly". The performance of such a unit may be enhanced by a suitable controller which can reject many environmental effects, and/or result in greater precision and accuracy.

In the area of frequency-to-digital conversion, for example, Check et al., U.S. Pat. No. 4,239,088, discloses a frequency-to-period converter which uses a frequency signal to gate a latch, which stores the output of a high-frequency counter. This enables the period of the load cell output to be calculated within one or two oscillations of the output. However, the counter shown in Check et al. must be reset after each period measurement. This reset may be time-limiting and may be unsuitable for very high frequencies. Also, by measuring the period of one or two output oscillations, the precision that may be obtained is also limited, and transient responses may widely vary until the output signal has stabilized.

Further performance improvements can be provided by linearization and temperature correction algorithms, which attempt to reject common-mode errors due to temperature and other effects. For example, Paros et al., U.S. Pat. No. 4,751,849, discloses a linearization routine for scaling the outputs of two sensing means in order to provide more accurate rejection of common-mode effects. Also, Eer Nisse et al., U.S. Pat. No. 4,535,638, discloses a routine for computing force and temperature using a single crystal oscillated at two separate frequencies.

Therefore, a need exists for a force transducer unit having a high resistance to environmental effects. Further, there exists a need for a controller for use in such a force transducer unit which provides further resistance to environmental effects beyond the mechanical characteristics exhibited by the load cell.

SUMMARY OF THE INVENTION

The present invention addresses these and other problems in the prior art by providing a load cell assembly which provides output signals having a substantially linear response which is substantially unaffected by environmental effects. Further, the invention provides a counting scale incorporating such a load cell assembly which is capable of providing highly accurate part counts therefrom.

In accordance with one aspect of the invention, there is provided a load cell assembly which includes a load cell capable of being subjected to an implied force, first and second transducers operatively mounted thereon and having a resonant frequency that varies with the applied force, means for driving the first and second transducers at their resonant frequencies, respectively, for providing first and second frequency signals, and means for providing a force value indicative of the applied force on the load cell. Further, this force value providing means includes converting means operatively connected to receive the first and second frequency signals for converting the first and second frequency signals to first and second values, respectively, means operatively connected to receive the first and second values for linearizing and rejecting common-mode effects therefrom to provide a linearized difference value, and means operatively connected to receive the linearized difference value for rejecting temperature effects therefrom to provide the force value.

In accordance with a further aspect of the invention, there is provided a load cell assembly which includes a load cell body having an interior opening defined by an upper wall and a lower wall joined by first and second side walls, a base positioned within the opening and affixed to at least one of the opening walls, a first cantilever beam affixed to the base, a second cantilever beam affixed to the base, a first transducer comprising two parallel tines joined together at their ends which is affixed between the first cantilever beam and the base, a second transducer comprising two parallel tines joined together at their ends which is affixed between the second cantilever beam and the base, and a load cell controller operatively connected to drive the first and second transducers and provide a force value indicative of an applied force on the load cell.

In accordance with a further aspect of the invention, there is provided a counting scale which includes a supporting member, a force receiving member for receiving an applied force resulting from a plurality of objects to be weighed and counted, and a load cell disposed on the supporting member such that an applied force received by the force receiving member is measurably applied across the load cell. The load cell includes a load cell body having an interior opening defined by an upper wall and a lower wall joined by first and second side walls, a base positioned within the opening and affixed to at least one of the opening walls, a first cantilever beam affixed to the base, a second cantilever beam affixed to the base, a first transducer comprising two parallel tines joined together at their ends which is affixed between the first cantilever beam and the base, and a second transducer comprising two parallel tines joined together at their ends which is affixed between the second cantilever beam and the base. The counting scale further includes load cell controller means operatively connected to the first and second transducers for driving the first and second transducers and for providing a force value indicative of the applied force, and a control system operatively connected to receive the force value from the load cell controller means which includes processing means for providing a count representative of the number of objects being weighed.

Load cell assemblies consistent with the present invention are capable of providing highly accurate weight outputs that are substantially linearized and corrected for temperature and other common-mode environmental effects. These load cell assemblies are further capable of providing preferred counting scales consistent with the invention with such weight outputs to enable such counting scales to provide highly accurate part counts therefrom. Some load cell assemblies constructed consistent with the present invention are preferably capable of obtaining accuracies in the range of at least 1 in 8,000 divisions over a temperature range of $-10°$ to $+40°$ C. In addition, some assemblies are preferably capable of obtaining accuracies of as high as 1 in 10,000 or 25,000 divisions, or higher, over a temperature range of $+10°$ to $+40°$ C., or better.

These and other advantages and features, which characterize the invention are pointed out with particularity in the claims annexed hereto and forming a part hereof. However, for a better understanding of the invention, and the advantages and objectives obtained by its use, reference should be made to the drawings which form a further part hereof and the accompanying descriptive matter, in which there is described a preferred embodiment of the invention.

BRIEF DESCRIPTION OF THE FIGURES

FIG. 2E is a top plan view of the keyboard/display unit of the counting scale depicted in FIG. 2A.

FIG. 3 is a perspective view of a load cell consistent with one preferred embodiment of the invention.

FIG. 4 is a side elevational view of the load cell depicted in FIG. 3.

FIG. 5 is a top cross-sectional view of the load cell shown in FIG. 4 taken along lines 5—5.

FIG. 25b is a flowchart of the INPUT CAPTURE interrupt used in the preferred software configuration of FIG. 25a.

FIG. 26a is a flowchart of the DO COMMAND block shown in FIG. 25a.

FIG. 26b is a flowchart of the COMPUTE WEIGHT block shown in FIG. 25a.

DETAILED DESCRIPTION OF THE PREFERRED EMBODIMENT

Figure 1:
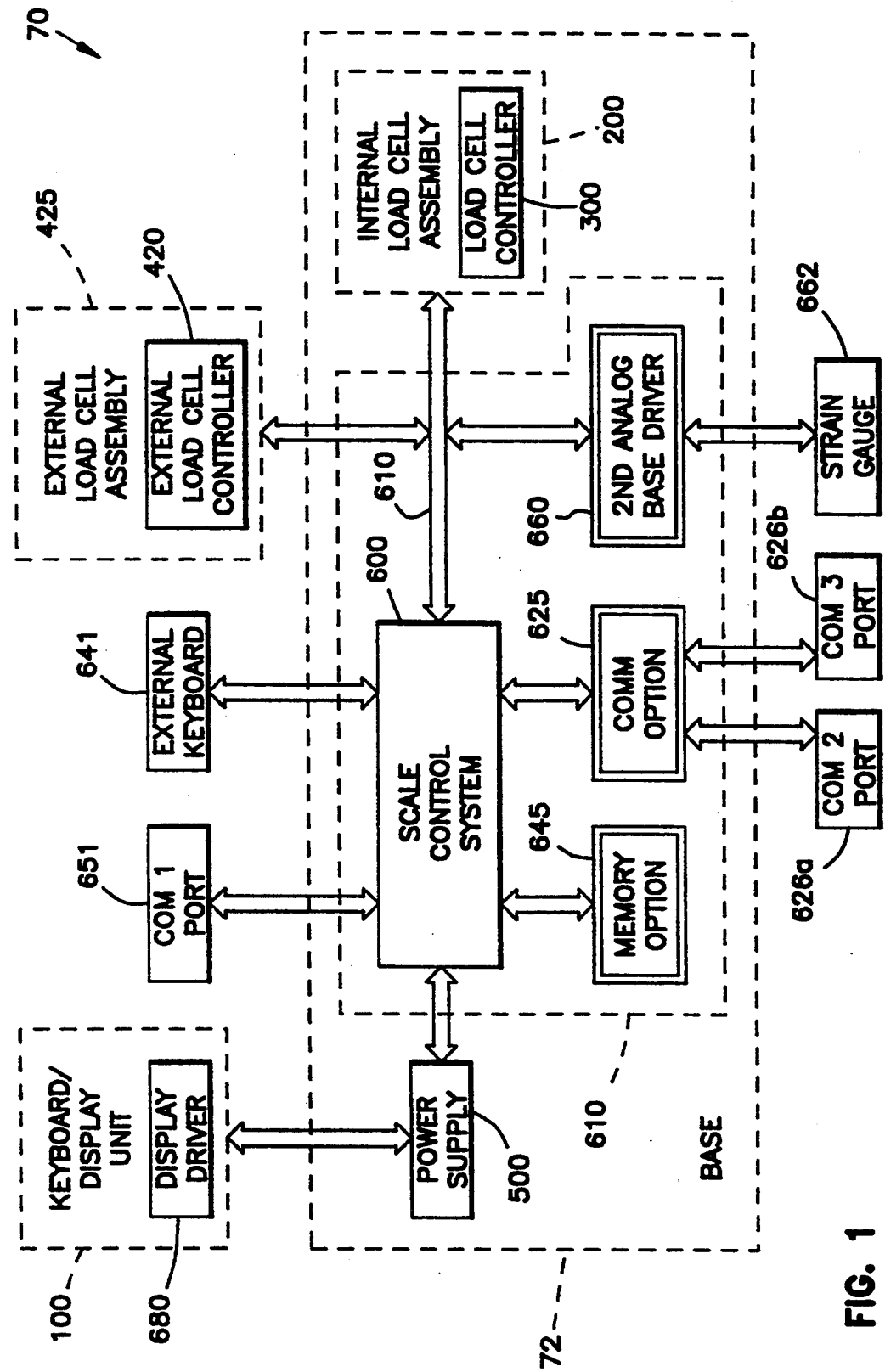
FIG. 1 is a functional block diagram of a counting scale consistent with one preferred embodiment of the invention.

Turning to the Figures wherein like parts are designated with like numerals throughout the several views, there can be seen a counting scale 70 shown in FIG. 1. As can be seen in FIG. 1, scale 70 has a keyboard/display unit 100 which is connected to a base 72.

Base 72 houses the primary control system 600 for scale 70. Further, it houses a power supply 500, as well as an internal load cell assembly 200.

The control system 600 for the scale 70 provides the primary control over the operation of the scale. This control system contains a user interface which allows for data input and control by the user, and also allows for information to be provided to a user. Control system 600 further has routines for computing weights and counts sensed by scale 70, as well as routines for calibrating scale 70. It also has diagnostic capabilities, to enable self tests and to enable scale 70 to be configured for a particular application. In addition, scale control system 600 has the capability for communicating with various external devices such as strain gauge load cells, quartz digital load cells, external keyboards, and serial communications ports (for printers, computer databases, etc.).

As can be seen in FIG. 1, control system 600 is connected to a number of ports which enable scale 70 to communicate with external devices. COM1 port 651 provides the serial communications capability with printers, computer databases, or other devices. Further, an external keyboard 641 may be connected which may be used in lieu of keyboard/display unit 100. This external keyboard 641 can be an IBM ® PC/AT compatible keyboard or the like.

Control system 600 also communicates with various weighing devices over a load cell bus, designated 610. This bus, which will be discussed later, enables control system 600 to communicate with preferably up to 32 different weighing devices. One of such devices is internal load cell assembly 200, which is contained in base 72 of scale 70. This load cell assembly, which will be discussed later, has a load cell 210 (not shown) and a controller circuit 300 which provides the communication with control system 600 over load cell bus 610. This controller 300 also provides the driving circuitry for processing the force measurements made by load cell 210.

As stated before, additional load cell assemblies, such as external load cell assembly 425, having controller 420, may be connected up to load cell bus 610. This would enable additional bases beyond base 72 to be hooked up to the scale.

In addition to control system 600 and load cell assembly 200, base 72 also houses power supply 500. This power supply provides all of the various power supply voltages Which are necessary for the operation of scale 70. These various voltages are provided to scale control system 600, as well as display driver 680 within keyboard/display unit 100. In addition, power supply 500 has the capability of transferring serial data between display driver 680 and control system 600. This enables one single connection to be made to keyboard/display unit 100, rather than having separate power and communications connections from power supply 500 and control system 600, respectively.

Keyboard/display unit 100 provides information to a user through a number of displays, and allows for information to be input by a user through a keyboard. It is driven by display driver 680 which communicates serially with scale control system 600. As will be discussed later, keyboard/display unit 100 is housed separately from base 72.

In addition to the functions above, scale 70 also has a number of optional features, each of which is designated in FIG. 1 by double-lined boxes. There are three options, including a memory option 645, a communications option 625, and a second analog base option 660. While these options are shown separately from control system 600, it is intended that these options are in fact part of control system 600. They are shown separately simply for clarification.

The memory option 645 provides additional program memory, storage memory, and a time/date function. It is preferably configurable so that different combinations can be implemented for different applications.

The communications option 625 provides additional serial communications ports, shown as COM2 port 626a and COM3 port 626b. This enables scale 70 to communicate with additional external serial devices.

Control system 600 also includes a second analog base option 660, which essentially enables non-digital (analog) weighing devices, such as strain gauges, to be connected to load cell bus 610. Thus, any such analog-type devices may be controlled by control system 600 as if they were a digital load cell such as internal load cell assembly 200. The analog base driver 660 has an external connection to enable an external strain gauge 662 to be connected to scale 70.

Control system 600 is preferably configured as a task-driven operating system. Separate tasks are included to control the user interface for scale 70, provide the weight and count processing, and drive the low-level kernel routines, among others. Several interrupt-driven routines and BIOS routines are also preferably provided in control system 600 which, among other functions, provide communication between control system 600 and display driver 680, external keyboard 641, load cell assembly 200, as well as external devices over load cell bus 610 and serial communications ports 651, 626a and 626b.

The user interface task of control system 600 generally enables a user or operator to interface with the counting scale. The user interface enables the scale to be configured in several modes. In a normal mode, the user interface enables a user to essentially operate the counting scale. In a test mode, a technician is able to run several basic tests to ensure that the scale is operating properly. In the calibration mode, a technician can calibrate the counting scale. In the configuration mode, an operator is able to configure the scale, as well as configure its communication with external bases and serial devices. In a metrology mode, a technician is able to perform standard metrology calculations on the performance of the scale. In a service mode, extensive diagnostics may be performed in order to isolate, and possibly correct, problems in the scale.

In the normal mode of operation, which will be described in greater detail later, the various functions necessary for productive use of the counting scale are provided to a user. Separate count and weight displays are activated to provide the current weight and count readings sensed by the scale. In addition, several commonly-used functions are available to the operator. For instance, piece weight can be set from bulk or dribble sampling methods (depending upon the setup), from direct entry by the operator, or from an internal or external database of part numbers and piece weights. A quick piece weight function can also be accessed. In addition, the tare, or the weight offset due to any containers which are placed on the scale, can be set. Also, an accumulative function is provided, which enables running tallies of counts to be made. Weight and count records can also be sent to an external device such as a printer or label printer. Different bases can be selected as well in this mode. Other features available to a user will be described later in greater detail.

Control system 600 also has the ability to communicate with a number of external devices. For instance, multiple external bases can be connected to counting scale 70. Further, these bases can be made up of multiple load cells (which enable heavier items to be weighed, for instance). The communications with these various devices can be controlled by control system 600. Also, external devices such as printers, label printers, or external databases can also be controlled by control system 600. Other communication and configuration capabilities of control system 600 will be discussed later in greater detail. Control system 600, primarily due to memory option 645, can also include any conceivable additional program code, which enables control system 600 to be configured for a particular application, or allows further expandability or improvements. Thus, it can be seen that control system 600 of counting scale 70 provides a powerful, expandable, operating system for counting scale 70. The components and operation of counting scale 70 will now be discussed in greater detail.

I. Mechanical Aspects of Counting Scale

Figure 2A:
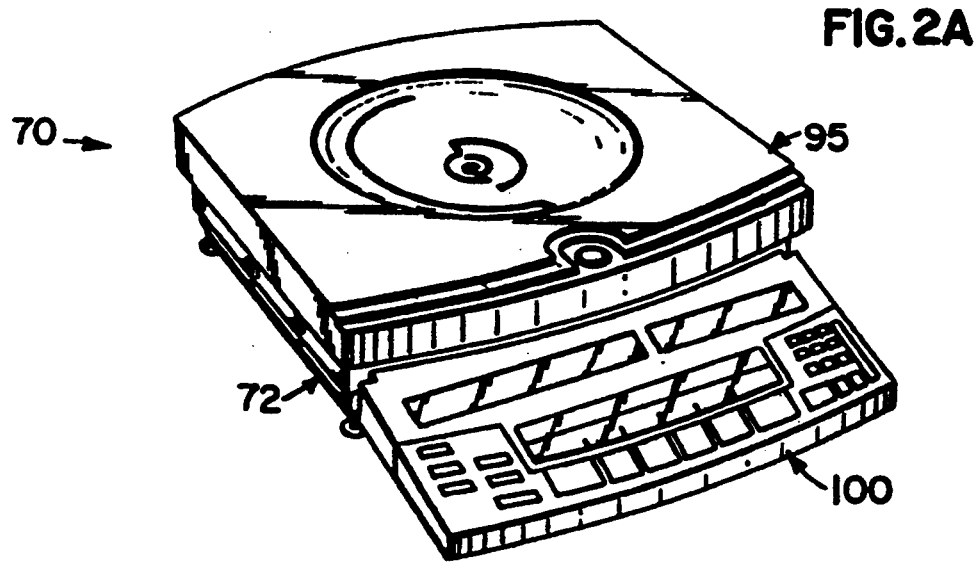
FIG. 2A is a perspective view of the counting scale of FIG. 1, consistent with one preferred embodiment of the invention.

FIG. 2A shows the preferred counting scale 70, having base 72, shroud 95, and keyboard/display unit 100. As can be seen in FIG. 2B, which is a partially-exploded view of a portion of scale 70, base 72 provides a supporting structure to house the weighing apparatus, as well as most of the electronics for the scale. FIG. 2B shows the left half (when viewed from the rear) of base 72. While not shown, the opposite half of base 72 is preferably a mirror image of the half shown in FIG. 2B.

A. Counting Scale Base

Base 72 is preferably cast of a metal such as aluminum. Any other materials such as plastics or composite materials could be used. However, it has been found that a metal base provides a stable and sturdy platform with which to operate the scale.

As shown in FIG. 2B, base 72 has a number of ribs, such as rib 75, formed on both sides of the bottom surface. These ribs increase the structural stiffness of the base and operate to transmit the load that is applied across the scale out to the four corners of the base and through a plurality of legs, such as leg 80, which carry the base 72 on a support surface.

Base 72 houses control system 600 in cavity 79. Base 72 also houses a power supply (not shown) in an opposite cavity from cavity 79. The power supply provides a number of D.C. voltages which are necessary for the operation of various components of the scale.

Back panel 76 of base 72 has a pair of openings, such as opening 73, which depending on the options installed and the communication capabilities desired, contain various connectors, such as connectors 74 on control system 600, for communication with various external devices through the various ports. Front panel 78 of base 72 likewise has a keyboard/display unit connector (not shown), which connects keyboard/display unit 100 to control system 600 through power supply 500.

Base 72 also includes components for leveling the scale on the support surface onto which it is placed. Legs 80 are located at each corner of the bottom surface of the base 72, each of which is individually adjustable and lockable for height. Any of a number of well known height adjustment components can be used for the legs. Preferred legs include rubber bottoms which contact the supporting surface and which are connected to the base through a threaded screw or bolt which screw in or out of the base when turned. In order for a user to check the level of the base, a level bubble is provided in aperture 77 of front panel 78.

Figure 2C:
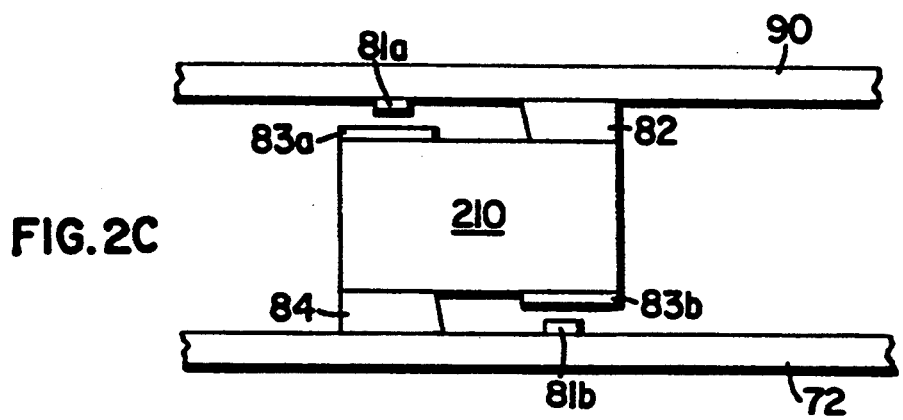
FIG. 2C is a schematic side elevational view of a preferred load cell mounting configuration within the counting scale of FIG. 2A.

Force measurement by the scale is first detected by means of a load cell assembly 200 which is connected between base 72 and a platter 90, as shown in FIG. 2C. This assembly contains load cell 210 and controller 300. Load cell 210 is connected at its bottom surface to the base 72 through a spacer 84. Further, load cell 210 is connected at its top surface to platter 90, through a spacer 82. Both spacers are shock damping materials, such as phenolic, which protect load cell 210 from sudden jarring forces. The spacers are preferably placed at diametrically opposite ends of their respective surfaces in order to allow the necessary measurable stresses across the load cell 210, which will be described in great detail below. An electronic controller 300 is operatively connected to but physically spaced from load cell 210. The controller is, in the preferred embodiment, located in the base 72, and is positioned along side the load cell. The controller can also be physically mounted to the side of the load cell.

Protection of the load cell is provided by a series of overload stops located throughout base 72. As seen in FIG. 2b, corner stops, such as stop 88, are preferably located at each corner of base 72. These stops, which can include bolts or other raised members, are placed at such a level that they will contact platter 90 and prevent its further downward movement past the point of contact. This prevents excessive deformation of load cell 210 due to excessive forces.

Further, as can be seen in FIG. 2C, additional overload stops 81a and 81b may be placed to further protect load cell 210. Each of these stops is preferably a bolt or other protruding member connected respectively to platter 90 and base 72. Further, phenolic strips 83a and 83b are placed on load cell 210 opposite these overload stops. The phenolic strips prevent damage to the body of load cell 210. As configured in FIG. 2C, stops 81a and 81b will prevent load cell 210 from being deformed past the point at which damage to load cell 210 could occur.

Figure 2D:
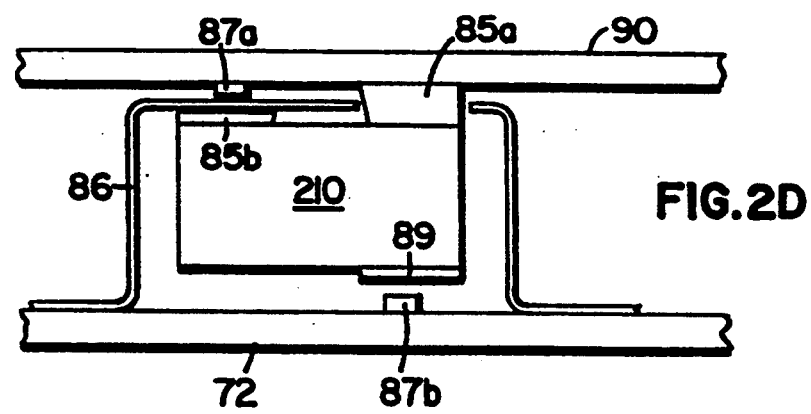
FIG. 2D is a schematic side elevational view of an alternate load cell mounting configuration to that shown in FIG. 2C.
Figure 2B:
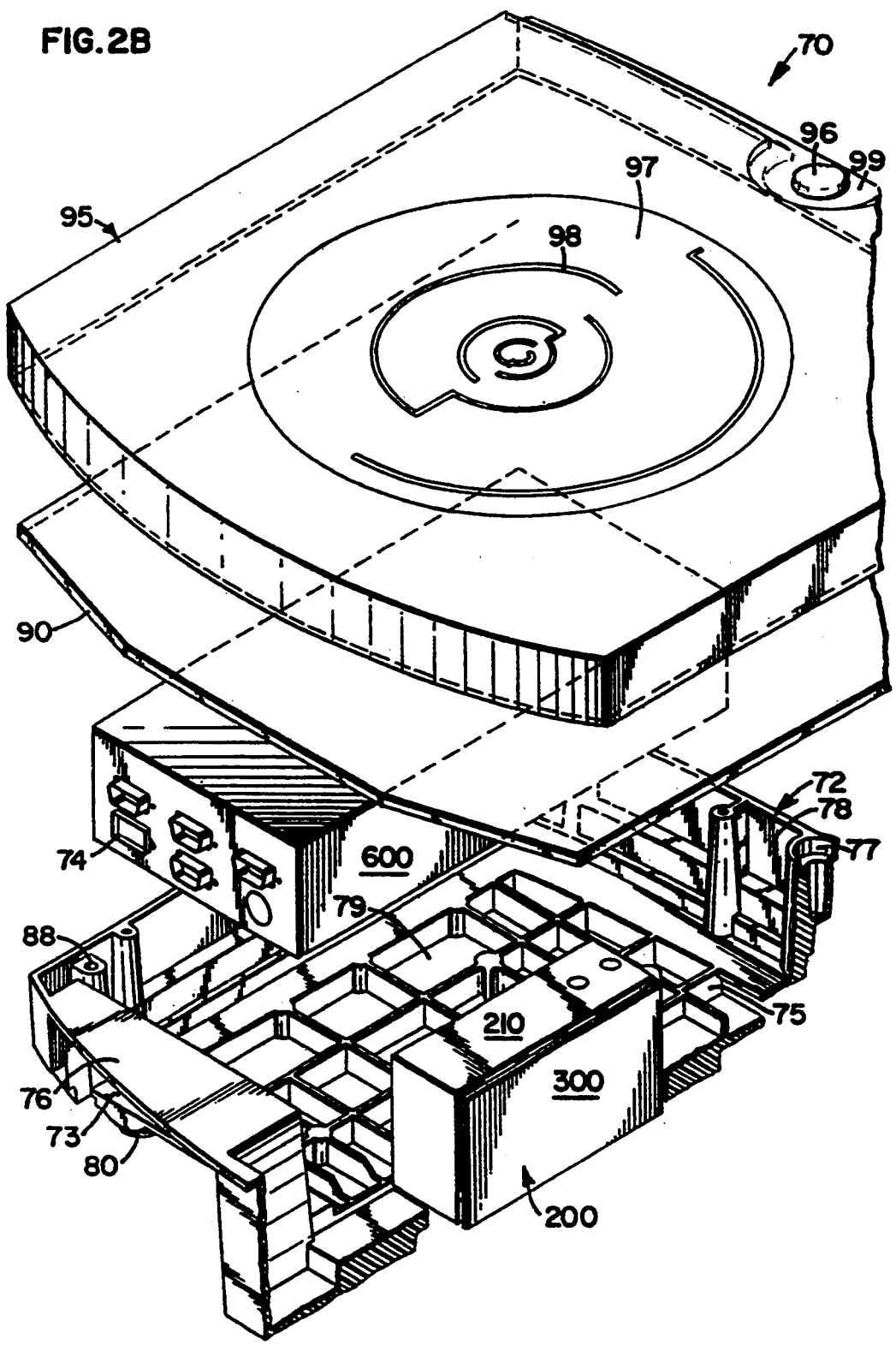
FIG. 2B is a partial exploded perspective view of the counting scale depicted in FIG. 2A.

Any of a number of alternative mounting configurations can be used to mount load cell 210 in counting scale 70. One such alternative mounting configuration is shown in FIG. 2D. In this configuration, load cell 210 is connected to base 72 and platter 90 on its top surface. A phenolic spacer 85a is used to connect load cell to platter 90, and further a phenolic spacer 85b is used to connect load cell 210 to a bracket 86 connected to base 72. As can be seen in the figure, bracket 86 has an aperture defined therein to enable spacer 85a to protrude through the plane of the bracket. Overload protection in this alternative configuration is provided by overload stops 87a and 87b which are placed in similar positions to stops 81a and 81b seen in FIG. 2c. Only one phenolic strip 89 is necessary in this configuration, as stop 87a will abut bracket 86 upon excessive deformation due to excessive forces.

It is believed that this alternative configuration would improve the cornering of load cell 210, as the forces would be transferred more laterally across the load cell. It is believed that this configuration would provide greater accuracy and sensitivity for load cell 210.

Another alternative mounting configuration (not shown) might instead implement an end-mounting system, whereby a load cell would be mounted at each of its end surfaces rather than its top and/or bottom surfaces. It is believed that such a configuration may allow for higher resolutions to be obtained.

Platter 90 is the primary sheet of material through which the forces to be measured will be distributed. Platter 90 is constructed of metal such as aluminum or steel.

Shroud 95 fits atop platter 90, and provides a working surface on which objects may be placed for measurement. Shroud 95 is preferably constructed of a plastic such as CYCOLAC ABS plastic manufactured by G. E. Plastics. Any number of other plastics or other materials may be used to construct the shroud. Shroud 95 has a plurality of molded ribs along its bottom surface (not shown), which conform precisely to the dimensions of platter 90 so that shroud 95 will fit snugly on platter 90 but remain easily detachable therefrom.

Shroud 95 includes a large depressed dish 97 for holding small parts which are to be weighed or counted. Dish 97 preferably has a textured concentric design 98 which provides a focal point for the end user to place the parts to be counted in the center of shroud 95. The textured surface further facilitates the removal of objects from the shroud. Shroud 95 also includes a molded opening 99 along the top surface thereof into which is secured a lens 96. This lens fits precisely over the area in the base at which a bubble level (not shown) is located, so that the lens provides a magnified view of the level bubble. This enables operators to easily determine the level of the base from greater distances away.

B. Keyboard/Display Unit

The layout of keyboard/display unit 100 is shown in FIG. 2E. The displays on the unit include numeric weight and count displays 110 and 120, respectively, and an alphanumeric user interface display 130. The weight and count displays 110 and 120 are preferably vacuum fluorescent displays. Weight display 110 has, in the preferred embodiment, a seven digit display 112 for displaying weight values read by the scale. Display 110 also has a metric/english measurement indicator 114, a "stable" indicator 116, a "tare" indicator 117, a "Gross/Net" indicator 118, and a "center of zero" indicator 119. The count display 120 includes nine display digits 122 for showing count values that are read and computed by the scale.

User interface display 130 contains a 40 column×2 row array of 5×7 dot matrix characters. On the top row of characters 132, the scale's user interface displays messages to an operator. On the bottom row of characters 134, the user interface displays legends for the soft keys, or, during data entry, whatever is being input by the user. Vacuum fluorescent displays provide high contrast and easy to read displays. One skilled in the art will appreciate that other displays such as LED or LCD displays could also be used.

Keyboard/display unit 100 also contains a number of keys including "hard" keys 150, "soft" keys 140, "numeric" keys 160, and "special function" keys 170 and 172. These keys are disposed under a single silicon rubber membrane, in order to provide protection from dirt, spills, and other environmental hazards. One skilled in the art will appreciate that any of a number of exposed individual key layouts could also be used.

The hard keys 150 provide instant access to commonly-used functions on the scale. A test key 151 displays test on the user interface and enters the scale into special modes for testing. A reset key 152 resets the scale by setting the accumulator, ID, tare and piece weight to 0, sets the tare value on remote weighing devices to 0, and selects the main platform (internal load cell assembly 200) as the current weighing device. A zero key 154 generally rezeroes the weight of the current weighing device selected. A tare key 153 acquires the tare, either by entering the current weight of the current weighing device as the tare if the weighing device is at a weight, or by prompting the operator to enter a keyboard tare if the current weighing device is at 0. A tare clear key 155 removes the tare value which is stored for the current operating weighing device. An escape key 156 provides escape from various user functions, by backing up menu levels or aborting numeric entry sequences, for example. All of these hard keys are typically active regardless of the state of the user interface. The user interface will typically execute one of their routines immediately upon depressing a key, and then will return to the previous state when the routine is complete.

The soft keys 140 provide access to all programmable functions and menu selections for the scale. They correspond to the F1 through F6 function keys on a standard IBM PC keyboard, and are respectively indicated in FIG. 2E as 141–146. These keys work in conjunction with user interface display 130. The bottom line 134 of user interface display 130 is configured directly above the soft keys, such that legends for each of the keys are displayed on that line of the user interface display 130. This enables the soft keys 140 to be reprogrammed depending on what state of the user interface the scale is currently operating.

The numeric keys 160 include a ten digit numeric key pad 162 and a decimal point key 164. The key pad 162 and the decimal point key 164 enable data to be entered whenever requested by the scale. Special function key 170 is a "clear" key that is used to clear entries which are made on the keyboard. Special function key 172 is an "enter" key which accepts keyed values after they are entered by an operator.

II. Load Cell Assembly

Load cell assembly 200, as discussed supra, has a mechanical load cell 210 driven by a controller 300. Each of these components will be discussed separately.

A. Load Cell

A force sensing load cell 20 is shown in FIGS. 3, 4 and 5. Such a load cell is described in greater detail in the commonly-assigned co-pending U.S. patent application filed by Thomas H. Johnson and Michael Wyatt on May 19, 1993, the same day that the present application was filed (now U.S. Pat. No. 5,391,844) the disclosure of which is incorporated herein by reference.

The load cell may generally comprise a three-dimensional structure having an opening defined by an upper wall 26 and a lower wall 28, joined by first and second side walls, 24A and 24B, respectively. The first and second side walls 24A and 24B, respectively, are defined by first and second structural members 23A and 23B, respectively. The cell 20 generally comprises a base 40 positioned within the opening 10 and affixed to at least one of the opening walls. Affixed to the base is a first capacity supporting cantilever beam 42A which extends within the plane of said three-dimensional structural opening 10, as well as a second capacity supporting cantilever beam 42B spaced apart from, and parallel to the first capacity supporting cantilever beam 42A. In between the first and second cantilever beams, 42A and 42B, a load beam 45 also is affixed to the base and may span up to the upper wall 26. Two sensors are also affixed to the various beams in this embodiment of the invention. The first sensor is affixed between the first capacity supporting cantilever beam 42A and the load beam 45. The second sensor is affixed between the load beam 45 and the second capacity supporting cantilever beam 42B.

Figure 7:
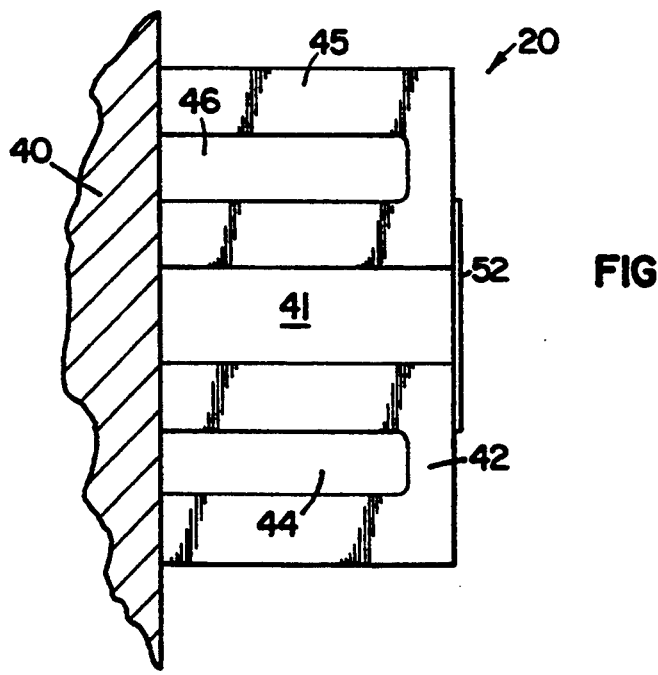
FIG. 7 is a side elevational fragmentary view of a load cell consistent with a further alternative embodiment of the invention.

Turning to the simplest embodiment of the load cell of the invention, FIG. 7 shows a load cell which generally comprises a base 40 which provides stationary positioning of all elements in the invention. The load cell base 40 may, in accordance with certain embodiments of the invention, provide a base for receiving weight, force or other displacement from the load to be sensed. Among other functions, the base may also function as a platen or other surface for receiving the force which is to be analyzed.

Generally, the base 40 may comprise any number of designs and substances as long as a certain flexibility is provided. The base must be capable of deflection so as to transmit forces sensed by the base to the parallel beams 42 and 45 attached within the base. Through this force, the parallel beams ultimately distribute stress and strain to the sensing means suspended between the two parallel beams.

Preferably, the load cell comprises homogenous and isotropic metal. The load cell is defined as a unitary or monolithic structure wherein the base and parallel beam structures are molded as one continuous unit. This may be done through any number of means including machining, milling, ion cutting, casting or any other means known to those of skill in the art. Preferably, the load cell is stress relieved after each milling cycle. Further, in the more preferred embodiments of the invention (FIG. 3), the load cell is preferably machined symmetrically and the spring constants of the beams 42a and 42b matched. To this end, the response of the sensing elements should be matched as closely as possible. Further, the load cell may be further milled and stress relieved by stressing the load cell, gauging the response and relieving excess material from the stressed cell to equalize the response.

Preferred compositions include metals such as, for example, elemental metals and metal alloys. Metal compounds including aluminum and its alloys such as 2024-T3, 7075-T6, and 1100; copper and its alloys including ASTM B147, ASTM B145, and ASTM B146; zinc and its alloys including ASTM A40A, and ASTM AC41A, as well as any other metals that are known to provide a light weight structure having good resilience to the forces intended to be sensed by the cell. Most preferably, metals such as aluminum and its oxides are used in forming the load cell of the invention but almost any structural material which lends itself to manufacturability may be used.

The load cell may also be made from polymer systems which provide uniform material characteristics, that is modulus, temperature sensitivity, expansion characteristics, etc. Plastics such as polyamides, polyamideimides, polyvinyl chloride, polyethylene, propylene, polycarbonates, aminoplasts such as melamine resins, cast epoxy resins, cast epoxy resins, cast acrylics, cast fluoroplastics, phenolics, polyacrylonitriles, cast polyurethanes, cast polyesters or polyolefins; synthetic or natural rubber polymers and copolymers such as silicones; ceramics such as silicon dioxide; and cellulosic products; or mixtures of any of these compounds.

The simplest embodiment of this base 40 can be seen in FIG. 7 as a rigid fixture to which a parallel beams 42 and 45 are attached. In an alternative embodiment, FIG. 6, the base 40 may be seen as a mounting plate for positioning of the load bearing means or load beam 45 and capacity support means 42. To this end, the base assists in positioning load beam 45 and cantilever support beam 42 parallel to each other within at least one plane, FIG. 7.

Figure 6:
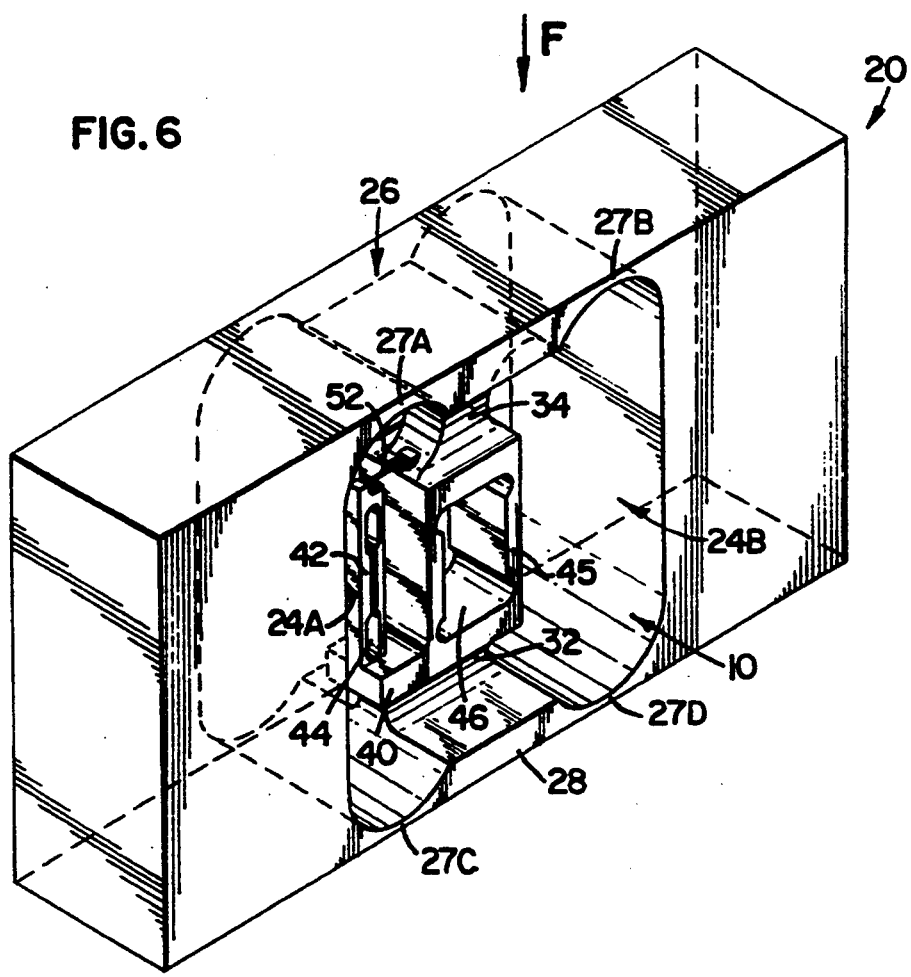
FIG. 6 is a perspective view of a load cell consistent with an alternative embodiment of the invention.

As applied in a load cell, FIG. 6, the base 40 may be used to position cantilever support beam 42 and load beam 45 in the opening 10 of the load cell structure 20. More specifically, the base 40 extends generally and is attached to interior wall 28 which forms the load cell opening 10. While not essential, the load cell base 40 may be attached to interior wall 28, or for that matter any of the other interior walls including side wall 24A, side wall 24B or upper wall 26 through any number of appendages including flexure 32.

Thus, as can be seen, the base 40 may take any number of forms including a simple rigid structure 40 as seen in FIG. 7 or for that matter the more complex platform 40 as seen in FIG. 6. The base 40 may also comprise flexures between the various beams mounted on its surface to prevent undesired or interfering movement out of the intended axis, and to adjust leveraged effects.

The load cell of the invention generally also comprises a parallel beam structure which assists in the measure of force incident to the load cell. The parallel beam structure 42 and 45 (FIGS. 6 and 7) also functions to hold the sensing means 52. Generally, the parallel beam structure may comprise any configuration of the appropriate material and dimension which will facilitate and exhibit deflection transfer under the intended conditions.

Turning back to FIG. 7, definition of parallel beams 42 and 45 will depend on the magnitude of the force, acceleration or other movement to be sensed by the beam structure. Relevant parameters include the length, width and thickness of the parallel beams, and the necessity of the beam in having an open insert 44 and 46, FIG. 7. Also relevant are the materials used to create the beams and the presence of flexures to attach the beams to any intended base.

Generally, the parallel beam structure may comprise any number of different configurations in accordance with the invention. One alternative embodiment of the parallel beam structure can be seen in FIG. 7 comprising parallel beams 42 and 45. In this instance, parallel beam 45 serves as a load beam, being the primary support of any mass, force, or other displacement placed in the structure. In the meantime, load beam 42 serves as means for supporting the capacity affixed to this lower beam 42. In other words, beam 42 will receive the principal force resulting from displacement transferred through element 52. In the meantime, beam 45 serves as a load bearing element as well as an additional station to seat sensing element 52.

As can be seen in FIG. 7, interior portion 41 results from the lower side of beam 45, the upper side of beam 42, the interior side of sensing means 52, and the exterior side of base 40. Upon deflection, parallel beams 45 and 42 will move in an axis which is consistent with the direction of the displacing force. However, the exterior surface of base 40 as well as the interior surface of sensing means 52 will remain parallel to each other or in "parallelogram" configuration. The result of this parallelogram structure is the negation of a moment arm in the force sensor.

This configuration produces a load cell which is easily manufactured to provide a well behaved response regardless of where force is applied generally across the surface of the end of parallel beam 45. Further, the parallel beam structure, including the close proximity of the beams to one another, provides a structure wherein changes in temperature, humidity, as well as other environmental stresses result in beams which respond similarly to one another. In essence, the invention provides a force sensor which compensates for changes in modulus and allows for any variation and deflection created by environmental stresses.

A more preferred alternative embodiment of the invention can be seen in FIG. 6 wherein load bearing member 45 is positioned parallel, within the opening of the three-dimensional structure or block, to cantilever beam 42 or the capacity supporting means. Here again, the base 40 has an interior plane which is parallel to the interior side of the sensor 52. At the same time, the overall configuration of cantilever beam 42 is parallel at its interior edge with the interior or opposing face of load beam 45.

While not essential, openings 44 and 46 may be defined in each of the load beams 42 and 45, respectively. These openings allow greater adjustment of the sensitivity to force allowing for the load beam deflection to be created by a preferred magnitude of force. In essence, openings such as those found at 44 and 46 allow for the creation of a load cell having greater adjustment to the force incident on the cell. The openings easily bored or machined with standard tooling, and may be slotted or dumbbell-shaped.

Generally, as can be seen in FIG. 6, a load cell may take any number of configurations including that of a three-dimensional six-sided block. Within the cell, there may generally be an opening 10 defined by the two side walls 24A and 24B as well as an upper side wall 26 and a lower side wall 28 positioned within the opening is the base 40 on which is mounted load beam 45 and cantilever capacity supporting beam 42.

Optionally, any number of elements within the load cell may be attached through the use of flexures. Flexures assist in determining the load capacity of the parallel beam structure as well as preventing the base or other structures from pivoting or bending into a plane outside that intended. Flexures are integral in converting the force to be sensed into displacement of the base and parallel beam structure so as to influence the sensor by a mechanical action ultimately resulting in a transduced signal from the sensor.

Generally, flexures may be positioned anywhere within the load cell to prevent interfering deflection. Specifically, as can be seen in FIG. 6, a flexure 32 may be found on the bottom of base 40 attaching base 40 to lower wall 28. Flexure 34 may be found at the top of load beam 45 attaching load beam 45 to upper wall 26.

Within the opening of the three-dimensional structure, sensing element 52 is supported between load bearing beam 45 and capacity supporting beam 42. Load beam 45 and cantilever support beam 42 are in parallel within at least one plane within the opening 10 of three-dimensional block 20. This maintains the parallelogram-like structure created by base 40, sensing element 52, as well as the two interior or opposing side walls of beam 42 and beam 45. Accordingly, deflection of the load cell by any force will result in a parallelogram-like response within the invention.

The sensors may be attached through means which will provide an integral or fixed and stable joint such as thermoplastic or thermosetting adhesives. One preferred class of adhesives includes epoxy-type adhesives, such as EcoBond which is available from Emerson and Cummings. Preferred load cell performance may be as rigid and stable as possible. To minimize joint effects a larger deflection of the parallel spring system is desired. Then when the attachment joints move, this movement is small relative to the beam deflection. The output will then be less sensitive to a small amount of deflection due to less than perfect attachment joints.

The load cell of the invention also comprises sensing means 52, FIG. 7. The sensing means generally function to sense force created by the incidence of a force on the load cell. The sensing means is influenced by the force either of compression or tension and transduces this force into an electrical signal which is sent to a circuit for evaluation. Generally, any number of sensing means may be used in accordance with this invention including hard electrical wiring, electrical circuitry, transistor circuitry, including semiconductors and the like. Sensing means which may be used include optical, electromechanical, solid state and impedance or resonator sensing means.

One preferred sensing element comprises an impedance or resonator such as a quartz crystal. Preferred resonators include those available from Microcrystal made by ETA of Grenchen, Switzerland. Other resonators which are also useful are those disclosed in Eer Nisse et al U.S. Pat. No. 4,724,351, Eer Nisse et al U.S. Pat. No. 4,215,570, Norling U.S. Pat. No. 4,912,990, Eer Nisse et al U.S. Pat. No. 4,372,173 all of which are incorporated herein by reference.

Figure 8A:
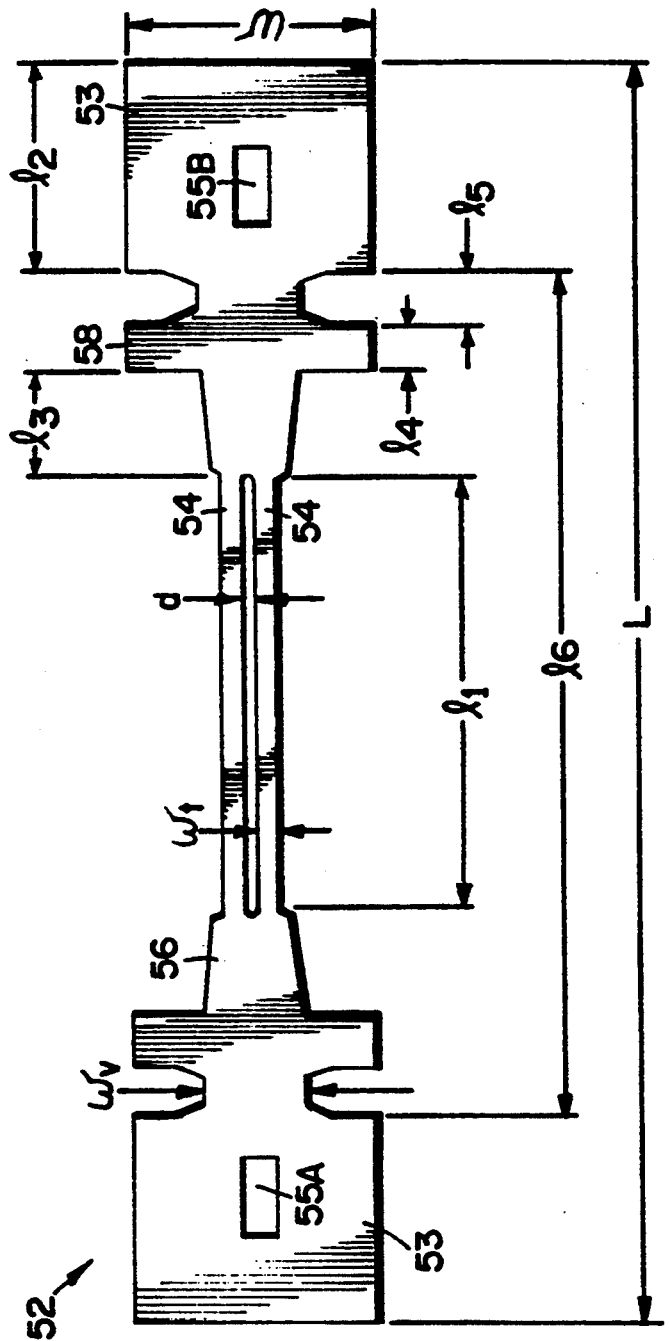
FIG. 8A is a top plan view of a quartz double-ended tuning fork transducer consistent with the invention.
Figure 8B:
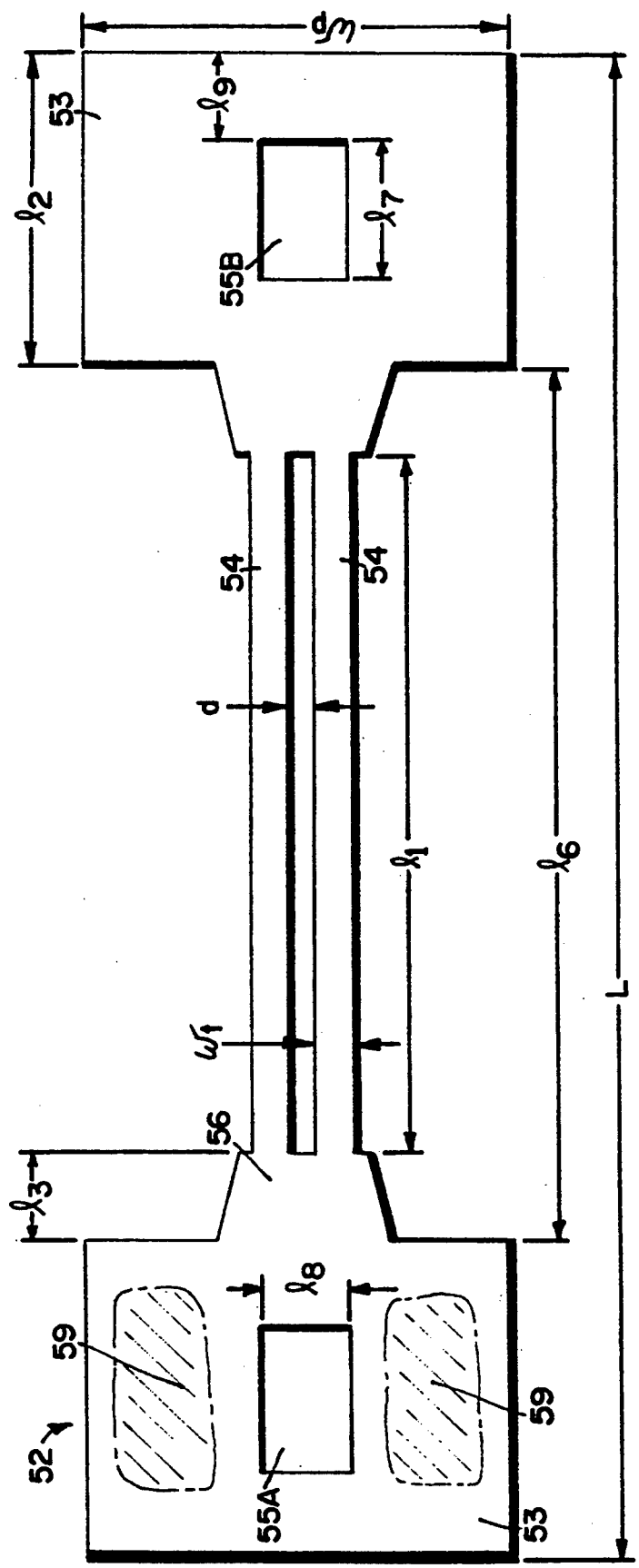
FIG. 8B is a top plan view of an alternative embodiment of a quartz double-ended tuning fork transducer consistent with the invention.

Such resonators are commonly referred to as a double-ended tuning fork 52 and generally comprises two parallel tines 54 joined together at their ends 56 which may also be held in place on the load cell by end pads 53, FIGS. 8A and 8B. The tines may be excited piezoelectrically so as to vibrate in an amount bending them in opposition to each other within the plane of the plate. By applying a tensile or compressive force to the crystal along its longitudinal axis, its resident frequency will increase or decrease like the strings of a violin.

Any number of transducers may be used in accordance with the invention. As can be seen in FIG. 8A, we have found that double-ended tuning forks having an overall thickness of about 0.175 mm, an overall length (L) of about 15 mm, tine 54 lengths ($l_1$) of about 5.26 mm, pad widths ($w_p$) of about 2.9 mm and pad lengths ($l_2$) of about 2.5 mm. Generally, the distance between the tines (d) is about 0.16 mm and the width of the tines ($w_t$) is about 0.26 mm. The length of tine end regions ($l_3$) is about 1.17 mm, while the contacts have a length ($l_4$) of about 0.6 mm. An open area 55A and 55B may be seen in either end pad having a length of about 1.0 mm and a width of about 0.4 mm in 55A and 0.49 mm in 55B. Open areas 55A and 55B start about 1.0 mm from either end of the resonator. Between the end pads 53 and contacts 58 there is a void which may have a length ($l_5$) of about 0.6 mm with the width ($w_y$) of the resonator at this void behind about 1.2 mm. The overall length ($l_6$) of the resonator between end pads is about 10.0 mm. While any number of materials can be used to manufacture the transducer, piezoelectric materials have been found useful and alpha quartz has been found to be preferred. Further, in order to provide quartz crystal resonators with the desired thermal stability the crystals are cut on the Z plane.

An alternative quartz force transducer may be seen in FIG. 8B which is also useful in the invention. The transducer depicted in FIG. 8B has an overall thickness of about 0.150 mm and is comprised of quartz cut along the Z plane. As shown the overall length of the transducer (L) is about 7 mm, ($l_1$) being about 3.2 mm, ($l_2$) being about 0.5 mm, ($l_3$) being about 0.4 mm ($l_6$) being about 4 mm, ($l_7$) being about 0.6 mm, ($l_8$) being about 0.4 mm, and ($l_9$) being about 0.5 mm. The width of the tines ($W_t$) is about 0.18 mm, d is about 0.1 mm, and ($W_p$) is about 1.9 mm. Additionally, electrodes 59 formed of gold may be positioned a either end of the transducer on either side of openings 55A and 55B. This positioning may also be used on the electrode shown in FIG. 8A.

Generally, the quartz resonators may have gold electrodes distributed on their surfaces to cause the cyrstals to interact with a resonator circuit as a frequency controlling element when the circuit is connected to the crystal electrodes.

The quartz crystal is a very stable and reliable electromechanical device. The force-frequency response and quasidigital output signal of the device are associated with accurate frequency measuring capabilities and enable good performance. Outstanding mechanical and physical properties of single crystal quartz yield a behavior with tight repeatability and without hysteresis as well as good thermal and long term stability. Furthermore, only small displacements are induced in the mounting structure due to the high stiffness of quartz.

In practice the transducer may be attached between either cantilever beam and the central load beam 45. Any number of attaching mechanisms known to those of skill in the art may be used including solder, welding and adhesive among others. One preferred adhesive includes epoxy sold under the brand name EC-COBOND and available from Emerson & Cumming, Inc.

An oscillator is needed in order to drive the quartz resonator. Discussion of a preferred oscillator will be discussed infra in conjunction with controller 300. The frequency range of the transducer may vary depending upon the given application. However a frequency of 20 KHZ to 100 KHZ, preferably 44 KHZ, 48 KHZ, and most preferably 86 KHZ to 94 KHZ has been found most useful.

The load cell of the invention, as discussed above, is driven by load cell controller 300. The electrical signal is transmitted from the load sensing means to controller 300 through leads 60, see FIGS. 9A and 9B.

Figure 9B:
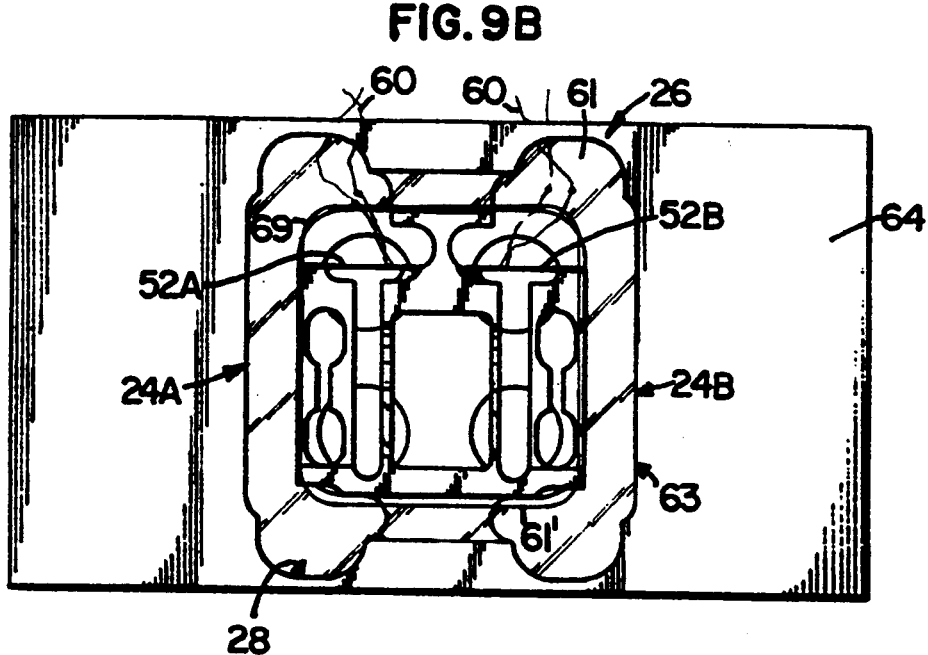
FIG. 9B is a partial cutaway side elevational view of the load cell of the invention depicted in FIG. 9A in which the sealing membrane and stop means have been cut away.
Figure 9A:
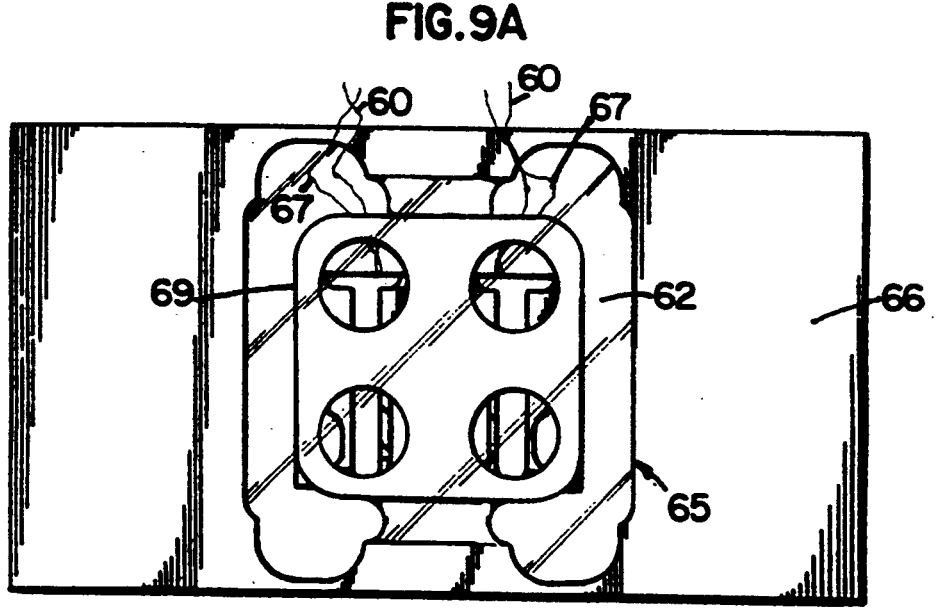
FIG. 9A is a side elevational view of one embodiment of the load cell of the invention seen in FIG. 4 additionally depicting a sealing membrane and stop means.

In order to reduce vibration and interferences with the vibration of the quartz crystals when the load cell is in either the stressed (subjected to a force) or unstressed state the leads 60 may be coated, FIGS. 9A and 9B. This vibrational interference may adversely effect the electrical characteristics of the load sensing means $52a$ and $52b$. Placing a thin coating of material on the leads 60 will tend to dampen vibrations and minimize their adverse effect on the load sensing means $52a$ and $52b$.

The leads 60 may be coated with any number of nonorganic or organic as well as thermoplastic or thermosetting systems effective in dampening the vibrational frequency within the leads. Coating systems which may be useful to this end include natural or modified polymers such as drying oils, cellulose esters, and cellulose ethers or combinations thereof; condensation system coatings such as alkyd resins, polyesters, amino resins, phenolic resins, polyamides, polyurethanes, epoxy resins, silicones, or mixtures thereof; vinyl polymers and copolymers based upon monomers including butadiene, acrylic or methacrylic esters, vinyl acetate, vinyl chloride, vinylidine chloride, styrene, vinylacetel or butyryl, fluorocarbons, or mixtures thereof; as well as resin combinations of any of the listed components.

Preferably, the coating material comprises silicone applied at a coating thickness ranging from about 0.001 to 0.005 inches. This thickness may vary depending on the method used to coat the leads. Lead coating may be implemented by any number of means known to those of skill in the art including manual brushing of leads. One preferred means of coating may include the pneumatic application of dampening material through a volumetric device sold as 1000XL-PI available from EFD of Providence, R.I.

Returning to FIG. 3, a more preferred embodiment of the parallel beam structure can be seen. Essentially, this embodiment of the load cell may function with two sensing elements 52A and 52B, a base 40, and adequate structure to ensure that both sensing elements will be influenced equally when the load cell is stressed. This will allow for the independent signal processing of each respective sensor producing common mode signal effects and differential mode signal effects.

Common mode signal effects include the effects of temperature, pressure, external vibration and aging among any other effects which influence both cantilever beams 42A and 42B as well as sensors, 52A and 52B, equally, FIG. 3. Differential mode effects are most importantly any force or stress on the sensor which influences the cantilever beams 42A and 42B as well as sensors 52A and 52B, unequally.

In this case, hollowed cantilever beams 42A, 42B and 45 are attached to a single unitary base 40 stemming from the opening's lower side 28. The load cell is able to compensate for changes in the modulus of elasticity, variations and hysteresis as well as anelastic creep through attachment of both of the flexible beams 42A and 42B through sensing means 52A and 52B attached between the upper ends of the flexible beams and the load bearing beam 45. In this instance, any change in modulus, hysteresis or creep will be cancelled by attaching the sensing means between the flexible arms and the load bearing beam as both will be affected proportionally.

While not wishing to be bound to a specific mode or theory of operation, we believe that load cell operation is focused between a load bearing beam 45 arranged with a bridging gap to a small spring 42. This small spring 42 bears a load because of the deflection of the load bearing beam 45 by force transfer through a relatively rigid force sensor 52A or 52B deflecting only, for example, about 0.00005 inch at full load. In this case, the entire load cell may deflect only about 0.015 inch. The force sensor then experiences a force which is essentially independent of the elastic modulus of the machining material.

In this case, where $P_T$ is load, the total load born by the parallel springs is:

$$P_T = P_1 + P_2$$

where $P_1$ is the load born by springs 45 and $P_2$ is the load born by spring 42.

The load on each beam (spring) is proportional to its deflection:

$$P_1 = K_1 Y_1 \text{ and } P_2 = K_2 Y_2$$

where $Y_1$ and $Y_2$ are respective deflections in inches, $K_1$ and $K_2$ are respective spring constants representing pounds of load per inch of deflection.

If the connecting force sensor has a very large spring constant then the two beams have essentially equal deflection under load.

$$Y_1 = Y_2 \text{ and } \frac{P_1}{K_1} = \frac{P_2}{K_2}$$

The spring constant of each beam is proportioned to the modulus of its material of composition:

$$K_1 = C_1 E_1 \text{ and } K_2 = C_2 E_2$$

where $C_1$ and $C_2$ are constants dependent on the beam shapes and $E_1$ and $E_2$ are their respective elastic moduli.

Because the material of both springs is the same, their moduli are the same.

$$E_1 = E_2$$

and $$\frac{P_1}{C_1 E_1} = \frac{P_2}{C_2 E_1}$$

The force on $P_2$ is equal to the force on the force sensor because the force sensor is the connecting element. Therefore the sensed force is proportional to the applied load.

$$P_2 = \frac{P_1 C_2}{C_1} = (P_T - P_2) \times \frac{C_2}{C_1}$$

and

-continued $$P_2 = \frac{P_T}{(1 + C_1/C_2)}$$

$C_2$ and $C_1$ are dimensional factors so $P_2$ is essentially directly dependent on the applied force without modulus effects.

Therefore, modulus sensitivity to temperature, anelastic creep (a time dependent modulus effect) and static hysteresis (an internal material friction effect which creates a history dependence of modulus) become negligible if the structures in both springs see similar environmental effects and stress levels when a nonlinear stress-strain relationship exists.

The output signal of these load cells is almost purely dependent on their structural dimensions and the applied load, if temperature does not effect the force sensor's performance. When the load cell is not made from the same material as the force sensor, temperature changes will cause a change in the force sensors signal in the form of a zero reference shift. Other environmental effects such as barometric pressure may also cause similar effects on the zero stability. To overcome these environmental effects a closely matched second force sensor is generally preferred. The second force sensor 52B may be mounted between the load beam 45 and another parallel beam 42B. This force sensor will then see a negative force as compared to the first sensor 52A. By extracting the difference between the two force sensors, the output due to the applied force is doubled, but interference effects which affect both sensors 52A and 52B equally cancel.

In order to further improve the accuracy and precision of the load cell of the invention, a sealing means may be provided. Any number of sealing configurations may be used such as exterior coating of the load cell, filling the load cell cavity with sealing compound, or providing sealing "windows" on the front and back of the load cell interior opening 10. For example, the load cell may be completely wrapped to isolate the internal works of the cell. Additionally, the transducers may be encapsulated and the entire cavity filled to isolate the various beams against unwanted vibrational interferences. Encapsulation of the transducers will prevent them from being damped during their normal operation. Referring again to FIG. 9A and FIG. 9B, a first and second sealing member, 61 (shown partially cutaway by edge 61') and 62, respectively, provide the sensing means 52A and 52B with additional protection from the environment. The sealing member may take any form which will isolate the internal load sensing elements of the cell without interfering with their function. Preferably, the sealing members conform to the shape of the cell opening and adhere to the first 24A, second 24B, upper 26, and lower 28 walls of the load cell. The first seal 61 is adjacent to a first edge 63 of the opening such that it is located on a first side 64 of the load sensing means 52A and 52B. The second seal 62 is adjacent to a second edge 65 of the opening such that it is located on a second side 66 of the load sensing means 52A and 52B.

The sealing members may be formed to surround the leads 60, which can be seen to penetrate 67 the second sealing member 62, FIG. 9A. The second sealing member 62 adheres to the side of the load cell and the penetration of the sealing member by leads 60 does not reduce the environmental protection offered by the seal.

Both the first 61 and second 62 sealing members may be substantially thin and flat. The thin, flat shape of the seals precludes contact of the seals to the load sensing means 52A and 52B. Generally, the sealing members may comprise a thickness which may range from about 0.1 to 1 inch, preferably about 0.1 to 0.2 inches. Preferably, the sealing means may comprise filling substantially all or the entire load cell cavity, FIG. 9C. In this case, the transducers are isolated from the sealing means so as to not interfere with the vibrational operation of the transducers.

In production, the load cell of the invention may be sealed by positioning the load cell against a flat, nonadherent surface such as a surface treated with flouropolymers like TEFLON ®. In this context, flat means that the load cell opening 10, (See FIG. 3), is sealed on one side by the supporting nonadherent surface. Sealing compound may then be introduced into the opening 10 to seal the side of the opening 10 adjacent the nonadherent surface.

As explained earlier, the sealing member may have a varying thickness depending on the overall dimensions of the load cell. However, the sealing member should preferably not be so thick as to foul, dampen, or otherwise interfere with the transducers. Once the first sealing member is formed, (and cured, if required by the materials used), leads 60 may be inserted through the seal.

The load cell may then be inverted, to position the opposite side of the opening on the nonadherent surface. The same procedure may then be used to complete this seal. Once means of completing this seal comprises the use of an industrial syringe, by inserting the needle through the seal previously formed, and introducing the desired volume of sealing compound.

Once the second seal has been formed the opening 10 of the cell may be filled with sealing compound up to a line 15, (FIG. 9C), beneath the transducers 52A and 52B. By sealing the internal components in the load cell opening 10, interfering vibrations are reduced thereby avoiding activity dips in the performance of the load cell.

Here again, the sealing conformed may be introduced into the opening 10 between the two sealing members to fill the opening up to line 15 which may be positioned so as not to interfere with the transducers. Opening 10 is then reduced to volume 16, which even further reduces the quantity of interfering vibrations in the cell. Even more preferably, the cell may be inverted and filled with sealing compound to a line 17 which will even further reduce volume 16 and, in turn, reduce interfering vibrations. Overall the volume of sealing compound used to fill the opening 10 of the cell may be that necessary to fill the opening without contacting the transducers 52A and 52B.

The sealing members covering the internal load sensing constituents of the cell of the invention may comprise any number of compositions applied to the load cell through any number of means. Load cell sealing members may comprise any number of systems effective in sealing the internal area of the load cell. Preferably, the sealing means comprises a material having high thermal stability which is not susceptible to chemical or physical aging. Preferably, the material also has a low modulus with 3 to 9 mm penetration using a Universal Penetrometer with a 19.5 gram shaft having a ¼ inch diameter foot. Sealing members may be inorganic or organic, thermoplastic, thermosetting.

Metal alloy films may also be used including alloys of aluminum, nickel, zinc, molybdenum and the like. Sealing systems which may be useful to this end include natural or modified polymers such as drying oils, cellulose esters, and cellulose ethers or combinations thereof; condensation system coatings such as alkyd resins, polyesters, amino resins, phenolic resins, polyamides, polyurethanes, epoxy resins, silicones, or mixtures thereof; vinyl polymers and copolymers based upon monomers including butadiene, acrylic or methacrylic esters, vinyl acetate, vinyl chloride, vinylidine chloride, styrene, vinylacetel or butyryl, fluorocarbons, or mixtures thereof; as well as resin combinations of the listed chemicals.

The sealing means may comprise a precast or precured film, a film which is cured after application, or a material used to fill the interior opening which cures after application made from any of the materials provided above. Preferably, the coating material comprises silicone compounds. Silicones generally have a backbone comprising silicone and oxygen with an organic group attached to the backbone such as an alkyl group, fluoroalkyl group, a phenyl group, a vinyl group, hydrogen, a halogen group, an alkoxy group, an acyloxy group, an alkylamino group, or mixtures thereof. Silicone systems useful in the invention may comprise organic and inorganic additives, fillers to increase strength, or solvents as well as additives to promote flexibility, temperature stability, prevent aging, antioxidants, adhesion promoters, and extenders.

Silicone polymers may comprise silicone homopolymers, silicone random polymers, or silicone organic block copolymers. Silicone polymers found particularly useful are those which vulcanize or cure to increase in molecular weight either from a one-part or two-part system. Two-part silicone systems generally comprise a catalyst as one part and the uncured silicone as the second part, which may be present in any number of curable forms including alkoxy-, amino-, ketoxy silicone, as well as other silicones. The catalyst may be any catalyst appropriate to promote curing known to those of skill in the art through curing mechanisms known to those of skill in the art. Most preferably the compounds used in accordance with the invention are those available from Loctite of Newington, Conn., LOCTITE® 5491 in a two-part silicone composition which cures when combined.

Returning to FIGS. 9A and 9B, the sealing members may have a tendency to flex in the use of the load cell and may come into contact with the load sensing means 52A and 52B. This fluctuation may be dampened by one or more plates 69 affixed to the first seal such that it is supported by the seal and it does not touch the first wall, second wall, upper wall, or lower wall. A second plate may be similarly attached to the second seal.

These plate members may be comprised of any number of hardened elemental plastics such as thermoplastic or thermosetting compositions such as acrylics, epoxies, alkyd compositions, polyesters, cellulose ester and ether compositions, urethanes, phenolics, vinyl chlorides, or mixtures thereof.

Further, the plate members may also comprise elemental metals or metal alloys such as gallium, silicon, mercury, arsenic, tellurate, aluminum, or alloys thereof. Other metals which are useful include cobalt, nickel, iron, chromium, niobium, tungsten, tantalum, vanadium, and alloys thereof. Also useful are metals and metal alloys of silver, gold, zinc, iron, platinum, manganese, magnesium, tin, exanthem, indium, titanium, and binary alloys, ternary alloys, and quaternary alloys, for example.

Generally, the preferred alloys include alloys of aluminum, such as 6061, 2024, 3003, or 5005.

In practice, the thickness of the plate members may range from about 0.010 to 0.060 inches and preferably about 0.020 to 0.030 inches. The plate members may take any conceivable design consistent with their function in the load cell of the invention. To this end, plate members may be patterned or otherwise weighted so as to provide a plate of appropriate structure for the intended function. The overall area of the plates as a percentage of the interior of the load cell may generally range from about 0.0 to 90%, preferably from about 50 to 75%.

In use, the load cell of the invention is preferably placed within an environment or application wherein the cell is stressed through the application of a force. In any given application, the load cell used will be gaged to have certain tolerances in order to provide adequate accuracy and precision in sensing the force. When these tolerances are exceeded, it may be possible to disable the load cell through the application of forces which exceed these tolerances. The occurrence of breakage modes or forces which otherwise exceed the tolerances of the load cell may occur in at least two forms. The first form is the application of a force which exceeds the tolerance of the load cell thereby overloading the cell and causing a rupture of the quartz crystals or an inelastic displacement of various constituents of the cell.

A second breakage mode which may occur is through the application of force at a rapid rate, applied in a fashion which overwhelms the ability of the cell to sense and otherwise communicate the magnitude of the excess force caused by accelerated masses as well as acceleration overwhelming various structural elements of the cell.

The first breakage mode may be contained through the use of physical supports placed adjacent the cell and in the line in which the force is received. (See, for example, stops 88, 81a and 81b in FIGS. 2B and 2C). These supports prevent the cell from overextension by a force of magnitude greater than that which the load cell is able to withstand.

In the second breakage mode, the load cell may be cushioned or otherwise protected from rapid overwhelming forces through the use of mounting means such as nonmetallic screws or bolts or metal bolts which have been coated with a composition which will dampen the vibration created by rapid overwhelming force. Alternatively, a dampening shim may be placed between the load cell and the mounting base. The shim may be comprised of any number of materials which will effectively dampen the vibrations created by the shock of the force incident to the cell. (See, for example, phenolic spacers 82 and 84 in FIG. 2C). Dampening materials which may be used in either instance, i.e. screws, bolts, or shims, include all compositions used to otherwise coat the wire leads.

Figure 9C:
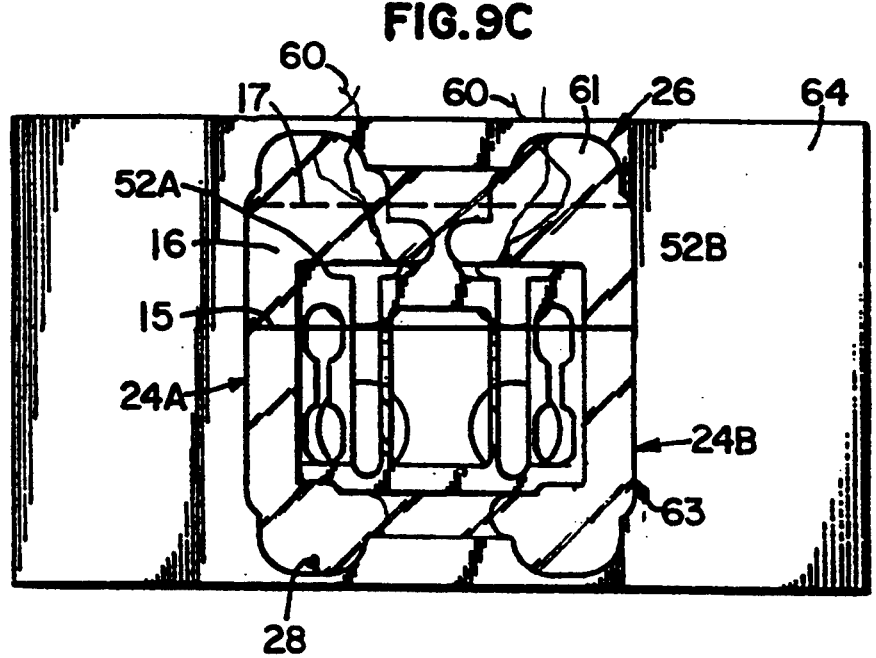
FIG. 9C is a side elevational view of the load cell of FIG. 3, showing sealing means including sealing compound introduced into the opening of the load cell.

In the preferred counting scale 70, the preferred load cell 210 for use therein is similar to that shown in FIG. 9C, having sealing means and coated electrical leads. Any of the other embodiments of load cell designs shown herein would also be usable in counting scale 70.

B. Load Cell Controller

1. Functional Description

Figure 10:
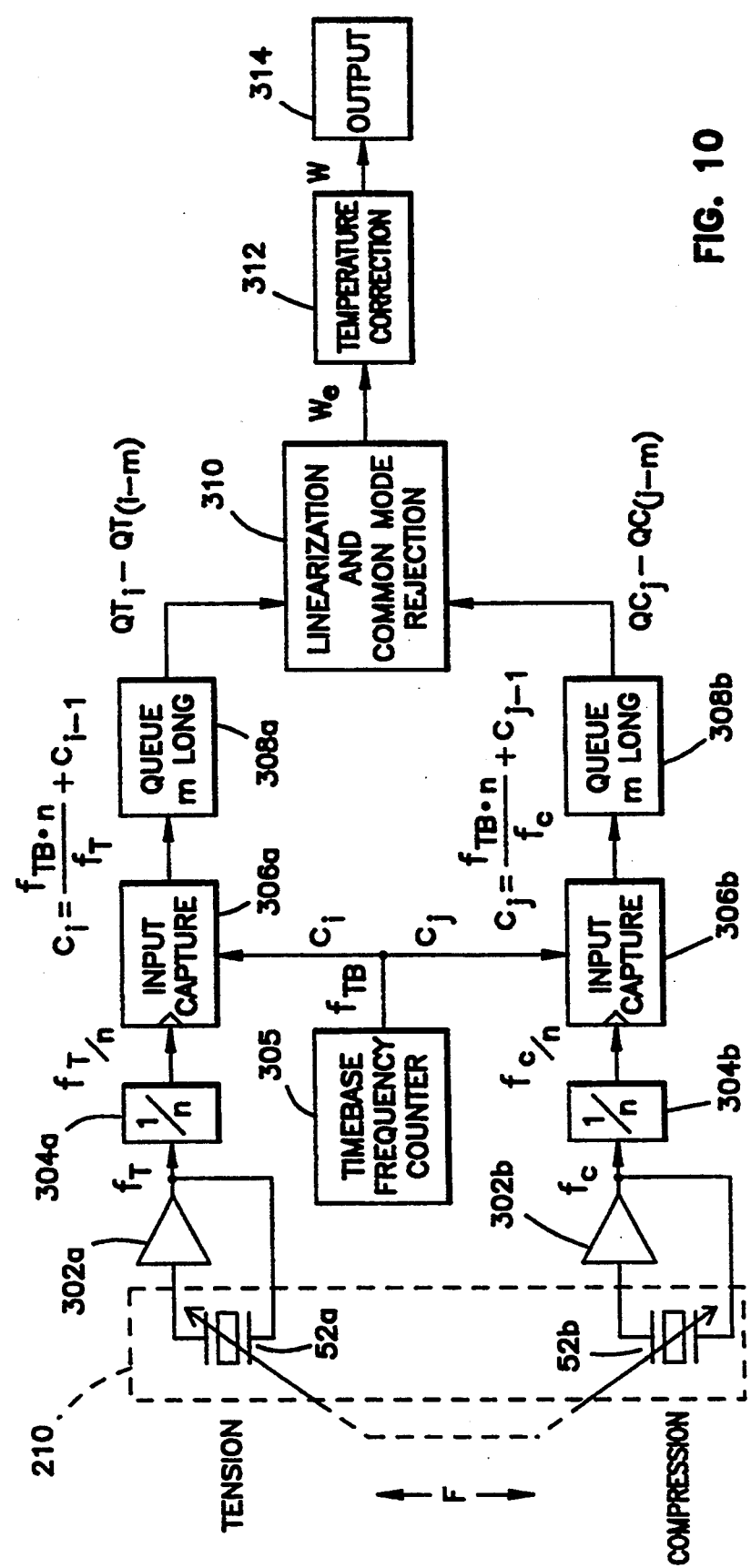
FIG. 10 is a functional block diagram of a load cell controller for use in the counting scale of FIG. 1, consistent with one preferred embodiment of the invention.

FIG. 10 shows a functional block diagram of the load cell data controller 300 which drives load sensing elements 52a and 52b located on load cell 210 and generates a linearized, temperature corrected, and common mode rejected value for the force exerted on the load cell. Load sensing means 52a is hereinafter designated the tension resonator or transducer as, for the purposes of its use in a counting scale, this load sensing element will be subjected to tensional forces during normal weighing operations. Similarly, load sensing element 52b will hereinafter be designated a compression resonator or transducer, as this element is subjected to compressional forces during normal weighing operations. One skilled in the art will appreciate that other forms of transducers besides resonators could be used in conjunction with the preferred embodiment, so long as they provide information in the form of a signal which varies in frequency based upon the applied load.

Tension resonator 52a is driven by oscillator circuit 302a, which is preferably a positive feed back amplifier circuit. It is well known in the art that an amplifier circuit will naturally oscillate if the input and output of the amplifier are in phase. Further, the frequency at which this circuit will oscillate is the resonant frequency, $f_T$, of tension resonator 52a, which is dependent upon the mechanical characteristics of tension resonator 52a. It is also related to the amount of force that is being applied to the tension resonator 52a, as well as to temperature and other environmental effects.

The output of oscillator circuit 302a is applied to divide-by-n frequency divider 304a. Divider 304a generates a pulse signal having a frequency equivalent to $f_T/n$. The period of the divider output signal will therefore be n times the period of the oscillator signal for tension resonator 52a. As the number n will later be factored out of the tension resonator frequency $f_T$, this divide-by-n circuit basically operates to average n oscillations of tension resonator 52a together.

In a preferred embodiment, n is 4096, such that 4096 oscillations of tension resonator 52a are counted for each pulse provided by the divide-by-n frequency divider 304a. By counting multiple oscillations, transient errors are reduced, because they are averaged over a greater time period than would be the case if each oscillation of the resonator signal were analyzed. In addition, the multiple oscillation counting permits the use of a lower timebase frequency for any given resolution.

The signal output from divider 304a is applied to a gating input capture latch 306a. Input capture latch 306a also receives an input signal $C_i$ from the output of a time base frequency counter 305. Time base frequency counter 305 is a free running counter which operates at a time base frequency $f_{TB}$, and which provides a current count value output, for example at time i, as input signal $C_i$. In the preferred embodiment, this time base frequency is 19.6608 MHz, and the counter is 24 bits in length.

Input capture latch 306a operates to latch the present value $C_i$ of time base frequency counter 305 whenever a pulse is received from divide-by-n frequency divider 304a. This configuration is commonly known as an input capture configuration. The change in output (e.g. from two successive captures, $C_{i-1}$ and $C_i$, of the time base frequency counter) of such a configuration is a measurement of the scaled period of oscillation of the tension resonator 52a in terms of the time base frequency $f_{TB}$, as scaled by the divide-by-n frequency divider 304a, or $f_{TB} \times n/f_T$.

The values stored in input capture latch 306a are not absolute readings of the scaled period of oscillation of tension resonator 52a. Rather, this measurement is obtained by taking two successive counts (e.g. $C_{i-1}$ and $C_i$) latched by input capture latch 306a and taking their difference. This is because the absolute value in time base frequency counter 305 is irrelevant since it never resets. Rather, it is the number of counts between successive captures that is the relevant information. Any current reading $C_i$ will therefore be equivalent to the sum of the last count reading $C_{i-1}$ and the change in output $f_{TB} \times n/f_T$.

One skilled in the art will appreciate that many frequency to digital conversion algorithms may be used in place of the one disclosed herein. For instance, time base frequency counter 305 could be reset at the beginning of each cycle, so that the count which is captured by input capture latch 306a is an absolute reading of the period, without having to take two independent readings. However, it has been found that such a reset function would be more complex in design, requiring separate counters for each of the tension and compression resonators and introducing additional delays into the circuit. In addition, one skilled in the art will appreciate that the actual resonant frequency $f_T$ could be measured in lieu of the period which is measured herein. However, it has been found that, by running a time base frequency counter at nearly 20 MHz, greater precision can be obtained in a more reasonable amount of time than by counting the frequency of the resonator, which is typically around 47 kHz.

The output, $C_i$, of input capture latch 306a (which is equivalent to the sum of the last output, $C_{i-1}$, and the change in output, $f_{TB} \times n/f_T$) is applied to a tension queue 308a having space for m entries and a queue pointer i. Each entry is designated as $QT_i$ (where i=0 to m-1). Each time a new value is latched into input capture latch 306a, it is output to tension queue 308a, and placed as the newest entry on the tension queue. This will typically be performed by replacing the oldest entry on the tension queue with this new value, then moving the queue pointer i to point to the next oldest entry on the tension queue. As such, the tension queue only requires enough space for m entries.

In addition to storing new values and updating a queue pointer i, tension queue 308a provides an output value which is equivalent to the difference between the newest entry and the oldest entry which was previously on the queue. This difference is essentially the sum of the last m changes in output of input capture latch 306a (as the absolute components of the count values stored in the queue will cancel out). The newest entry is designated $QT_i$ and the oldest entry is designated $QT_{(i-m)}$. This is the point at which the difference between successive readings of the time base frequency counter 305 is made in order to obtain the necessary information on the period of oscillation for tension resonator 52a. Dividing this difference, $QT_i - QT_{(i-m)}$ by m will give an average difference $f_{T(avg)}$ over the m separate queue readings. The total difference, $QT_i - QT_{(i-m)}$, will therefore be equivalent to $f_{TB} \times n \times m/f_{T(avg)}$. By taking the output over m entries, queue 308a is able to average together a number of readings to provide a more accurate and less-transitory output. It will also be understood by those skilled in the art that a digital low pass filter may be implemented along with this averaging process to avoid aliasing problems with low frequencies of vibration.

In a preferred embodiment, tension queue 308a is eight entries long (m=8). It has been found that this enables weight values to be obtained relatively quickly, with some capability for averaging of values during transitory periods. Another advantage is that keeping a history of values in the queue permits further signal processing if it is desired. For instance, if very large changes are observed over a time period, the entire queue may be flushed until the readings settle, in order to permit faster response to weight changes, in addition to long period averaging.

In a preferred queue, where m fixed addresses in memory are used to store the m entries, the pointer value for the oldest queue entry, i-m, points to the same address as the current queue pointer i. Therefore, it is preferable to compute the queue output value, $QT_i - QT_{(i-m)}$, before storing the new value on the queue. This enables the output to be computed by reading and subtracting the current entry pointed to in the queue from this new value. This old entry may then be replaced in the queue by the new value, and the pointer i incremented, in preparation for the next value from input capture latch 306a.

The average tension resonator frequency $f_{T(avg)}$ over one period can easily be obtained from the output of tension queue 308a:

$$f_{T(avg)} = \frac{f_{TB} \times n \times m}{QT_i - QT_{(i-m)}} \quad (1)$$

The measurement of the average resonant frequency $f_{C(avg)}$ of compression resonator 52b is found in a similar manner to that just described for tension resonator 52a. An oscillator circuit 302b, which is similar to oscillator circuit 302a, operates to oscillate at the resonant frequency $f_C$ of compression resonator 52b. This oscillator signal is applied to a divide-by-n frequency divider 304b, which provides an output having a frequency of $f_C/n$. While the value n need not be the same as the n used in block 304a, for simplicity's sake it has been found that a value of 4096 for frequency divider 304b is sufficient for the reasons explained above pertaining to divider 304a.

The output of frequency divider 304b is applied to an input capture latch 306b, which also receives an input of the value contained in time base frequency counter 305 at time j, generally designated as $C_j$. Input capture latch 306b therefore provides a capture of the time base frequency counter every n oscillations of compression resonator 52b, in increments of the time base frequency $f_{TB}$. By using this input capture algorithm to obtain count changes due to the frequencies of tension and compression resonators 52a and 52b, it can be seen that a single time base frequency counter may be implemented to handle both resonators. In addition, it can be seen that, because the absolute value stored in time base frequency counter 305 is essentially irrelevant, the input captures 306a and 306b can operate asynchronously providing captures of the time base frequency counter at different points in time.

The change in output of input capture latch 306b between two latches at, for instance $C_{j-1}$ and $C_j$, is equivalent to $f_{TB} \times n/f_C$. This change in output is applied to the input of a compression queue 308a, having m entries and a queue pointer j. Similar to tension queue 308a, compression queue 308b preferably has space for eight entries (m=8). Queue 308b also provides an output value which is a difference of its newest and previously oldest entries, $QC_j$ and $QC_{(j-m)}$. This output is related to the average resonant frequency of compression resonator 52b as follows:

$$f_{C(avg)} = \frac{f_{TB} \times n \times m}{QC_j - QC_{(j-m)}} \quad (2)$$

The output of tension and compression queues 308a and 308b essentially contain values representative of uncorrected resonant frequencies of the tension and compression resonators 52a and 52b. These values are processed by a linearization routine diagrammatically illustrated by block 310, which obtains the average resonator frequencies from these values and takes the difference of the two frequencies and linearizes the result such that nonlinear errors are removed.

It has been found that relatively accurate weight readings ban be obtained reliably by taking the difference of the frequencies of the two resonators. By taking the difference, common mode errors are rejected, because a change in frequency which affects each resonator the same will be cancelled out in the substraction. Further, the difference increases the sensitivity of the cell, because an increase in weight will affect each resonator oppositely, increasing the tension resonator frequency and decreasing the compression resonator frequency. As will be shown below, the relationship between weight and resonator frequency can be effectively linearized.

It has been found, however, that simply subtracting the frequencies of the two resonators provides a first order of linearization with only an approximate second order linearization and common-mode rejection. This is because the two resonators have different changes in sensitivity (roughly the "curvature" or "bend" in a response curve from non-linearity) due to environmental effects, so environmental effects will not necessarily affect each resonator identically. As will be discussed, a second order linearization capability is preferred, which essentially scales the first order response of the compression resonator by a scaling factor prior to taking the frequency difference. This second order linearization effectively adjusts the change in sensitivity (the "curvature" or "bend") of the response of the second resonator so that it better conforms to that of the tension resonator, so that a more linear difference value can be obtained. As will also be discussed, a second order common-mode rejection capability is also preferred through a separate temperature correction routine which further corrects for the common-mode effects of temperature, the primary environmental effects seen by a weighing device.

The linearization and common-mode rejection routine in block 310 takes the respective queue outputs from queues 308a and 308b, and generates a dimensionless weight reading estimate $W_e$, which is a linearized difference value that is substantially linearly related to the applied force. The raw frequency obtained from the load cell is primarily linear; however, a number of nonlinear errors also exist which limit the precision and accuracy that may be obtained from the cell. The linearization is performed by modelling the weight-frequency relationships of the tension and compression resonators as second order (quadratic) equations and removing the highest (second order) terms from each of the equations by solving for $W_e$ simultaneously. While one skilled in the art will appreciate that third order or higher terms could be eliminated in the manner disclosed here, it has been found that the majority of linear error is found in the second order term, and the marginal value of also removing higher order terms is not as substantial.

By modelling each weight-frequency relationship as a quadratic equation, the relationships are expressed as:

$$f_T = a_0 + a_1 W_e + a_2 W_e^2 \qquad (3)$$

$$f_C = b_0 + b_1 W_e + b_2 W_e^2 \qquad (4)$$

where $a_{0-2}$ and $b_{0-2}$ are constants, and $W_e$ is the estimated weight. Solving these equations simultaneously for $W_e$ results in:

$$W_e = C[(f_T - a_0) - q(f_C - b_0)] \qquad (5)$$

where $$C = \frac{1}{a_1 + qb_1} \qquad (6)$$

$$q = \frac{a_2}{b_2} \qquad (7)$$

At unloaded conditions $W_e = 0$, so from equations (3) and (4) the dead load tension and compression frequencies, $f_{T0}$ and $f_{C0}$, equal:

$$f_{T0} = a_0 \qquad (8)$$

$$f_{C0} = b_0 \qquad (9)$$

where "dead load" is the state in which the load cell has no additional weight upon it, other than the preload stresses which have been built into the load cell. Equation (5) therefore becomes:

$$W_e = C[(f_T - f_{T0}) - q(f_C - f_{C0})] \qquad (10)$$

Equation (10) exhibits a linear relationship between the estimated weight, $W_e$, and the frequencies of the resonators, $f_T$ and $f_C$, also known as the first and second values (note that the "avg" designations in $f_T$ and $f_C$ have been dropped, as the linearization and common-mode rejection routine sees only these averages, and can not pull out individual samples from the queues). Further, the linearization factor q, also designated herein as the first scaling factor, operates to provide improved linearization and rejection of common mode errors. Ideally, common mode errors should simply cancel out upon subtracting; however, it has been found that common mode errors do not, in practice, affect each resonator identically due to differences in sensitivity. Hence, the first scaling factor q effectively scales the change in sensitivity of each resonator, so that the common-mode errors can be cancelled out by simply taking the difference of the scaled frequency values. While the first scaling factor q is shown scaling the second resonator output, one skilled in the art will appreciate that the same scaling could be accomplished by scaling the first resonator output or by scaling both resonator outputs. "Scaling" in this context, therefore, means scaling the proportional changes in sensitivity of the responses of the two resonators.

In addition, equation (10) includes a second scaling factor C. This scaling factor essentially is used to scale the estimated weight $W_e$ to a desired range of values, either based upon designated units such as pounds or kilograms, or more preferably, upon an arbitrarily selected range of counts.

$W_e$, the estimated weight reading is preferably dimensionless and linear as a function of the tension and compression frequencies. $W_e$ represents a value on a perfectly linear graph of weight vs. resonator frequencies, so that a repeatable weight value can be obtained from the resonator readings. However, $W_e$ is preferably dimensionless, because, for example, a load cell can be used to show weight in pounds, kilograms or simply dimensionless counts, and the absolute weight can vary depending on the environment in which the cell is used (e.g. different elevations, geographic location, etc.).

From equation (10), it can be seen that the estimated weight, $W_e$, is computed as a function of the tension and compression frequencies, $f_T$ and $f_C$. Each of these values can be obtained directly from the queue register values, per equations (1) and (2). When these values are computed by equations (1) and (2), they are designated first and second values, respectively. Equations (1) and (2), incidentally, include the terms $f_{T(avg)}$ and $f_{C(avg)}$, respectively, which one skilled in the art will appreciate may be designated simply as the $f_T$ and $f_C$ terms used in equations (3)–(23) for the purposes of the linearization and temperature correction routines.

Constant values C, q, $f_{T0}$ and $f_{C0}$ in equation (10) are obtained by a linear coefficient calibration procedure. In order to perform linear calibration, the cell is subjected to known weights (preferably by going from dead load to full scale and back, e.g. by adding five weights one at a time, then removing them one by one, taking readings at each weight, for a total of eleven readings) at a constant reference temperature (preferably 20° C., room temperature for simplicity) to obtain frequency readings $f_T$ and $f_C$ at each weight. Once frequency readings are obtained at the various weights, a least squares algorithm, or any other curve-fitting algorithm known in the art, may be used to calculate the coefficients $a_{0-2}$ and $b_{0-2}$ from equations (3) and (4). It can better be seen that these coefficients are obtainable from equations (3) and (4) by placing these equations in vector notation, where:

$$|f_T| = |a_i| |W_e| \qquad (11)$$

$$|f_C| = |b_i| |W_e| \qquad (12)$$

Since the $|f_T|$, $|f_C|$ and $|W_e|$ vectors are known, the $|a_i|$ and $|b_i|$ vectors may be obtained as they are the only unknowns in their respective equations. These linear calibration coefficients are distinct for each load cell. Since they reflect mechanical properties of each cell, they will remain valid regardless of the application or environment in which the cell is used.

Once these coefficients are known, the C, q, $f_{T0}$ and $f_{C0}$ values may be calculated from equations (6)–(9). One skilled in the art will appreciate that any number of weights may be used, and any constant temperature can be used, so long as enough data points are obtained to enable a curve to be fit to the points.

During normal operation of the load cell assembly, these calibration values are stored in the cell controller's memory. The linearized estimated weight $W_e$ is then computed by executing equations (1) and (2) to obtain $f_T$ and $f_C$, and then executing equation (10) to obtain $W_e$.

One skilled in the art will appreciate that this calibration procedure could be performed by an operator. Alternatively, this calibration could be automated and run by a computer and/or a robotic system.

After an estimated, linearized differential value $W_e$ is computed, this value is corrected for temperature errors by a temperature correction routine diagrammatically indicated at 312. This routine operates to provide a second order of common-mode rejection by rejecting the errors due to temperature effects, which are typically the most prevalent environmental effects seen by a weighing device.

The first step in this routine is to calculate a temperature indicator $\theta$, which is essentially the error in frequency units for the estimated weight. To compute temperature indicator $\theta$, separate indicators, $\theta_T$ and $\theta_C$, are computed for the tension and compression resonators by subtracting the frequency computed as a function of the estimated weight from the actual frequency value obtained from the resonator, resulting in the following relationships:

$$\theta_T = f_T - (a_0 + a_1 W_e + a_2 W_e^2) \tag{13}$$

$$\theta_C = f_C - (b_0 + b_1 W_e + b_2 W_e^2) \tag{14}$$

It can be seen that the quadratic expansions in equations (13) and (14) are essentially equations (3) and (4), respectively, which are the frequency values which are expected from the calculated estimated weight. The total temperature indicator $\theta$ is simply the sum of the separate indicators:

$$\theta = \theta_T + \theta_C \tag{15}$$

While it has been determined that the sum of the tension and compression parameters is a preferred temperature parameter, it has also been found that acceptable results may also be obtained by using either $\theta_T$ or $\theta_C$ alone.

Errors due to temperature effects generally have two major components: $W_0$, which is the zero shift, or the error for a given temperature for a load cell at dead load; and S, which is the span error, or the error in the sensitivity, or slope, of the weight-frequency relationship over temperature. The temperature corrected weight count reading, or force value, W, is computed by eliminating the zero shift and span errors as follows:

$$W = (W_e - W_0)(1 - S) \tag{16}$$

Both the zero shift error $W_0$ and the span error S can be approximated as second order equations (neglecting third order and higher errors) as functions of the temperature indicator $\theta$:

$$W_0 = z_0 + z_1 \theta + z_2 \theta^2 \tag{17}$$

$$S = s_0 + s_1 \theta + s_2 \theta^2 \tag{18}$$

where $z_{0-2}$ and $s_{0-2}$ are the zero shift and span coefficients, respectively. With a dead load on the cell, and at the reference temperature used for calibrating the linearization routine, there will be no temperature error because the linear coefficients have biased the cell to operate properly at that temperature. Therefore, the temperature indicator $\theta$ will be zero, the zero shift and span error will be zero (i.e. no correction). Solving equations (17) and (18) for this condition results in the following relationships:

$$W_0 = z_1 \theta + z_2 \theta^2 \tag{19}$$

$$S = s_1 \theta + s_2 \theta^2 \tag{20}$$

The zero and span coefficients $z_{1-2}$ and $s_{1-2}$ are calculated through an additional temperature calibration procedure. In order to calibrate the cell for temperature correction, different frequency readings are taken for different reference weights and temperatures. It is preferred to use $-5°$ C., $10°$ C. and $40°$ C. as the reference temperatures (with the cell linearized at $20°$ C.), as these temperatures conform to the operating requirements under OIML guidelines for class 3 devices. Any number of temperatures may be used alternatively, as long as sufficient data is obtained to get a reliable curve-fit.

To obtain the zero shift coefficients $z_1$ and $z_2$, frequency readings are taken at each temperature for a cell under dead load conditions. The estimated weight $W_e$ at each temperature is calculated using equations (1), (2) and (10) then the temperature indicators e are calculated using equations (13), (14) and (15) for each estimated weight reading. The zero shift values $W_0$ are also known, as they are the difference between the calculated estimated weight and the known dead load weight. As data points exist for $W_0$ and $\theta$ at each temperature, a least squares algorithm, or any other known curve-fitting routine, may be used to compute $z_1$ and $z_2$, as seen from the vector relationship of equation (19):

$$|W_0| = |z_i||\theta| \tag{21}$$

To obtain the span error coefficients, frequency readings are taken at each temperature using a weight which is near the load cell's capacity (a "full scale" reading). The estimated weight $W_e$ at each temperature is calculated using equations (1), (2), and (10), then the temperature indicators $\theta$ are calculated using equations (13), (14) and (15) for each estimated weight reading. The span error S at each temperature is a function of the relative deviation in error of the estimated weight, which is:

$$S = \frac{W_e - \text{actual weight}}{\text{actual weight}} \tag{22}$$

As data points exist for S and $\theta$ at each temperature, a least squares algorithm, or any other known curve-fitting routine, may be used to compute $s_i$ and $s_2$, as seen from the vector relationship of equation (20):

$$|S| = |s_i||\theta| \tag{23}$$

It is preferable under the temperature calibration procedure to take frequency readings at each temperature using the 11 weight data points (six ascending, five descending) that were used in the linearization calibration, rather than simply the dead load and full scale readings that are used to calculate the temperature coefficients $z_i$ and $s_i$. This is because, while no better calibration coefficients would be obtained, other types of errors which may exist in a manufactured load cell could be tested, such as zero return and hysteresis.

One skilled in the art will appreciate that this temperature calibration procedure could be performed by an operator. Alternatively, a computer and/or robotic automated system could be used to perform the calibration.

Once the temperature calibration coefficients have been calculated for a load cell, they can be stored in the controller's memory, since they are distinct for the cell, and should remain valid throughout the cell's lifetime. By computing the linearization and temperature calibration coefficients for a load cell and storing those values in the controller's memory, the load cell assembly will be capable of producing a linearized and temperature corrected weight reading which should remain accurate and stable throughout the lifetime of the cell. A "personality" of the assembly is therefore defined. During normal operation, then, the temperature correction routine 312 executes equations (13), (14) and (15) to obtain $\theta$, executes equations (19) and (20) to obtain $W_0$ and S, respectively, and executes equation (16) to obtain the corrected weight W.

Therefore, during the normal operation of the controller 300, the queue outputs are converted into a corrected and linearized weight reading, force value W, through the use of the linearization and common-mode rejection routine and the temperature correction routine. The preferred linearization and common-mode rejection routine 310 executes, in order, equations (1), (2) and (10), and the preferred temperature correction routine 312 executes, in order, equations (13), (14), (15), (19), (20), and (16), using the coefficients which have been stored in the controller's memory.

One improvement which is believed would obtain more precise temperature correction would be to converge the estimated and corrected weights $W_e$ and W. This could be accomplished by iteration of the temperature correction routine two or more times, using the corrected weight W obtained in equation (16) as the new estimated weight $W_e$ in equations (13) and (14) for the next iteration-of the routine. It is believed that the estimated and corrected weights would converge to a slightly more accurate corrected weight value W.

2. Hardware Configuration

Figure 11:
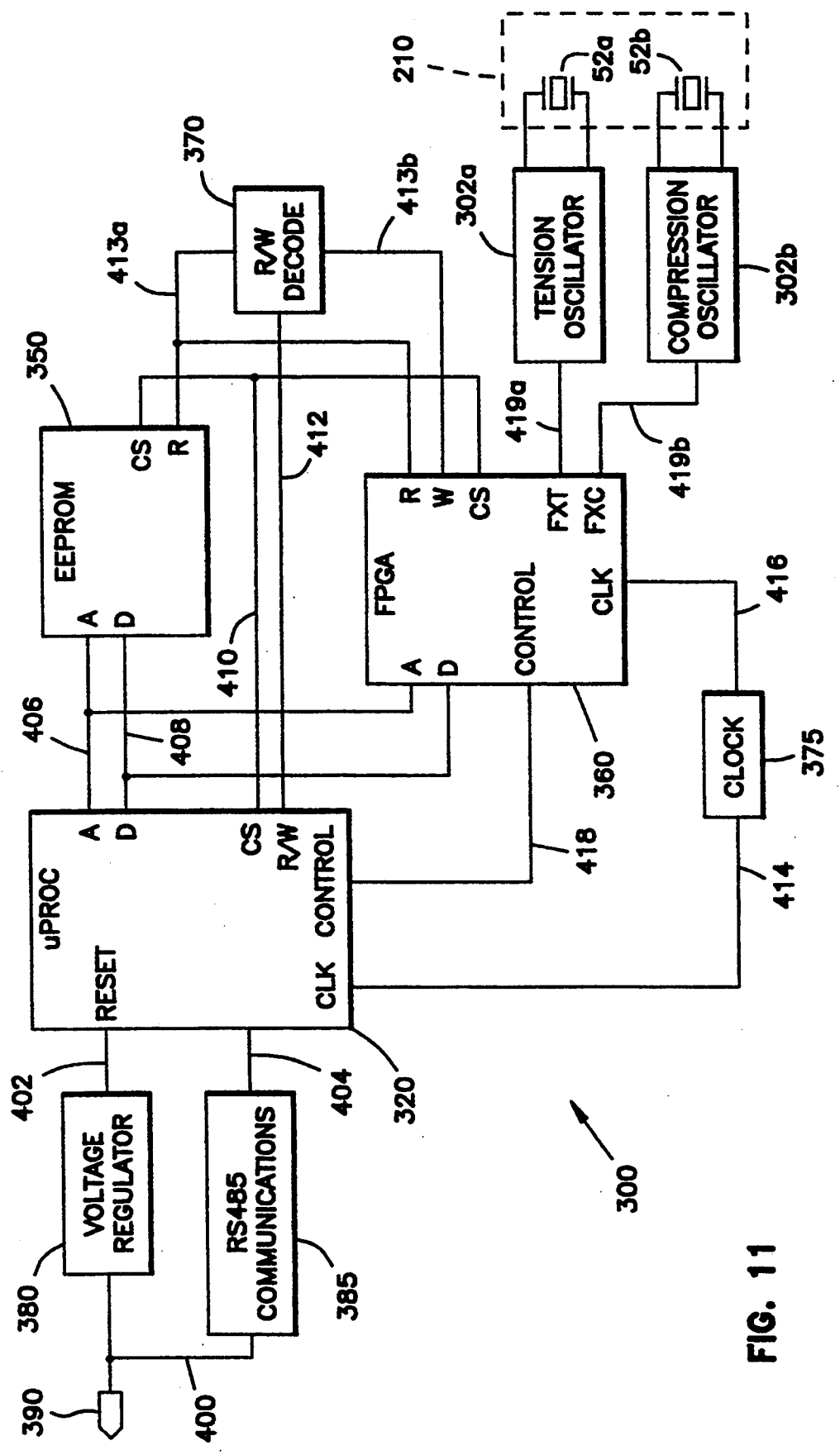
FIG. 11 is a schematic block diagram of a preferred hardware configuration of the load cell controller depicted in FIG. 10.

FIG. 11 shows a preferred configuration of hardware for load cell controller 300, which controls the operation of load cell assembly 200 and executes the data processing functions shown in FIG. 10. The primary components of this load cell controller 300 are microprocessor 320, Read Only Memory (ROM) 350 and field programmable gate array (FPGA) 360. Microprocessor 320 is preferably a Motorola MC 68HC11F1 8-bit microprocessor. This microprocessor provides the primary control for the load cell assembly, and one skilled in the art will appreciate that any number of commercially available microprocessors or microcontrollers could be implemented in controller 300. The program code for microprocessor 320 and the configuration data for FPGA 360 is found in ROM 350, which is preferably an Intel 27C256, a 32K×8 Electrically Programmable ROM (EPROM). One skilled in the art will appreciate that any suitable non-volatile storage device may be implemented to store the program memory for controller 300. EPROM 350 is connected to microprocessor 320 through address bus 406 and data bus 408.

FPGA 360 is also connected to microprocessor 320 and EPROM 350 through address bus 406 and data bus 408. The FPGA is preferably a Xilinx XL3030. This chip is programmed by the microprocessor upon start up with information that is stored in EPROM 350. Once configured, FPGA 360 performs the basic frequency-to-digital conversion for the tension and compression resonators. One skilled in the art will appreciate that the functions performed by FPGA 360 could alternatively be implemented in various hardware and/or software configurations, such as, e.g., discrete logic gates.

Address bus 406 and data bus 408 provide for the exchange of information between these three chips. In addition, microprocessor 320 controls EPROM 350 and FPGA 360 through a series of chip select, read/write and control signal flowpaths. Chip select signal flowpath lines 410 are connected between microprocessor 320 and ROM 350 and FPGA 360. The read/write enable port of microprocessor 320 is connected to EPROM 350 and FPGA 360 through signal flowpath lines 412, read/write decoder 370 and signal flowpath lines 413a and 413b. Decoder 370 is necessary because microprocessor 320 contains a single read/write line, while ROM 350 requires only a read line and FPGA 360 requires separate read and write lines.

Microprocessor 320 is also connected to FPGA 360 through control lines 418. These lines provide for data transfer to the FPGA during power up initialization, so that the FPGA can be configured with the information stored in EPROM 350. After initialization, control lines 418 allow for interrupt request handshaking to be performed between the microprocessor and FPGA 360. Control lines 418 also include reset control so that the microprocessor can reset the FPGA if necessary.

FPGA 360 is connected to the oscillator circuits for the tension and compression resonators, circuits 302a and 302b, respectively, through lines 419a and 419b, respectively. These two lines carry the resonant frequency information for each of the resonators 52a and 52b on load cell 210.

Microprocessor 320 also has a separate voltage regulator and reset circuit 380. In addition to providing +5 VDC of power to the entire board, this circuit also provides a reset function over line 402 which will reset the microprocessor whenever the voltage supply drops below a threshold level.

Clocking is provided to microprocessor 320 and FPGA 360 over lines 414 and 416, respectively, by clock circuit 375. This circuit enables separate clocks to be provided to the microprocessor and FPGA, because they preferably operate at different speeds.

Microprocessor 320 is connected to an external connection 390 through RS485 communication block 385. The external connection 390 is a 6 or 7 pin connector which contains power and ground inputs, as well as serial receive and transmit data line pairs. The RS485 communication block 385 converts the receive and transmit data line pairs included in lines 400 into receive and transmit signals over lines 404 to the microprocessor, and vice versa.

Figure 12:
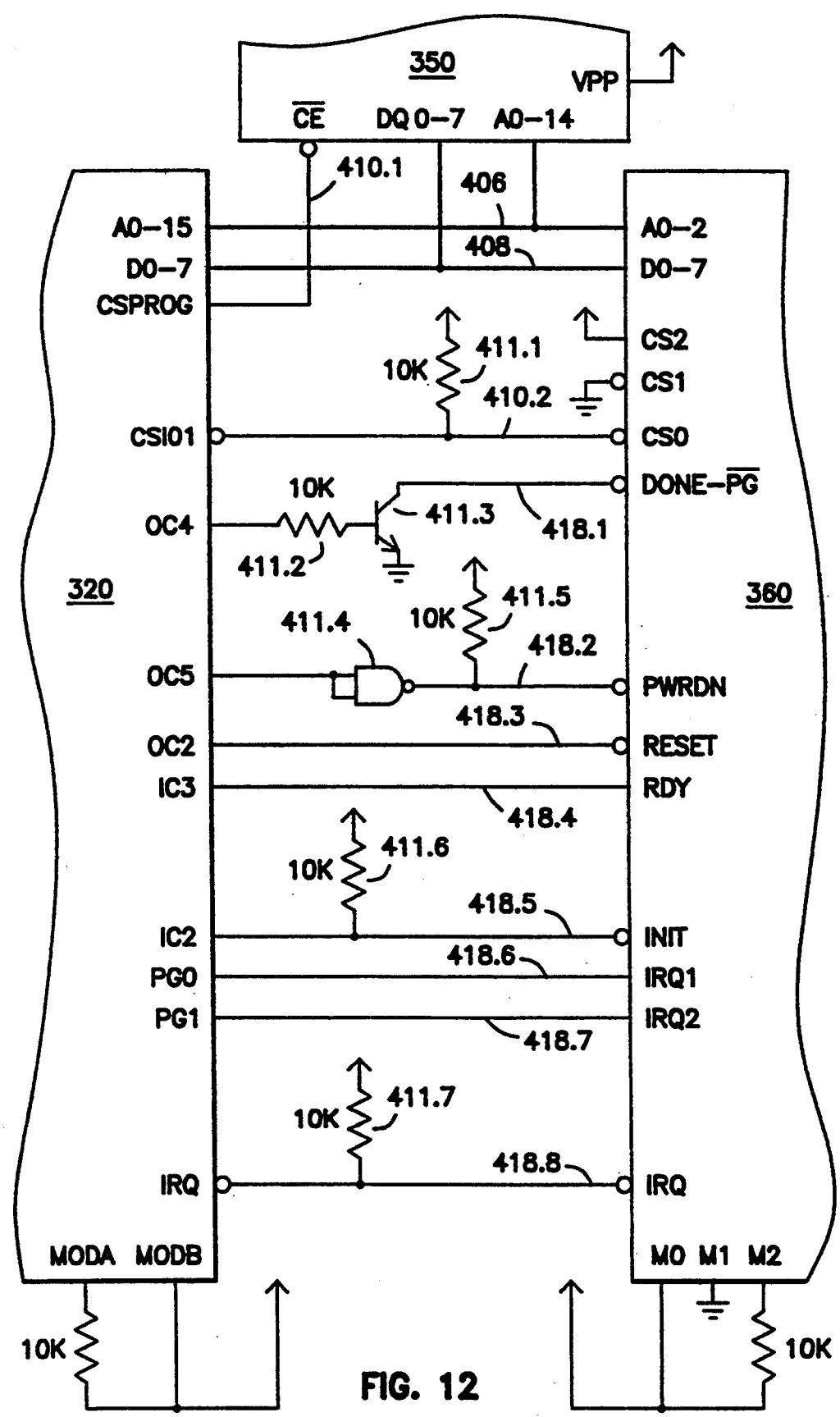
FIG. 12 is a schematic block diagram of the connections between the microprocessor, EPROM, and FPGA shown in FIG. 11.

FIG. 12 shows the address bus, data bus, chip select, and control connections between microprocessor 320, EPROM 350 and FPGA 360. Microprocessor 320 is configured in expanded non-multiplexed mode by tying its MODA and MODB inputs to +5 VDC (MODA through a 10K resistor). In this mode, microprocessor 320 is enabled to operate with a dedicated address and data bus for communicating with EPROM 350 and FPGA 360. Microprocessor 320 has six data ports denoted A–G. In the expanded non-multiplexed mode, data port C is configured as the data bus, ports F and B are configured as the address bus, and port G is configured to provide chip selection.

A number of connections are tied to either ground or +5 VDC in order to properly configure microprocessor 320 for use in this particular application (not shown). Port E, the analog to digital converter, should be disabled by tying connections AN0-7 to ground. Further, connection $V_{RL}$ and $V_{RH}$, the reference voltages for the A/D converter, should be tied to ground and +5 VDC, respectively. In order to disable the non-maskable interrupt, the XIRQ input should be tied to +5 VDC. Further, the IC1 input to port A should be tied to ground as it is not used in this application. The SS, SCK, MOSI, and MISO connections are also tied to ground, because the serial peripheral interface is not used in this application.

EPROM 350 is configured in a read only mode by tying its VPP input to +5 VDC. In this mode, EPROM 350 operates simply as a read only memory. FPGA 360 is configured in peripheral mode by tying M0 to +5 VDC, tying M1 to ground, and tying M2 to +5 VDC through a 10K resistor. In this mode, the FPGA may be loaded byte-wide, as a processor peripheral device. By using control lines 418, microprocessor 320 is able to send bytes of information across the data bus to FPGA 360, for the initial configuration of the FPGA one byte at a time.

Address bus 406 provides the addressing connection between microprocessor 320, EPROM 350, and FPGA 360. With microprocessor 320 configured in expanded non-multiplexed mode, address bus 406 may be connected to the A0-15 connections from ports B and F. In turn, the address bus 406 is also connected to the A0-14 connections on EPROM 350. Only the lower three bytes of address bus 406 are connected to connections A0-2 on FPGA 360. As will become evident later, FPGA 360 uses only six separate addresses which are necessary for proper communication with microprocessor 320.

Eight-bit data bus 408 provides data communication between the various chips both during initialization and normal operating circumstances. Data bus 408 is connected to microprocessor 320 through its D0-7 connections in port C. Data bus 408 is also connected to EPROM 350 through its DQ0-7 connections, and connected to FPGA 360 through its D0-7 connections.

Chip selection by microprocessor 320 is controlled through chip select lines 410.1 and 410.2. Chip select line 410.1 is connected to the CSPROG connection on microprocessor 320, which is an active low line for selecting external program space. Line 410.1 is further connected to the active low CE chip enable on EPROM 350. To provide selection of FPGA 360, CSIO1, the external I/O chip select for microprocessor 320, is connected to the CS0 chip select on FPGA 360 through chip select line 410.2. This line is also connected to +5 VDC through 10K pull-up resistor 411.1. Since line 410.2 provides the only chip selection necessary for FPGA 360, the CS1 and CS2 chip selects on FPGA 360 are connected to ground and +5 VDC, respectively.

A number of control lines 418 are provided to enable microprocessor 320 to control the operation of FPGA 360. Lines 418.1-418.5 provide the handshaking capability between microprocessor 320 and FPGA 360 during configuration of the FPGA. These lines are generally connected to microprocessor 320 through the inputs and outputs for the port A data register. While the configuration procedure and external connections necessary for configuring FPGA 360 are known in the art, a brief description of the connections between microprocessor 320 and FPGA 360 are described. A more detailed description of the functions and operations necessary for configuring FPGA 360 may be found, for instance, in the Programmable Gate Array Data Book published by Xilinx, Inc.

Line 418.1 connects the DONE connection on FPGA 360 to OC4 on microprocessor 320, through an open collector configuration of MMBT3904 NPN transistor 411.3 and 10K resistor 411.2. Line 418.2 connects the PWRDN connection on FPGA 360 to OC5 on microprocessor 320 through NAND gate 411.4, which is configured as an inverter. A pull-up resistor 411.5 also connects line 418.2 to +5 VDC. Line 418.3 connects reset on FPGA 360 to OC2 on microprocessor 320. Line 418.4 connects RDY on FPGA 360 to IC3 on microprocessor 320. Line 418.5 connects INIT on FPGA 360 to IC2 on microprocessor 320, with 10K pull-up resistor 411.6 connecting line 418.5 to +5 VDC.

During normal operation of the hardware, handshaking is also provided to enable FPGA 360 to initiate interrupts in microprocessor 320, and to allow microprocessor 320 to poll FPGA 360 about the status of its interrupt. Line 418.8 connects IRQ, the interrupt request connection on microprocessor 320, to a connection labeled IRQ on FPGA 360. Further, a 10K pull-up resistor 411.7 connects line 418.8 to +5 VDC. This line enables FPGA 360 to initiate an interrupt on microprocessor 320 whenever line 418.8 is driven low. Lines 418.6 and 418.7 connect the PG0 and PG1 inputs of port G on microprocessor 320 to connections labeled IRQ1 and IRQ2 on FPGA 360, respectively. These lines enable microprocessor 320 to determine which of two interrupts were signaled by FPGA 360, by looking for an asserted signal on either line 418.6 or 418.7. The IRQ, IRQ1 and IRQ2 connections on FPGA 360 are user-defined, and their operation and configuration will be discussed shortly.

Figure 13:
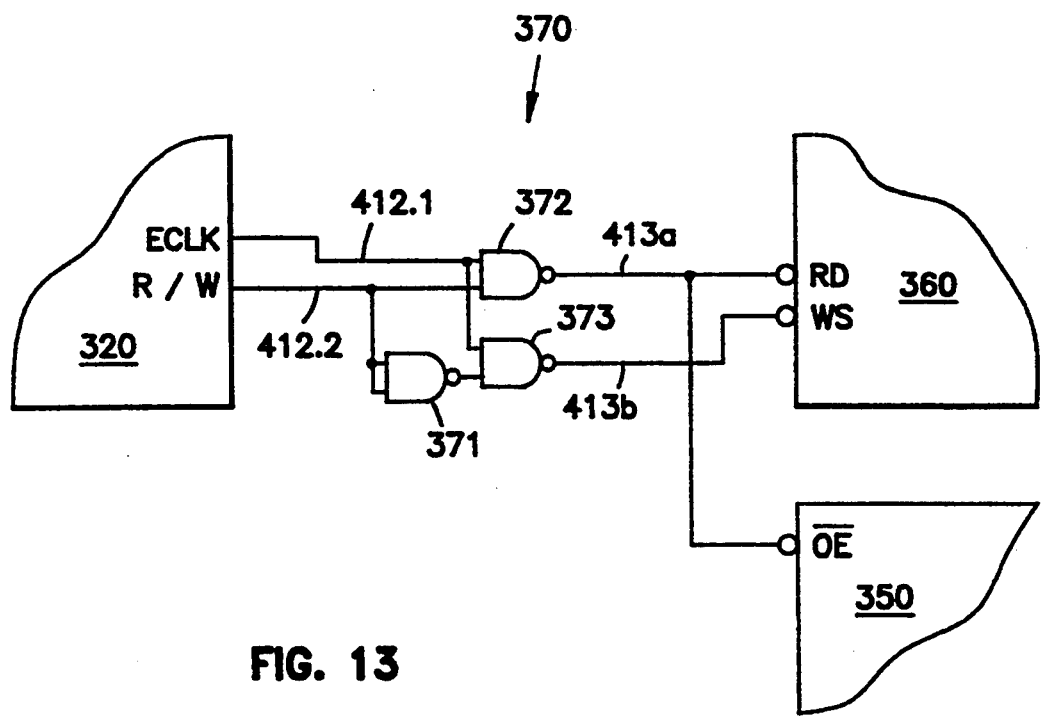
FIG. 13 is a schematic block diagram showing the read/write decoder circuit in FIG. 11.

FIG. 13 shows the read/write decoder circuit 370. This circuit essentially decodes the single read/write line on microprocessor 320 into separate read and write signals which are necessary for FPGA 360 and EPROM 350. Microprocessor 320 contains R/W connection which is asserted high during a read and low during a write. Further, connection ECLK provides an output for the internally generated E clock for timing reference. R/W and ECLK are connected to read/write decoder 370 through lines 412.1 and 412.2, respectively. NAND gates 371, 372 and 373 of read/write decoder 370 operate to provide active-low read and write signals on lines 413a and 413b, respectively. Each will be driven low whenever ECLK is high and the appropriate read or write signal is provided by R/W. Active-low read line 413a is connected to EPROM 350 at its active-low output enable connection OE. It is also connected to FPGA 360 at its active-low RD connection. Active-low write line 413b is connected to FPGA 360 at its active-low WS connection. While WS is a dedicated connection on FPGA 360, the RD connection is user-defined and will be discussed later.

Figure 14:
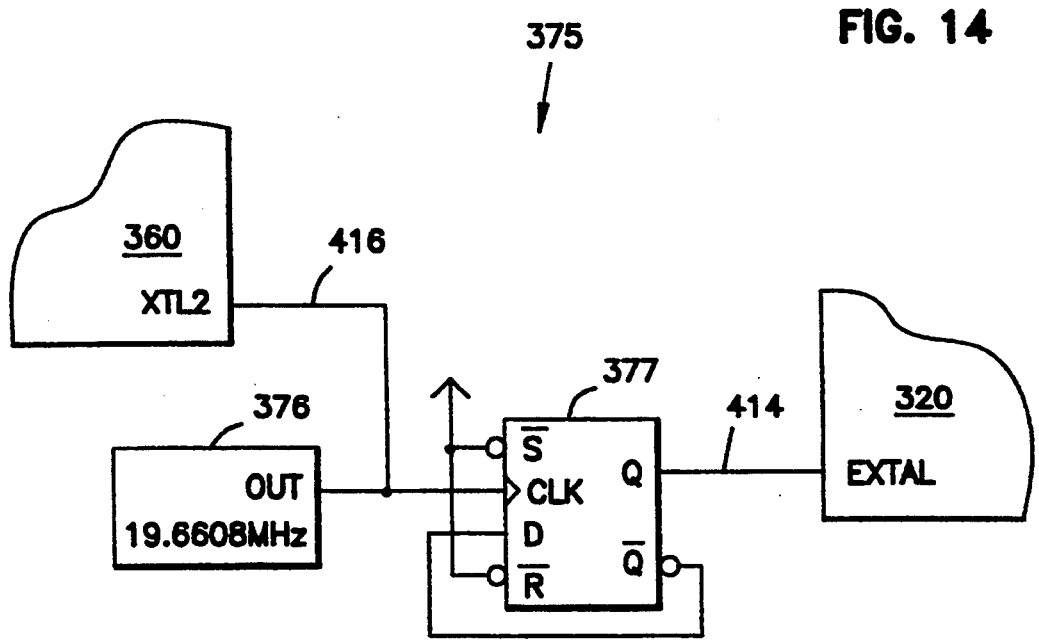
FIG. 14 is a schematic block diagram of the clock circuit shown in FIG. 11.

FIG. 14 shows clock circuit 375 which provides the clocking signals for microprocessor 320 and FPGA 360. This circuit includes crystal oscillator 376, which operates at 19.6608 MHz and provides the main clock signal for the load cell controller 300. The OUT connection of crystal oscillator 376 is applied to the XTL2 connection of FPGA 360 through line 416. This provides a 19.6608 MHz clock for use by the FPGA.

The OUT connection on oscillator 376 is also connected to the clock input of a 74HC74 flip flop. This flip flop is configured as a divide-by-2 frequency divider. With its set and reset pins connected to +5 VDC, and its active-low Q output connected to the D input, the active-high output Q will oscillate at ½ the clock frequency, which is roughly 9.8304 MHz. The active-high Q output is connected to the EXTAL connection of microprocessor 320 through line 414. With this clock signal on line 414, the microprocessor 320 will operate at 2.4576 MHz, which is ¼ the frequency provided by clock circuit 375.

Figure 15:
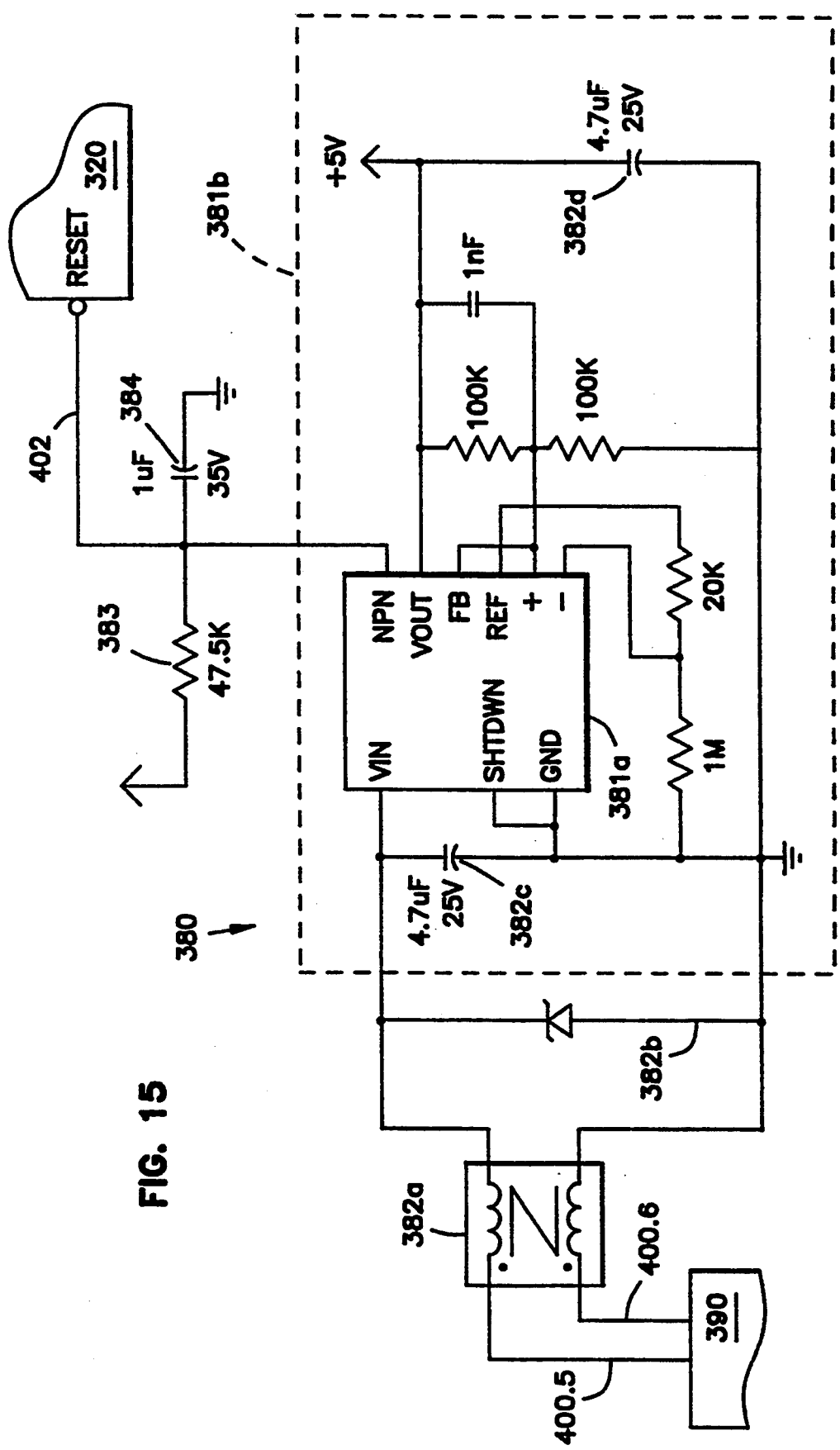
FIG. 15 is a schematic block diagram of the voltage regulator circuit shown in FIG. 11.

FIG. 15 shows the voltage regulator circuit 380. This circuit takes power provided in connection 390 across lines 400.5 and 400.6, which are typically biased to a 7 VDC or greater potential, and outputs a +5 VDC power signal for operating all of the integrated circuit chips on the controller board. The voltage regulator is essentially a Linear Technology LT1020CS micropower regulator and comparator 381a configured as a regulator with output voltage monitor. The associated circuitry, designated 381b, are the connections necessary to configure the voltage regulator chip 381a for providing a +5 VDC output voltage and a separate output voltage monitor signal. The configuration shown as 381b is well known within the art, and can be found, for instance, in a Linear Technology Data Sheet for voltage regulator chip 381a.

Minor additions have been made to the standard voltage regulator circuitry 381b. For instance, lines 400.5 and 400.6, which carry a 7 VDC or higher differential between one another, are connected to voltage regulator chip 381a through common mode filter 382a, transorb 382b and capacitor 382c. These three devices are required in order to comply with various FCC filtering, ESD and bypass requirements. Capacitor 382d, connected across the output of chip 381a, provides a similar function.

In addition to providing a +5 VDC power signal, voltage regulator circuit 380 has an output voltage monitor. This output voltage monitor will provide an active-low reset signal at connection NPNO on voltage regulator chip 381a whenever the voltage supplied by lines 400 drops below 4.75 volts. This active-low reset signal is connected to the RESET connection on microprocessor 320 through line 402. It is necessary to provide this signal in order to protect calibration data which has been stored in the EEPROM memory in microprocessor 320. Under power-up, power-down or brown-out conditions, the microprocessor will be reset in order to protect this memory. In order to prevent the microprocessor from restarting after a reset has been initiated, a delay circuit consisting of 47.5 K resistor 385 and 1 μF capacitor 384 is connected to line 402 so that any signal asserted on line 402 will remain low for approximately 50 milliseconds after a reset request has been discontinued.

Figure 16:
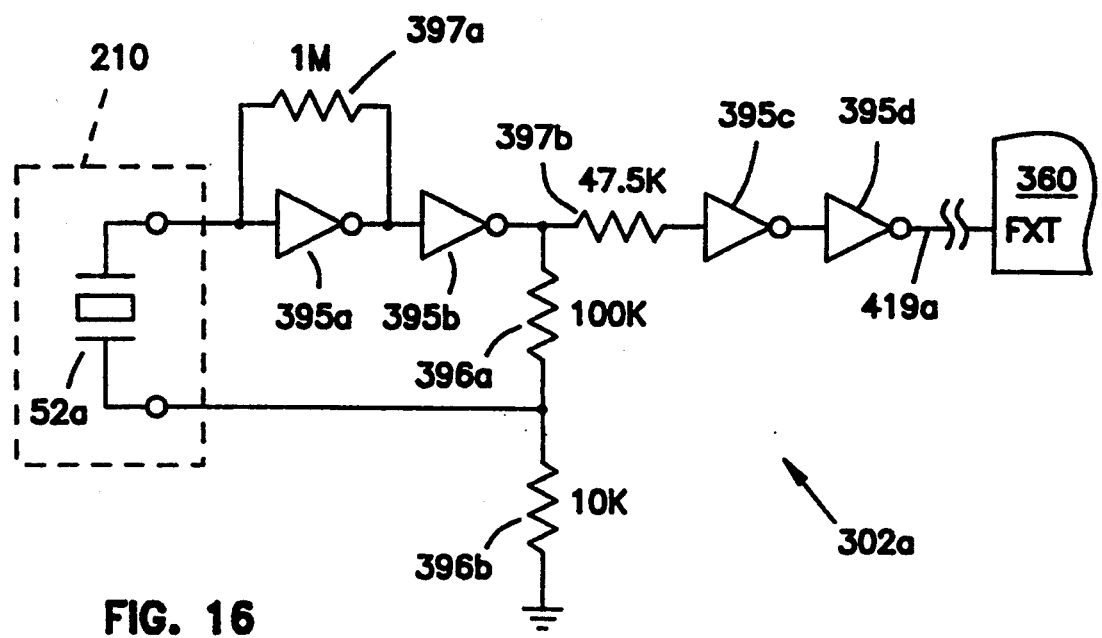
FIG. 16 is a schematic block diagram of the tension oscillator driving circuit shown in FIG. 11.

FIG. 16 shows the oscillator driving circuit 302a for driving tension resonator 52a on load cell 210 at its resonant frequency. Tension oscillator circuit 302a contains four inverters, numbered 395a, 395b, 395c, and 395d. These four inverters are preferably contained on a single 4069 hex inverter integrated circuit chip. The first two of these inverters, 395a and 395b, are connected in a positive feedback configuration with tension resonator 52a connected in the feedback loop. It is well known that whenever an amplifying circuit is connected having positive feedback, with the input and output of the amplifier in phase, oscillation will naturally occur. The frequency of oscillation in this case will be equal to the resonant frequency of tension resonator 52a. Inverters 395a and 395b each have a gain of approximately 5. Consequently, the feedback loop containing tension resonator 52a is connected through a voltage divider circuit comprised of 100K resistor 396a and 10K resistor 396b. This voltage divider circuit essentially divides the output of inverter 395b by 10 in order to compensate for the gain of 10 provided by the two inverters 395a and 395b. This ensures that the oscillating circuit will remain stable, and that tension resonator 52a will not be overdriven. Also, 1M bias resistor 397a is connected across inverter 395a in order to keep this inverter in its normal operating range.

The output of inverter 395b, which is the output of the positive feedback amplifier, is applied to the series connection of 47.5K resistor 397b, inverter 395c and inverter 395d. This series connection keeps the output in phase while amplifying the signal to the point at which it overdrives each of the inverters so that they clip off the output signal. The output therefore will more resemble a square wave. The output of this circuit is connected to FPGA 360 at its FXT connection through line 419a. The FXT connection on FPGA 360 is a user-defined pin, and will be described later.

The corresponding compression oscillator 302b is identical to tension oscillator 302a, and is not shown separately. Although it would be feasible to place some of the inverters required for compression oscillator 302b on the same hex inverter chip as the inverters for tension oscillator 302a, it is preferable to use separate chips for these purposes, in order to reduce crosstalk between the respective circuits. The output of compression oscillator 302b is line 419b, which connects to FPGA 360 at its user defined connection FXC.

One skilled in the art will appreciate that any number of alternative oscillating circuits may be used in order to drive resonators 52a and 52b. It is necessary for any such oscillating circuits to enable a resonator to oscillate at its resonant frequency, without overdriving the resonator to the point at which it might fail.

Figure 17:
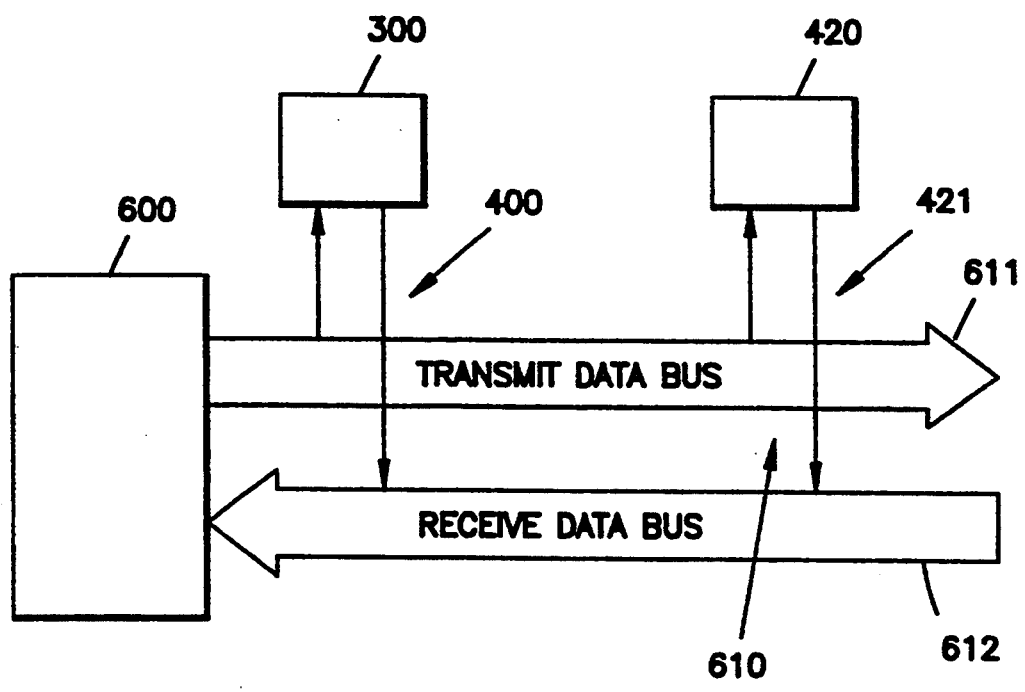
FIG. 17 is a schematic block diagram of a load cell bus for the counting scale of FIG. 1, consistent with a preferred embodiment of the invention.

Load cell controller 300 communicates with the outside world by means of the serial communications interface (SCI) of microprocessor 320. As shown in FIG. 17, load cell controller 300 is connected to a load cell bus 610 which is primarily driven by a master controller which depends on the application in which the load cell assembly 200 is being used. For the application of load cell assembly 200 in counting scale 70, the master controller for the load cell bus 610 is control system 600.

Load cell bus 610 has separate transmit and receive data buses 611 and 612, in order to minimize collisions between scale control system 600 and any load cell controller. A single bus could also be used; however, more data checking would be required in order to prevent collisions between the master control system and the load cell controllers. The communication protocol for each of the transmit and receive data buses 611 and 612 on load cell bus 610 is preferably the EIA RS485 standard, which is commonly known in the art. The RS485 standard transmits data across buses as differential values on pairs of balanced lines. In this protocol, each wire in a balanced pair carries a signal which is essentially an inverted version of its partner's signal. This standard is especially suitable for long runs of wires or for wires which are exposed to electrostatic or electromagnetic noise, because the differential signals provided on the balanced lines are less susceptible to errant data resulting from noise or signal deterioration. The RS485 standard also has the ability to connect 32 separate drivers and receivers across a data bus. This is especially suitable for applications such as counting scale 70, since a number of load cell assemblies may be connected to the data bus and controlled by a single controller, such as control system 600. One skilled in the art will appreciate that any well-known communications protocol, including serial or parallel protocols, may be alternately used to enable communication to and from load cell controller 300.

As can be seen from FIG. 17, each load cell controller is connected in parallel to the load cell bus. For instance, load cell controller 300 for load cell assembly 200 is connected to load cell bus 610 through its lines 400, and through connector 390 (not shown). More specifically, lines 400.1 and 400.2 (not shown separately), which Constitute the differential transmit data from controller 300 are connected in parallel to receive data bus 612, which is a RS485-compatible differential wire pair (separate wires not shown). Likewise, lines 400.3 and 400.4 (not shown separately), which constitute the differential data which is received by controller 300, are connected in parallel to the transmit data bus 611, which is also a RS485-compatible differential wire pair (separate wires not shown). Up to 32 load cell assemblies can be connected to the load cell bus 610 in this manner, as shown, for example, by lines 421 connecting load cell controller 420 of load cell assembly 425 to transmit and receive buses 611 and 612 of load cell bus 610.

The parallel configuration for each load cell assembly on bus 610 is preferable due to the ease of connection to individual load cell assemblies. One skilled in the art will appreciate that a series connection or any other network or bus configuration of the load cell assemblies on bus 610 would also be feasible in this system.

Using this load cell bus 610, data is preferably transmitted at the rate of 9600 bits per second. Scale control system 600 is capable of sending a multitude of commands to individual load cell assemblies, as well as receiving data back from these assemblies. The various commands that are available across load cell bus 610 will be discussed later.

Serial data communication for controller 300 is provided by the SCI interface on microprocessor 320. This interface operates in a single line non-return-to-zero (NRZ) protocol. In order to convert back and forth between the NRZ and RS485 protocols, controller 300 includes RS485 communications block 385. RS485 communication block 385 is connected to the serial communications interface (SCI) of microprocessor 320, and it serves to configure NRZ data sent by microprocessor 320 into an RS485-compatible format, and to convert received RS485-compatible data into the NRZ format which is recognizable by microprocessor 320.

Figure 18:
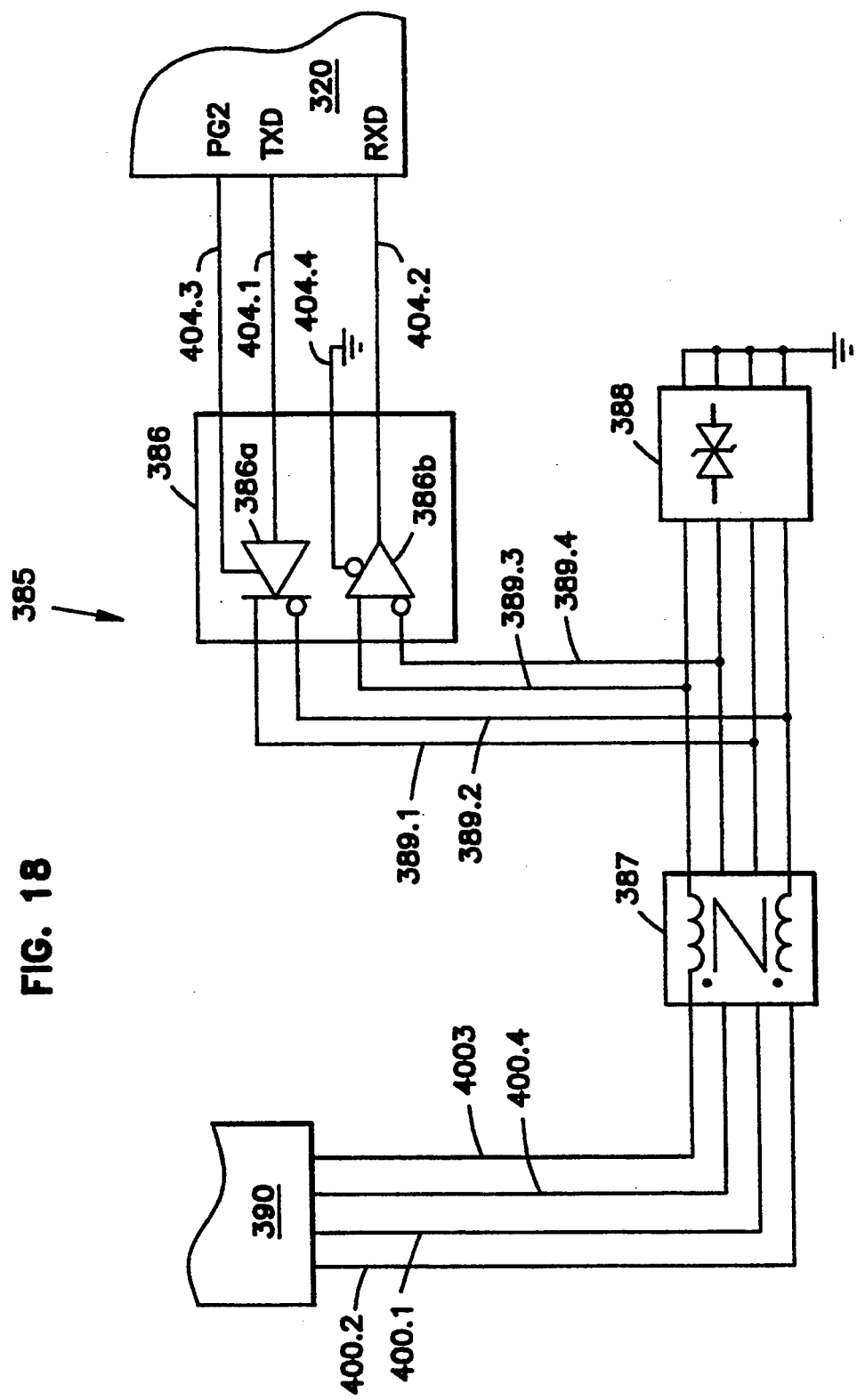
FIG. 18 is a schematic block diagram of the RS485 communications block shown in FIG. 11.

FIG. 18 shows the RS485 communications block 385. The RS485 communications block 385 primarily contains a Linear Technologies LTC491 RS485 driver 386, which is capable of converting differential RS485-compatible signals into single-line NRZ format and vice versa. RS485 driver 386 contains a transmitter circuit 386a and a receiver circuit 386b. A transmitter 386a is connected to the TXD connection on microprocessor 320 through line 404.1. Further, transmitter 386a is connected to differential lines 389.1 and 389.2 which carry a RS485 compatible differential signal thereon.

Similarly, receiver 386b is connected to the RXD connection on microprocessor 320 through line 404.2. The inputs to receiver 386b are connected to RS485-compatible differential signal lines 389.3 and 389.4.

RS485 driver 386 also includes driver enable lines, which selectively enable transmitter 386a and receiver 386b. It is preferable that transmitter 386a only be enabled during a transmit operation by microprocessor 320; consequently, this control is provided across line 404.3, which is connected to port G of microprocessor 320 at connection PG2. It is also preferable that receiver 386b remain on so that it is always capable of receiving information across the load cell bus. Receiver 386b is permanently enabled by tying line 404.4 to ground.

Differential transmit lines 389.1 and 389.2 are connected to lines 400.1 and 400.2, respectively, which run to external connector 390. Similarly, differential receiver lines 389.3 and 389.4 are connected to lines 400.3 and 400.4, respectively, which also are connected to external connector 390. In between lines 389 and 400 is common mode filter 387, which is preferred for FCC compliance. Further, lines 389 are also connected to ground through transorb package 388, which provides electrostatic discharge protection. Both common mode filter 387 and transorb 388 are well known in the art, and do not alter the communication function of RS485 communication block 385.

3. FPGA Configuration

FIGS. 19–24 show functional block diagrams for the operation of FPGA 360. FPGA 360, which is preferably a Xilinx XL3030, performs the functions of frequency dividers 304a and 304b, time base frequency counter 305, and input capture latches 306a and 306b, which are shown on FIG. 10. The FPGA essentially takes the frequency signals $f_T$ and $f_C$ obtained by oscillating circuits 302a and 302b, which are preferably in the range of 47 kHz, and converts the signals into 22-bit digital representations of the frequency, $f_{TB} \times n/f_T$ and $f_{TB} \times n/f_C$.

The XL3030 FPGA contains a $10 \times 10$ array of configurable logic blocks which may be interconnected and configured in various ways to perform a multitude of combinatorial functions. The FPGA also has a number of input/output blocks around the periphery of the chip which provide various forms of buffering and latching for passing information to and from the chip. The FPGA must be configured each time it is powered up. This is accomplished by microprocessor 320 in this case, using information which is stored in EPROM 350. The hardware connections which are necessary for microprocessor 320 to program FPGA 360 were discussed, supra, and shown in FIG. 12. The configuration sequence which is required to program FPGA 360 is known in the art, and may be found, for instance, in the Programmable Gate Array Data Book, which is published by Xilinx, Inc.

The design of the configuration data may be greatly facilitated by using a CAD system to functionally generate the logic blocks which are necessary for the particular application, and using a compiler system to take the functional design and perform automatic placing-and-routing of the functional blocks into the particular hardware configuration of the FPGA. Using such a compiling system, a compact binary code may be obtained which can be stored in a separate non-volatile memory and uploaded to the FPGA during a power-on sequence. One such system known in the art is the XDM system produced by Xilinx, Inc. which contains a number of programs that facilitate the design and configuration of Xilinx FPGA's.

As the use and operation the XDM system is known in the art, no discussion will be provided herein of the precise binary code which is preferably programmed into FPGA 350. It is believed that a worker trained to use a CAD system such as XDM would be capable of applying the functional diagrams shown in FIGS. 19–24, and discussed infra, to obtain the necessary binary configuration data. However, various programming tips will be provided herein which would be beneficial in creating suitable configuration data for FPGA 360. In addition, in order to facilitate design of the FPGA a number of library blocks may be used, which are provided as part of a CAD system. Such items as counters and latches can be simply obtained from a library rather than designed down to the logic gate level. Some custom design may; however, be preferable when special space or speed limitations are placed on the design of a block.

Figure 19:
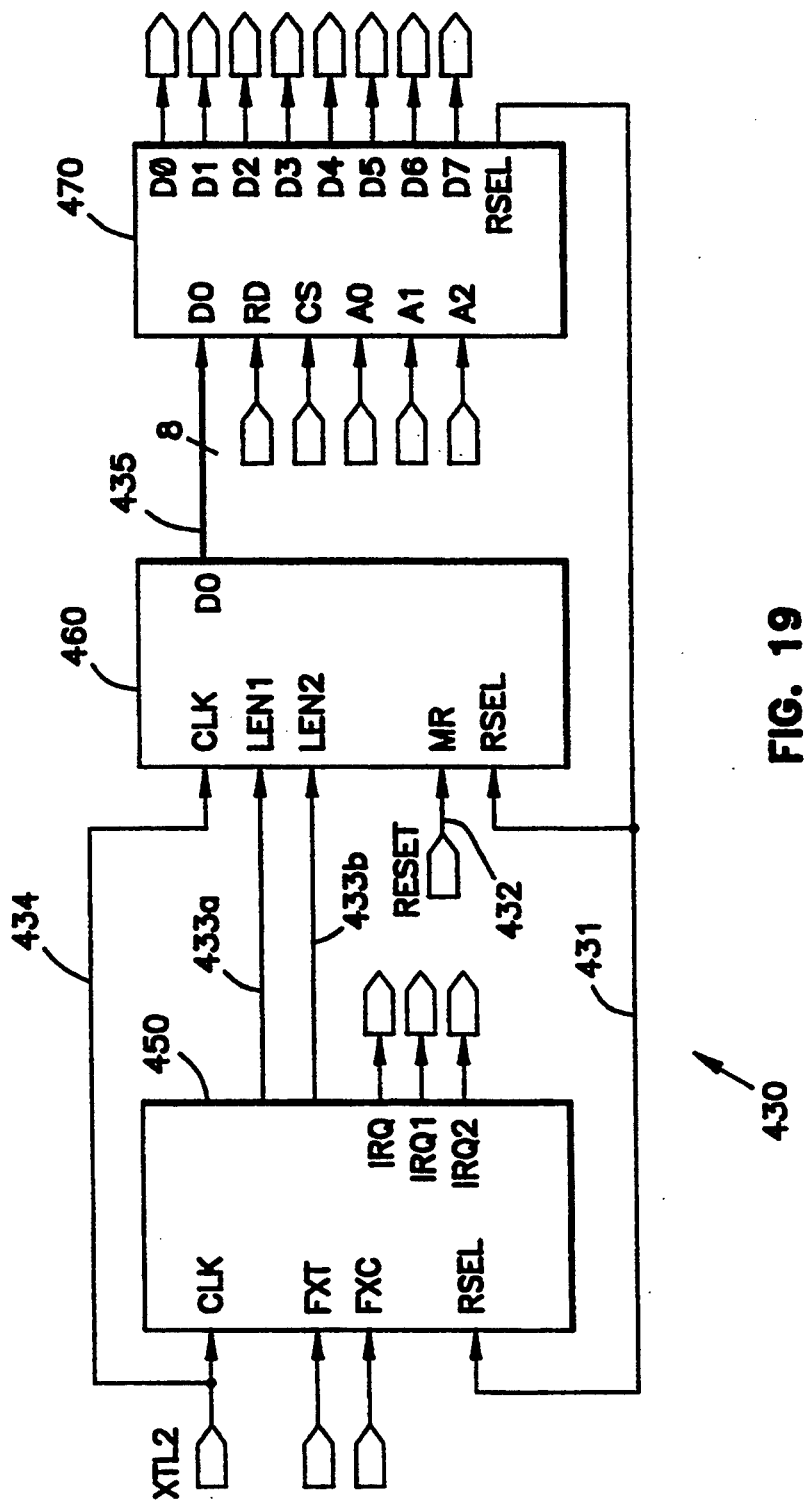
FIG. 19 is a functional block diagram depicting a preferred internal configuration of the FPGA shown in FIG. 11.

FIG. 19 shows a block diagram of the functions performed by FPGA 360. Block 450 is a frequency prescaler block which primarily performs the frequency divider functions of blocks 304a and 304b in FIG. 10. In addition to performing the frequency divider function, this block also provides interrupt request signals to external pins on the chip for signalling interrupts to microprocessor 320. Frequency prescaler block 450 has a number of external pin connections, which are indicated in FIG. 19 by five-sided blocks. Block 450 has inputs corresponding to the external connections FXT and FXC, which contain the frequency signal from oscillating circuits 302a and 302b, respectively. Block 450 also has a CLK input which is connected to the XTL2 external connection by line 434. The XTL2 connection carries the clock signal which is received from clock circuit 375. Block 450 also has outputs which are connected to external connections IRQ, IRQ1, and IRQ2. These connections provide the interrupt handshaking between FPGA 360 and microprocessor 320.

Block 450 also has internal connections to blocks 460 and 470 in FIG. 19. STB1 and STB2 in block 450 are connected to LEN1 and LEN2 of block 460 by lines 433a and 433b, respectively. Lines 433a and 433b contain the gating signals for input capture latches 306a and 306b, designated $f_T/n$ and $f_C/n$, respectively. Block 450 has a group of register select lines designated RSEL, which are connected to block 470 by line 431. These RSEL connections are used by the FPGA to reset the interrupt requests which are present at the IRQ, IRQ1 and IRQ2 connections.

Block 460 is the counter/latch block which provides the functions of the time base frequency counter 305 and input capture latches 306a and 306b shown in FIG. 10. In addition, counter/latch block 460 includes tri-state buffers for selectively reading the information stored in the input capture latches.

Block 460 includes a master reset input MR which is connected by line 432 to the RESET external connection. Further, block 460 includes a CLK input which is connected to XTL2 external connection by line 434, for providing a clock signal to the block. Lines 433a and 433b connect the LEN1 and LEN2 internal inputs of block 460 to the STB1 and STB2 outputs of block 450, respectively. Also, DO output of block 460, which is preferably an 8-bit data bus, is connected to the DO input of 470 through FPGA data bus 435, and the RSEL input of block 460 is connected by lines 431 to the RSEL output of block 470.

Block 470 is the data bus interface block which provides much of the control for information flow between FPGA 360 and microprocessor 320. Block 470 has a DO internal input which is connected by the 8-bit data bus 435 to the connections in the DO output of block 460, and a RSEL internal output which is connected by line 431 to blocks 450 and 460. In addition, a number of external connections are connected to block 470, including RD and CS for microprocessor 320 to enable a read operation, and connections A0, A1, and A2 which are connected to A0, A1, and A2 of address bus 406, respectively. As output, block 470 has connections to external connections D0–D7, which are connected to data bus 408.

Figure 20:
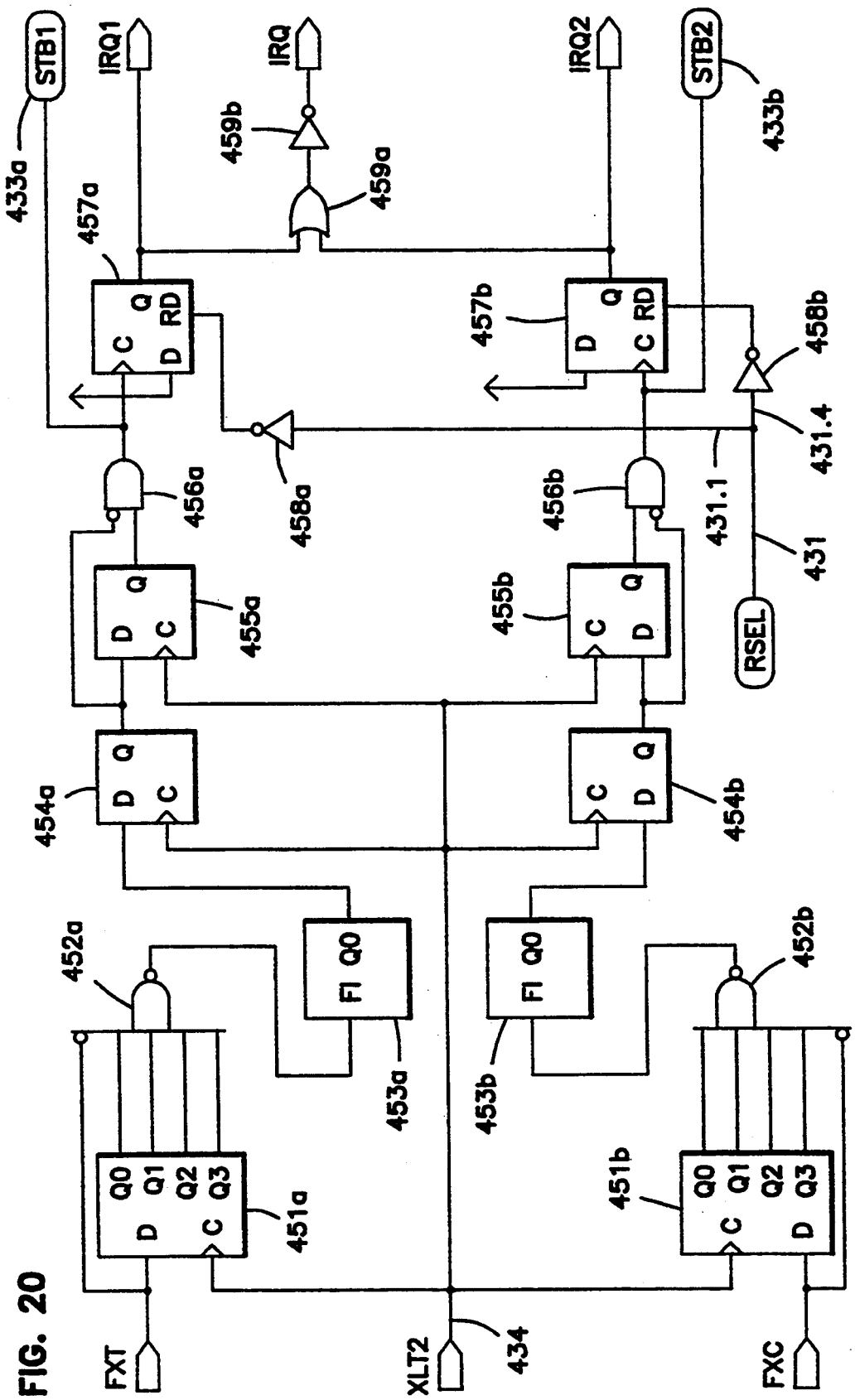
FIG. 20 is a functional block diagram of the frequency prescaler block shown in FIG. 19.

FIG. 20 shows a functional block diagram of the frequency prescaler block 450. This block contains identical logic circuits for processing the frequency inputs from oscillating circuits 302a and 302b.

The signal at external connection FXT, which is connected to tension oscillating circuit 302a, is first applied to a debounce circuit which consists of 4-bit shift register 451a and gate 452a. The FXT connection is applied to the D input of shift register 451a. It is also connected to an active-low input on AND gate 452a. AND gate 452a also has as its inputs the Q0–Q3 outputs of shift register 451a. Shift register 451a is gated at its clock input C by the clock signal present on line 434, coming from external connection XLT2.

This debounce circuit operates to generate a pulse output from AND gate 452a upon the falling edge of the tension oscillator frequency signal at connection FXT. A pulse is output from this circuit only when a high value is present at the D-input of shift register 451a for at least four clock cycles, and after the D input has gone low at the next cycle. At this point, all of the Q0-3 outputs of shift register 451a will be high, so the output of gate 452a will be high. The output of gate 452a will therefore consist of a pulse which is one clock period wide for each oscillation of the tension resonator. It has been found that this circuit, or another circuit similar thereto, is necessary because the clock on the FPGA is much faster than the rate of oscillation for the tension oscillator. This circuit provides that once a high-to-low transition has occurred in the oscillator, and an appropriate output pulse has been generated, no other output pulses will be generated for at least 5 clock cycles. This prevents multiple pulses from being generated by one high-to-low transition of the oscillator signal.

The output of AND gate 452a, which consists of a one clock period wide pulse at frequency $f_T$, is applied to the FI input of ripple counter 453a. Ripple counter 453a is a 12-bit counter, the design of which is well known in the art. This counter can free run without the need for being reset, and it will increment each time it receives a pulse at its FI input. The output of counter 453a, Q0, is bit 12 of the counter. It will essentially be a square wave having a 50% duty cycle and a period of 4096 oscillations of tension resonator 52a. It is this counter which performs the function of the divide-by-n frequency divider 304a which is shown in FIG. 10. Using a 12-bit counter as shown here, n equals 4096. One skilled in the art will appreciate that in order to obtain different values of n, different size counters, or other frequency divider or counter circuits may be used alternatively.

The output of ripple counter 453a is applied to a strobe generator which consists of two 1-bit shift registers 454a and 455a, and gate 456a. This circuit operates to generate a pulse signal which is one clock period wide at the high-to-low transition of output Q0 of counter 453a. Both shift registers are clocked by the clock signal present on line 434. The circuit operates such that when output Q0 of counter 453a is high, both outputs Q of shift registers 454a and 455a will be latched high. Upon a transition of output Q0 of counter 453a from high to low, shift register 454a will latch a low value, shift register 455a will latch a high value which was stored previously in shift register 454a, and gate 456a will go high for one clock period. The output of this circuit is line 433a, and it connected to internal connection STB1, for communication with counter/latch block 460. The frequency of this output signal will be $f_T/n$, where n equals 4096, and the signal will be a pulse one bit wide at the high-to-low transition of Q0 of counter 453a.

It is preferable that for each high to low transition of output Q0 of ripple counter 453a that an interrupt be signaled to microprocessor 320, so that the microprocessor knows that a new value has been captured by the FPGA. This function is provided by interrupt latch 457a. This latch has a D input tied to high, and its clock input tied to the output of AND gate 456a, which is line 433a. This latch is configured so as to generate a high signal at its output Q whenever a pulse is received on line 433a. This latch 457a is connected to external connection IRQ1, and will continue to hold a high value until latch 457a is reset. This reset is performed by asserting a high signal at the RD input of latch 457a. The RD input is connected to the RSEL control provided by block 470, across line 431.1 and through inverter 458a. As will become more evident later, latch 457a will be reset whenever line 431.1 is asserted low, which occurs when microprocessor 320 is reading the low byte of the tension latch in block 460.

Similarly to the processing performed on the signal found at FXT, frequency prescaler block 450 also generates signals for compression oscillator circuit 302b. The signal at external connection FXC is applied to the D input of 4-bit shift register 451b and the active-low input of AND gate 452b, which together comprise a debounce circuit. The output of this circuit, which is a pulsed signal having a frequency of $f_C$ and a pulse width of one clock period, is applied to 12-bit ripple counter 453b. The output of ripple counter 453b is bit 12 of the counter, and the signal is a 50% duty cycle square wave with a frequency of $f_C/4096$. The output of counter 453b is applied to the strobe generator which is comprised of shift registers 454b and 455b and gate 456b. This strobe generator circuit produces a signal on internal connection STB2, which is connected to line 433b for communication with counter/latch block 460. The signal present at STB2 is a pulse which is one clock period wide, and which occurs at the high-to-low transition of the output of counter 454b. The frequency of this signal is $f_C/4096$. One skilled in the art will appreciate, however, that any number n may be used as opposed to 4096, to count n oscillations of compression resonator 52b.

The output of the strobe generator is applied to the clock input of interrupt latch 457b, which has an input D tied high, such that the output Q of latch 457b will remain high whenever a pulse is generated at STB2. This output is connected to the external connection IRQ2 for handshaking with microprocessor 320. Latch 457b is likewise reset by asserting a high signal at its RD input, which is connected through inverter 458b to internal connection RSEL by line 431.4. This will operate, as will be discussed later, to reset the output of this latch whenever microprocessor 320 attempts to read the low byte of the compression latch in counter/latch block 460.

The outputs of the two interrupt latches 457a and 457b are each applied to an interrupt request circuit which is comprised of OR gate 459a and inverter gate 459b. As can be seen in FIG. 20, external connection IRQ will be asserted low whenever either latch 457a or 457b indicates a high value at either of IRQ1 or IRQ2, respectively. As can be seen later, external connection IRQ, when asserted low, will initiate the interrupt mechanism in microprocessor 320.

Figure 21:
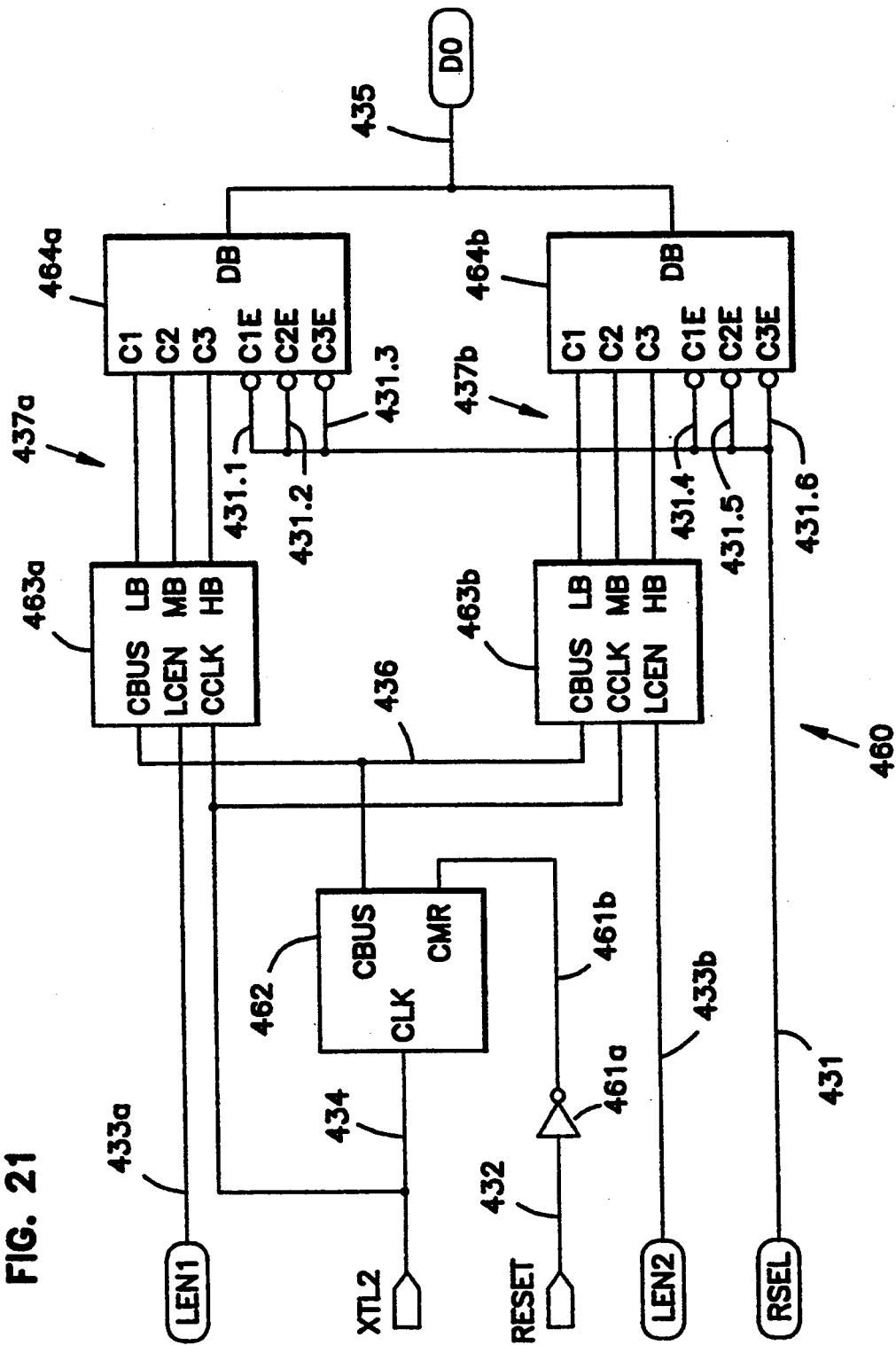
FIG. 21 is a functional block diagram of the counter/latch block shown in FIG. 19.

FIG. 21 shows the counter/latch block 460. This block has 24-bit counter 462, which corresponds to time base frequency counter 305 on FIG. 10. Further, this block has 24-bit latches 463a and 463b, which correspond to the input capture latches 306a and 306b, respectively, on FIG. 10. Block 460 also has tri-state buffers 464a and 464b, which enable microprocessor 320 to control which of the six bytes of information will be displayed across the FPGA data bus 435.

Counter 462 is clocked at its CLK input by the external clock generated at connection XTL2 and provided on line 434. This clocking signal enables the counter to run at a rate of 19.6608 MHz. Further, counter 462 has a master reset input CMR, which is connected to the external connector RESET across line 432, inverter 461a and line 461b. Inverter 461a simply generates an active-high signal from the active-low signal received at external connector RESET. The current data stored in counter 462 is provided as an output to the block at its CBUS connection, which is connected to the CBUS connections on latches 463a and 463b by the 24-line counter bus 436.

Counter 462 is enabled to free run at the clock rate of 19.6608 MHz, and will only be reset whenever an active-low signal is asserted at the external connection RESET. Latches 463a and 463b are each able to latch into the current value on counter bus 436 individually to store the current value of counter 462.

Latch 463a is the tension latch for storing the counter value for the tension resonator circuit. Likewise, latch 463b is the compression latch for storing the counter value for the compression resonator circuit. Each of latches 463a and 463b contains inputs for the counter bus 436 at their inputs CBUS. Further, each of these latches has separate clocking and enable inputs. Both latches are clocked at their respective CCLK inputs, which are each connected to clock line 434. The enable connection LCEN on latch 463a is connected to the LEN1 internal connection over line 433a which is controlled by STB1 from block 450. Similarly, the enable connection LCEN on latch 463b is connected to internal connection LEN2 over line 433b, which is controlled by STB2 from block 450. Each of these latches operate to store the current value found on counter bus 436 whenever their respective enable line, 433a or 433b, is asserted at the beginning of a clock cycle. The function performed is that of the gating signal on input capture latches 306a and 306b, which capture the current reading of time base frequency counter 305, on FIG. 10. Each of the 24-bit outputs on latches 463a and 463b is broken into a low byte (seen at connection LB), a middle byte (seen at connection MB) and a high byte (seen at connection HB).

All of the byte-wide outputs for tension and compression latches 463a and 463b are applied over lines 437a and 437b to tri-state buffers 464a and 464b, respectively. Tri-state buffers 464a and 464b each contain a bank of tri-state latches which connect the three byte-wide components of the data latched into tension and compression latches 463a and 463b to a data bus connection DB, which is one byte wide and connected to the DO connection of block 460 on FPGA data bus 435. Further, each of these latches contains three enable connections, C1E, C2E, and C3E, which are connected to the RSEL bus over lines 431. Each of these lines, if asserted, will enable the outputs of their respective bank of tri-state buffers, connecting their respective byte of latched information to the FPGA data bus 435. Each line 431 can be individually asserted by microprocessor 320 selecting an address on the address bus. The generation of lines 431 from a microprocessor request will be explained in relation to block 470. Therefore, whenever RSEL line 431.1 is asserted, the low byte LB stored in latch 463a will be placed on the DO data bus 435. Likewise, if any of lines 431.2 to 431.6 are asserted, their respective bytes, MB of 463a, HB of 463a, LB of 463b, MB of 463b, or HB of 463b, will be placed on bus 435, respectively.

Due to the high speed time base frequency clock used in FPGA 360, care should be taken to provide accurate counting and latching by counter 462 and latches 463a and 463b. For instance, the STB1 and STB2 connections shown on FIG. 20 should be given routing priority by the FPGA compiling system. This will minimize the delays by ensuring that these lines will routed to avoid unnecessarily long runs of wire.

Figure 22:
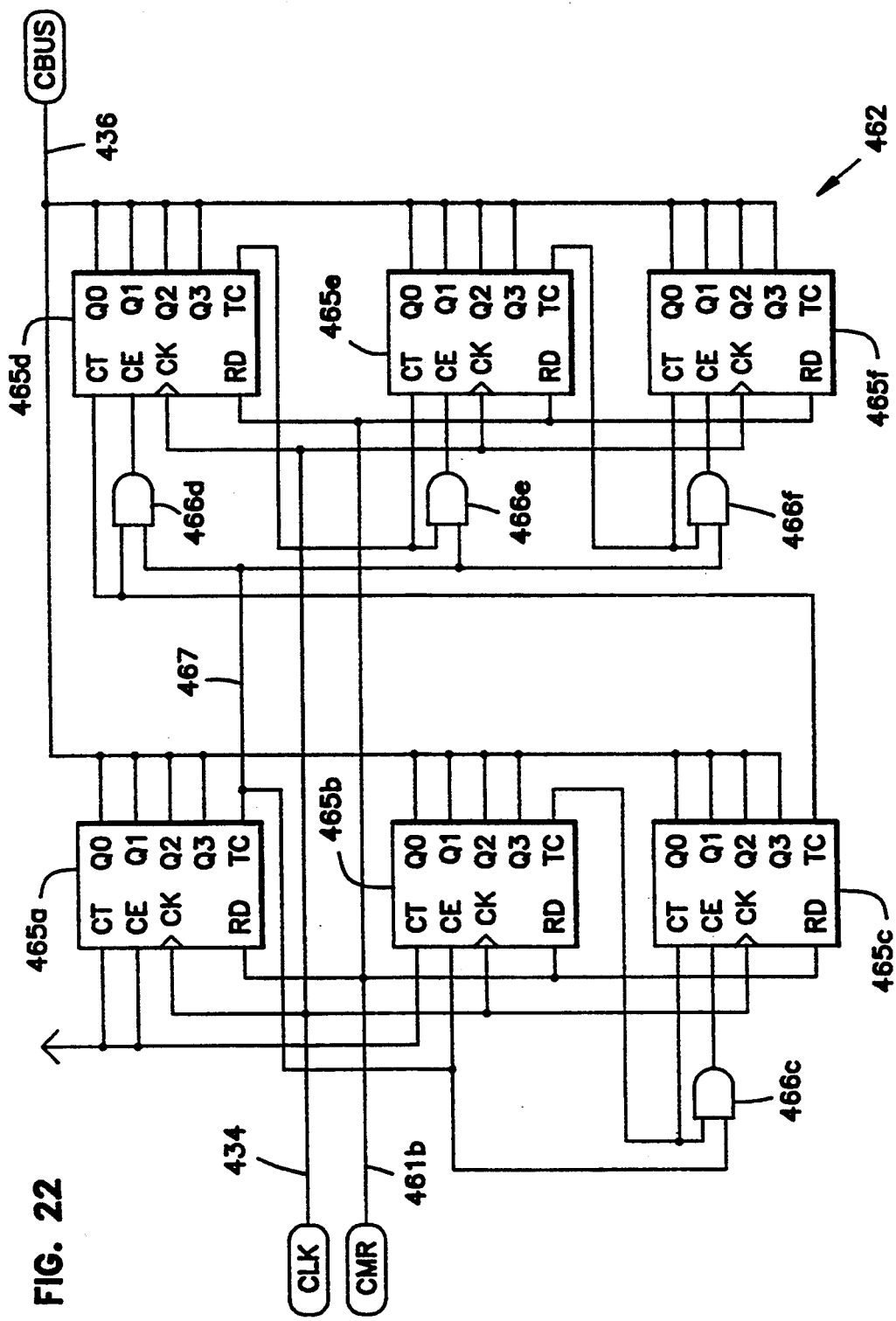
FIG. 22 is a functional block diagram of the counter shown in FIG. 21.

As shown in FIG. 22, a preferred configuration for counter 462 is shown, which provides a fast counting circuit that enables the count value to become stable quickly, preferably within 20 ns after a clock signal is provided on line 434. It is especially problematic when working with high clock rates if the respective bits on counter bus 436 do not stabilize at the same time because the latches may store errant bits which result from a late transition of some of the bits in the output of counter 462. This preferred configuration should provide a stable counter bus within the required time.

Counter 462 is shown in FIG. 22 as having six 4-bit counter blocks 465a–465f. Each of these blocks has a count trickle enable input CT, a count enable connection CE, a clock input CK and a reset direct input RD. Further, each block has as an output a 4-bit count value Q0–Q3, and counter carry bit TC. Each block is connected to the clocking signal found on line 434, and each block is tied to the direct reset line 461b at its respective RD connection. For block 465a, its CT and CE inputs are tied high, so that this counter will increment at each clock cycle. Block 465b has its CT input connected to high, and its CE input connected to the TC output of block 465a, so that it will count whenever the TC output of 465a is asserted (when counter 465a carries over). The remaining counter blocks 465c–465f are configured such that their CT inputs are tied to the TC output of their previous counter block in the chain (e.g., the CT input of block 465c is connected to TC output of block 465b). Further, the CE input of each of these blocks is connected to the output of an AND gate 466c–466f, which has as its inputs line 467 which is connected to the TC output of counter block 465a, and the same TC input from the previous block in the chain that was tied to the CT input of the block (e.g., TC input for block 465b for the CE input of block 465c).

Each of blocks 465a–465f is configured as a 4-bit binary counter, which is similar in function and design to a 74161 binary counter which is well known in the art. Further, it is preferable that each 4-bit counter block be configured in the CAD system to be mapped into two configurable logic blocks on the FPGA by the CLBMAP function provided by the compiler. It is preferable that outputs Q1 and Q0 be generated in one block, and outputs Q2 and Q3 generated in the other block. This will ensure that the counter blocks will fit in the least amount of space, with the shortest runs of wire providing minimal line delays. Also, it is preferable to provide routing priority to the line containing the TC output of block 465a, designated line 467 on FIG. 22. This ensures that this line is routed such that the delays provided are minimized as it changes at a high rate.

Returning to FIG. 21, the preferred design for tension latch 463a and compression latch 463b are now described. Due to the high clock rate used, it is critical that latches 463a and 463b are able to latch each bit on counter bus 436 substantially simultaneously, so that different bits in the latches do not reflect different counter bus values on bus 436. Each latch, such as latch 463a, is preferably configured in the CAD system as six separate 4-bit latches. On each latch, two of the six latches handle the low byte of counter bus 436 (bits 0–7), and are connected to the LB connection on block 463a. Similarly, two of the latches connect the middle byte of counter bus 436 (bits 8–15) to the MB connection on block 463a, and two latches connect the high byte of counter bus 436 (bits 16–23) to the HB connection of block 463a. Each of these 4-bit latches, which are not shown, contains four identical 1-bit high-speed latches, for a total of 24 1-bit latches in each latch, 463a and 463b.

Figure 23:
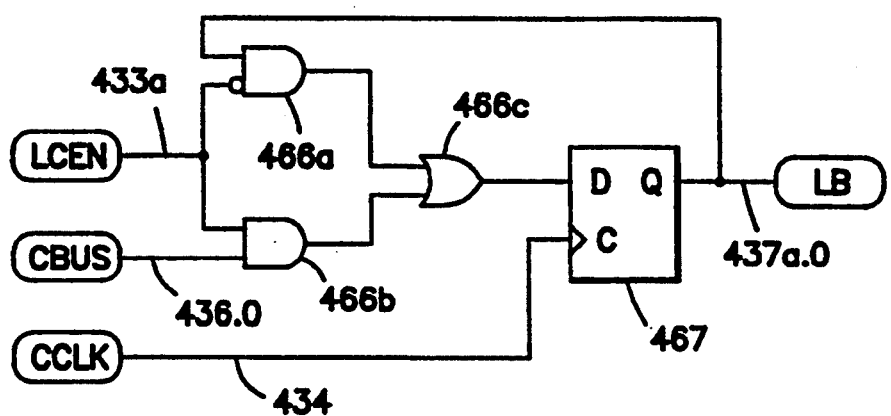
FIG. 23 is a functional block diagram of a 1-bit latch for use with the latches shown in FIG. 21.

FIG. 23 shows, as an example, the 1-bit latch in tension latch 463a, for latching bit 0 of counter bus 436. This latch has separate clock and enable lines. The clock line 434 is connected to the clock input C of D flip-flop 467. The enable line, which is found at connection LCEN of block 463a, and which is essentially the strobe line STB1 received on line 433a, is connected through a combinatorial logic circuit having AND gates 466a and 466b and OR gate 466c connected to the D input of flip-flop 467. The enable line, shown as 433a, is connected to an active-high input of AND gate 466b, and to an active-low input to AND gate 466a. AND gate 466b further has an active-high input which is connected to the data to be latched (shown here as 436.0, which contains bit 0 of counter bus 436). Likewise, AND gate 466a has at its active-high input the Q output of flip-flop 467. Each of the AND gates is tied to an input of OR gate 466c, which is connected to input D of flip-flop 467. This circuit operates such that, depending on the value seen at the LCEN enable line input, flip-flop 467 will latch either the value of the particular counter bus line 436, or the last value which was stored in flip-flop 467 and provided at output Q. Therefore, in this configuration, latch 467 will maintain its same value until the strobe line at input LCEN goes high, where the new value on the counter bus will then be stored as the new value in flip-flop 467. The output of flip-flop 467, incidentally, will be connected to lines 437a or 437b (depending on which bit of counter bus 436 is being latched), which in this case is bit 0 of the LB connection for latch 463a, seen at line 437a.0.

The latch shown in FIG. 23 is designed to have separate enable and clock signals which are provided to all 48 1-bit latches (24 in latch 463a and 24 in latch 463b). This enables each latch, at the appropriate assertion of the clock signal, to latch the value of counter bus 436 substantially simultaneously, and preferably within 2 ns. The speed of the latches is preferably increased further by using the CLBMAP function of the CAD system to ensure that two of the latches shown in FIG. 23 will be tied to a single configurable logic block, such that each 4-bit latch block will be configured in only two configurable logic blocks. This will ensure that minimal space and line delay will be provided in the final configuration.

Figure 24:
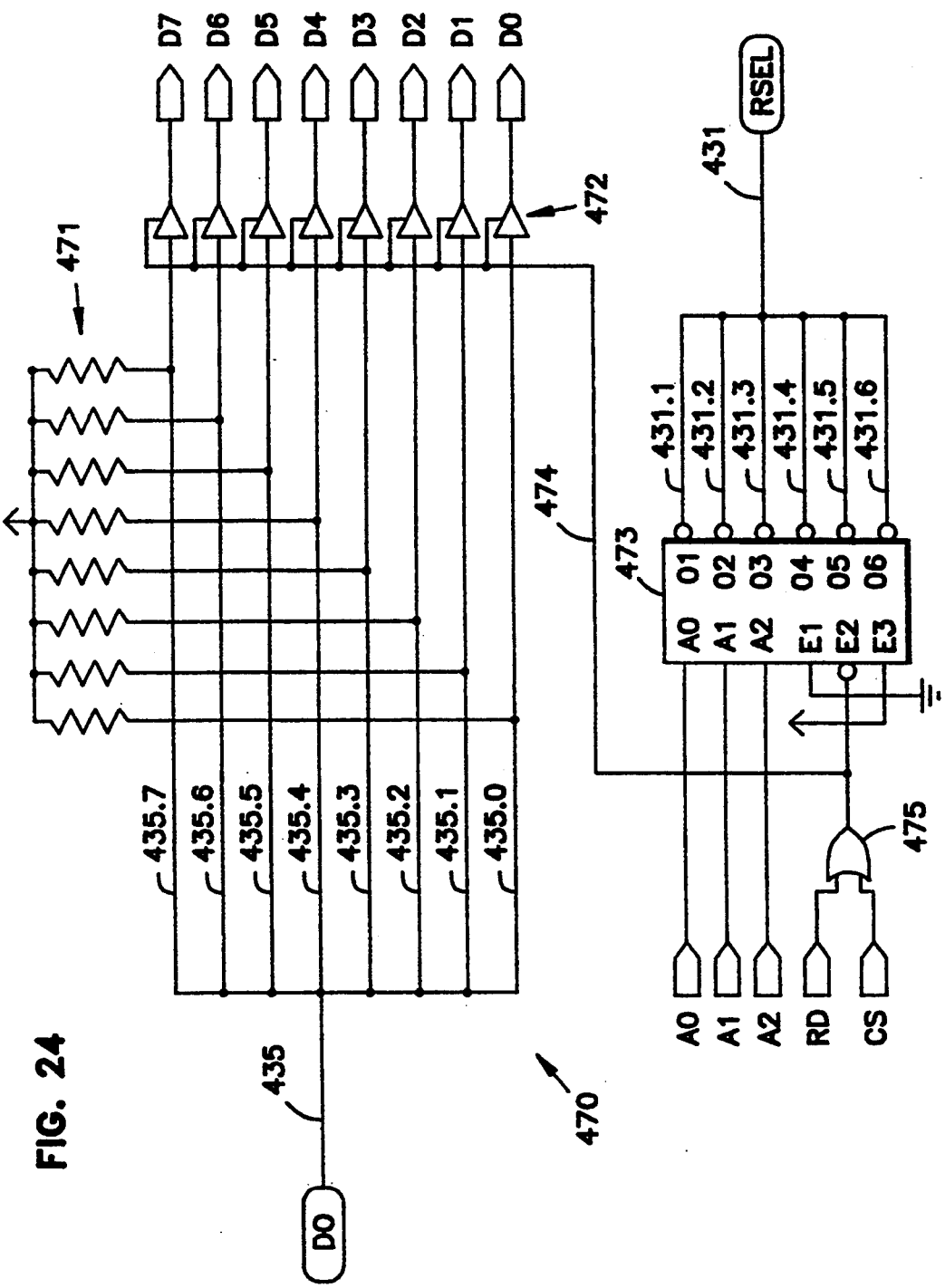
FIG. 24 is a functional block diagram of the data bus interface block shown in FIG. 19.

FIG. 24 shows the data bus interface block 470 in greater detail. Data bus interface block 470 provides two primary functions. The first function of the block is to generate the RSEL register select lines 431, so that microprocessor 320 can selectively read each of the values stored in latches 463a and 463b. This function is performed primarily by demultiplexer block 473. This demultiplexer asserts one of eight active-low output lines in response to an address provided at its A0, A1, and A2 inputs. These three inputs are connected, respectively, to the A0, A1 and A2 external connections of FPGA 360, which are themselves connected to address bus 406. The outputs of demultiplexer 473 are connected to the register select lines 431. As only lines 431.1–431.6 are used as control for the FPGA circuit, demultiplexer 473 needs only to have connections to these six lines. However, for debugging purposes or otherwise, it may be preferable to hook up the remaining two lines. Thus, whenever the A0–A2 inputs are configured for binary value 1 to binary value 6, the appropriate output line will be asserted by demultiplexer 473.

Demultiplexer 473 further has a set of chip enable inputs E1–E3. As only one input is necessary in this application, it is preferred that chip enable E1 be tied to ground and chip enable E3 be tied to positive voltage. The single chip enable line used here, which is connected at connection E2, is active-low and connected to the RD and CS external connections of the FPGA through OR gate 475. As configured, demultiplexer 473 will only be enabled whenever the RD and CS external connections are driven low, i.e. when FPGA 360 is enabled, and a read operation is requested, by microprocessor 320.

The RD and CS external connections are also used to control the output interface for FPGA 360. This output interface primarily consists of pull-up resistors 471 and tri-state buffers 472, all of which are provided as standard input/output circuitry on FPGA 360. This output interface takes the FPGA data bus 435, broken out in FIG. 24 as lines 435.0–435.7 (corresponding to bits 0–7) and places them on external connections D0–D7 of FPGA 360, which are connected to data bus 408 of controller 300. Each of lines 435.0–435.7 is connected to the input of a tri-state buffer 472, and is further connected to positive voltage through a pull-up resistor 471. Each of tri-state buffers 472 is enabled by an active-low signal on line 474, which is provided whenever the RD and CS external connections are driven low by microprocessor 320. Thus configured, tri-state buffers 472 will be enabled, and the current value on FPGA data bus 435 will be provided to data bus 408, whenever FPGA 360 is enabled, and a read operation is requested, by microprocessor 320.

Data bus interface 470 is therefore capable of enabling microprocessor 320 to read the contents stored in tension and compression latches 463a and 463b one byte at a time. Using the configurations shown with demultiplexer 473, it can be seen that address 1 (corresponding to A2A1A0=001) selects the low byte LB of tension latch 463a, address 2 (A2A1A0=010) selects the middle byte MB of tension latch 463a, and address 3 (A2A1A0=011) selects the high byte HB of tension latch 463a. Likewise, address 4 (A2A1A0=100) selects the low byte LB, address 5 (A2A1A0=101) selects the middle byte MB, and address 6 (A2A1A0=110) selects the high byte HB, of compression latch 463b.

Therefore, in order for microprocessor 320 request any one of the six registers, it simply needs to place the corresponding address 1–6 on address bus 406, then select the FPGA by asserting a chip select on line 410, and request a read operation on line 412. By doing this, data bus interface 464a will enable tri-state buffers 472 to connect FPGA data bus 435 to data bus 408. Further, demultiplexer 473 will generate a register select across the corresponding line 4431.1–431.6, which will connect one of the six bytes of information stored in tension and compression latches 463a and 463b to the FPGA data bus 435. As such, the proper byte of information will be provided from either of latches 463a or 463b, through buffers 464a or 464b, respectively, through buffers 472, and onto data bus 408.

The register select lines 431 further provide that whenever the low byte LB of tension or compression latch 463a or 463b is selected by microprocessor 320 (address 1 or 4, respectively), a signal will also be sent to one of the interrupt latches 457a or 457b, respectively, shown in FIG. 20. This will operate to reset these latches and clear the interrupt request which was made by the FPGA to the microprocessor. Consequently, in a normal read operation by the microprocessor, the interrupt which was generated by the FPGA will be cleared automatically while the microprocessor is polling the latch corresponding to whichever of the tension or compression interrupt latches, 457a or 457b, generated the interrupt.

4. Software Configuration

Figure 25A:
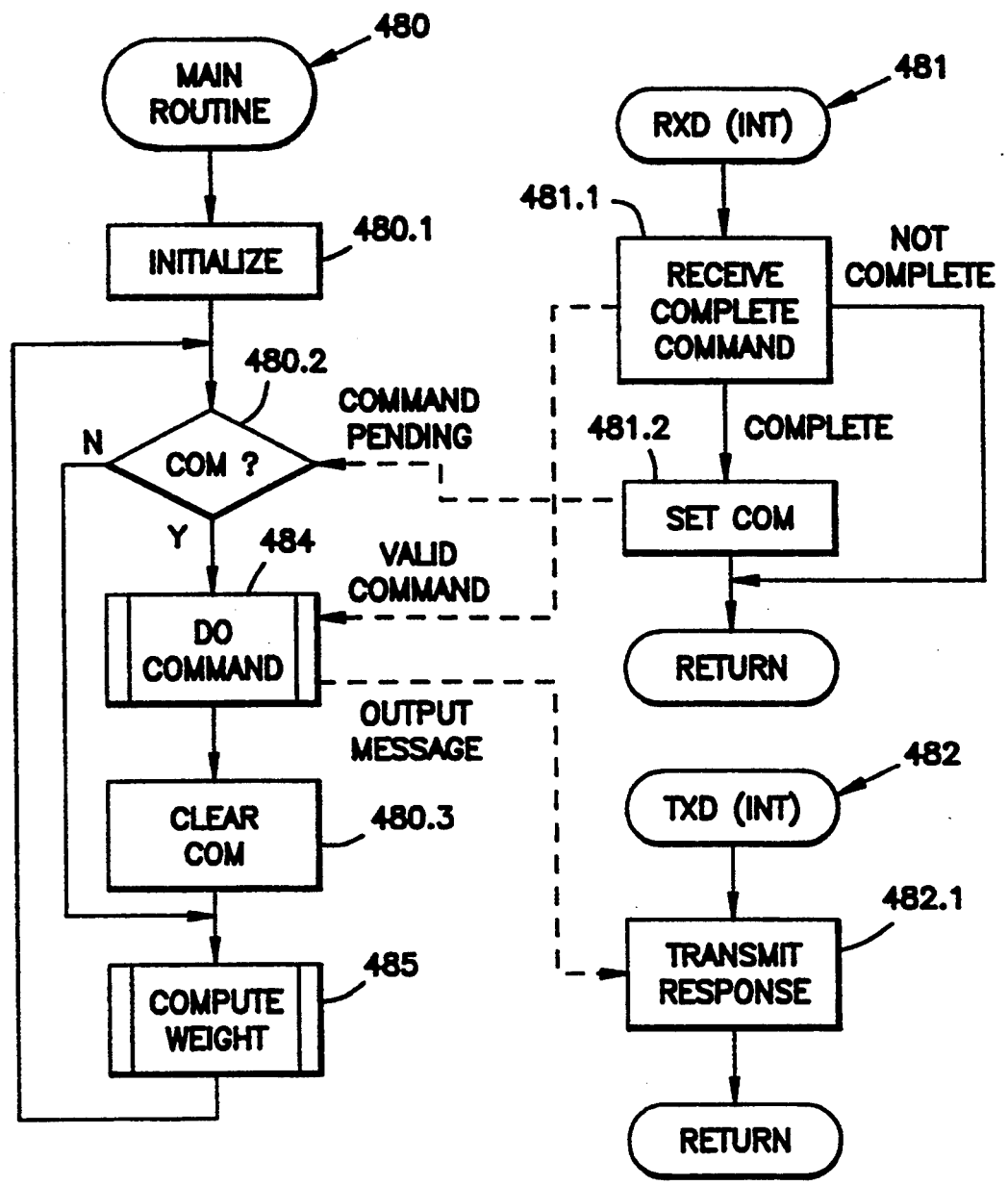
FIG. 25a is a flowchart showing the operation of a preferred software configuration for the load cell controller depicted in FIG. 10.
Figure 25B:
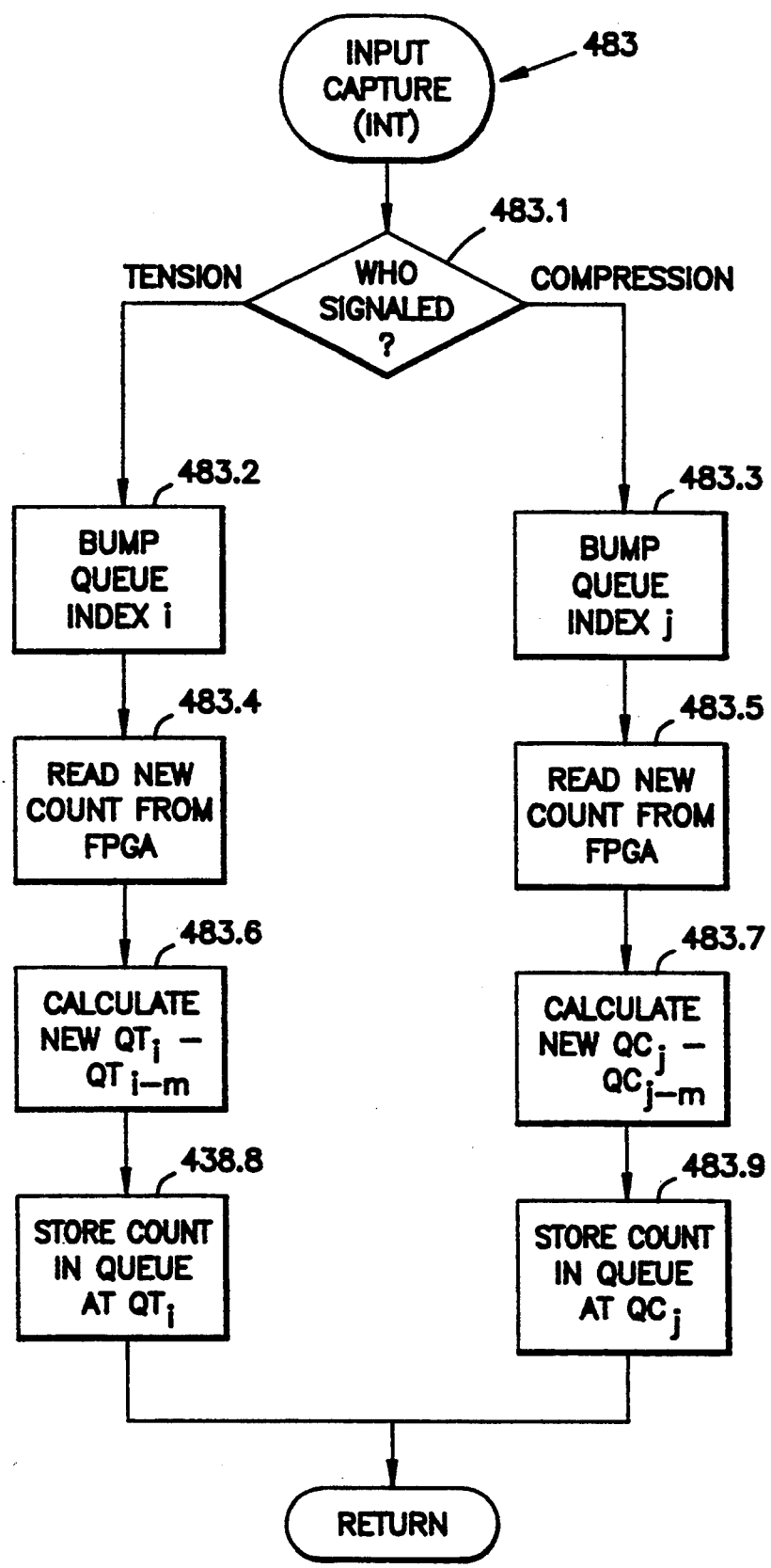

FIGS. 25a and 25b show flowcharts which generally describe the operation of the software for load cell controller 300. The code for this software is stored in EPROM 350 and run on microprocessor 320. It is preferably an interrupt-driven system, where interrupts generated by the serial communications interface and the FPGA control the flow of the program code.

Upon power-up of the controller, a main routine 480 is initiated. A multitude of initialization functions are performed in the initialized block 480.1, such as clearing the RAM, performing self tests, initializing communications ports and establishing serial communications, and resetting the program counter. Also during initialization, the configuration code stored in EEPROM 350 is downloaded to FPGA 360 for configuring the FPGA to operate as discussed above, using routines known by those skilled in the art.

The main routine, after initialized block 480.1 enters a main loop which runs continuously until a reset or power-down. This main loop essentially processes commands received by the serial communications interface, and recomputes the weight reading sensed by load cell 210. As can be seen in FIG. 25a, a COM flag is tested in block 480.2. This COM flag is set whenever the serial communications interface on microprocessor 320 has received a valid command across load cell bus 610. If the COM flag has been set, the command is processed in DO COMMAND command processor block 484, and once the command has been processed, the COM flag is cleared in block 480.3. The current weight reading is next computed in COMPUTE WEIGHT block 485. If block 480.2 determines that the COM flag has not been set, the command processing performed in blocks 484 and 480.3 is skipped, and program control goes directly to the weight computation performed in block 485. Once the new weight has been computed, control returns to block 480.2 for determining whether a new command has been received. This main routine will be repeated indefinitely during the operation of controller 300.

A number of interrupts can shift program flow to interrupt handling routines. The RXD serial data received interrupt routine 481 is initiated whenever a character is received and stored in the serial communications data register on microprocessor 320. RXD handler 481, in block 481.1, will add each received character to a buffer to build a complete command. If, after adding the received character to the command buffer, a valid and complete command has not yet been obtained, the RXD interrupt will terminate and return program control to main routine 480. If, however, a complete and valid command has been built, the COM flag will be set in block 481.2 and the routine will terminate, signalling to main routine 480 that a command is ready to be processed.

In addition, whenever the DO COMMAND block 484 places a response to be sent across the load cell bus 610 in an output buffer, the TXD serial data transmit interrupt 482 is initiated to transmit the response character by character over load cell bus 610 until the output buffer is empty. An interrupt is generated as the transmission of each character is completed, and will continue until the buffer is empty and the last character in the output buffer has been transmitted across the load cell bus.

The particular protocol for the commands transmitted across and received from load cell bus 610 are not discussed here. Such a protocol is merely a design choice, and one of ordinary skill in the art could design any of a number of protocols which would enable the necessary communication across the bus.

The input capture interrupt routine 483 shown in FIG. 25b is initiated by FPGA 360 asserting the IRQ connection on microprocessor 320. As discussed above, this interrupt will be asserted whenever either of the tension or compression latches 463a or 463b has latched a value of the time base frequency counter 462 (seen in FIG. 21). The assertion of the interrupt request itself is described in relation to FIG. 19, supra. This input capture routine 483 operates to obtain the new count value from the FPGA, compute a new queue output, and store the new count value in the proper queue. As will be discussed, infra, when a new queue output is stored, the main routine will recompute the current weight in block 485 based upon this new information.

The input capture routine 483 first determines which of the tension or compression latches has signalled the interrupt in block 483.1. From a hardware perspective, this is accomplished by checking the IRQ1 and IRQ2 connections on FPGA 360. Depending upon which latch signaled the interrupt, program flow will be directed to the tension update shown as blocks 483.2, 483.4, 483.6 and 483.8, or the compression update shown as blocks 483.3, 483.5, 483.7, and 483.9.

The tension update routine first increments the queue pointer i (i=i+1) in block 483.2. If the queue pointer has reached the end of the queue (i=m) then block 483.2 resets the queue pointer to the first entry in the queue (i=0).

Next, the value stored in tension latch 463a is obtained in block 483.4. As discussed, supra, in relation to the FPGA, the 24-bit value stored in tension latch 463a is obtained by selecting addresses 1, 2, and 3 of FPGA 360 to obtain the low, middle and high bytes across the data bus. Further, as discussed supra, the interrupt requested by FPGA 360 is automatically reset when address 1 is selected.

Once this new count value is obtained, block 483.6 computes a new queue output for tension queue 308a, equivalent to $QT_i-QT_{(i-m)}$. This is performed by subtracting the count value currently stored in the queue and pointed to by the queue pointer from this new count value. Once this new output is obtained and stored, block 483.8 then stores the new count value in the tension queue as entry $QT_i$. This replaces the previously oldest entry on the queue. Once this new value has been stored in the tension queue, control is returned from the interrupt.

The compression routine operates in the same manner as the tension routine. In block 483.3, the queue pointer j is incremented, and set to zero if j=m. Further, in block 483.5, the new count stored in compression latch 463b is obtained from FPGA 360, by reading addresses 4, 5, and 6 on FPGA 360. This obtains the low, middle, and high bytes stored in compression latch 463b, and clears the FPGA interrupt. Next, in block 483.7, the new queue output for the compression queue 308b is computed, equivalent to $QC_j-QC_{(j-m)}$. Then, in block 483.9, the new count value obtained from the compression latch is stored in the compression queue at its current entry $QC_j$.

As an overview, it can be seen that software for a load cell controller 300 will generally remain in a main loop to process commands and recompute the weight based upon the current queue outputs. Whenever a character is received or transmitted, or whenever a new value is stored in the tension and compression latches in the FPGA, control will be diverted to the proper interrupt routine for handling. One skilled in the art will appreciate that alternative program control could be provided, which could perform similar functions in controlling the operation of load cell assembly 200.

Figure 26A:
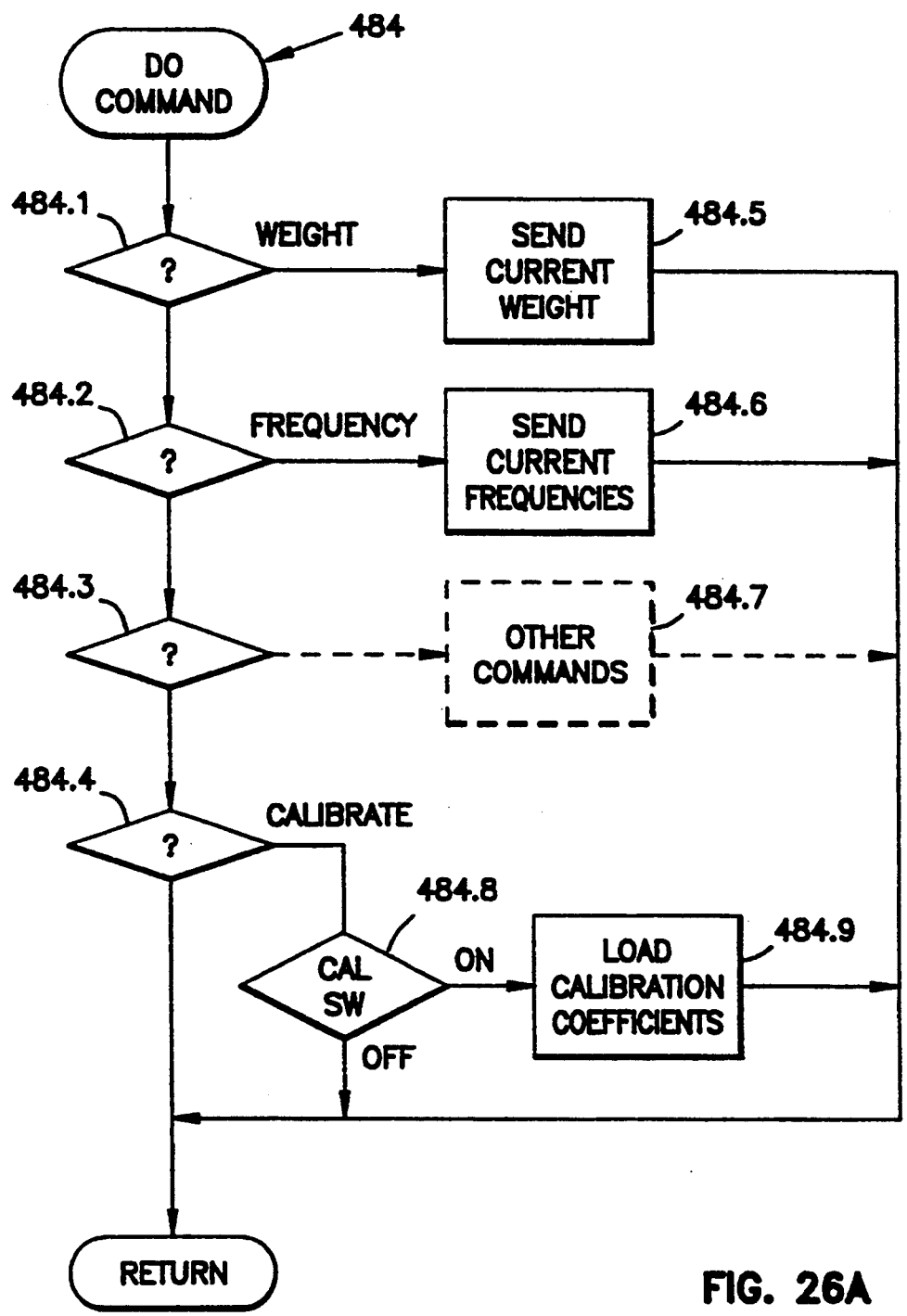
Figure 26B:
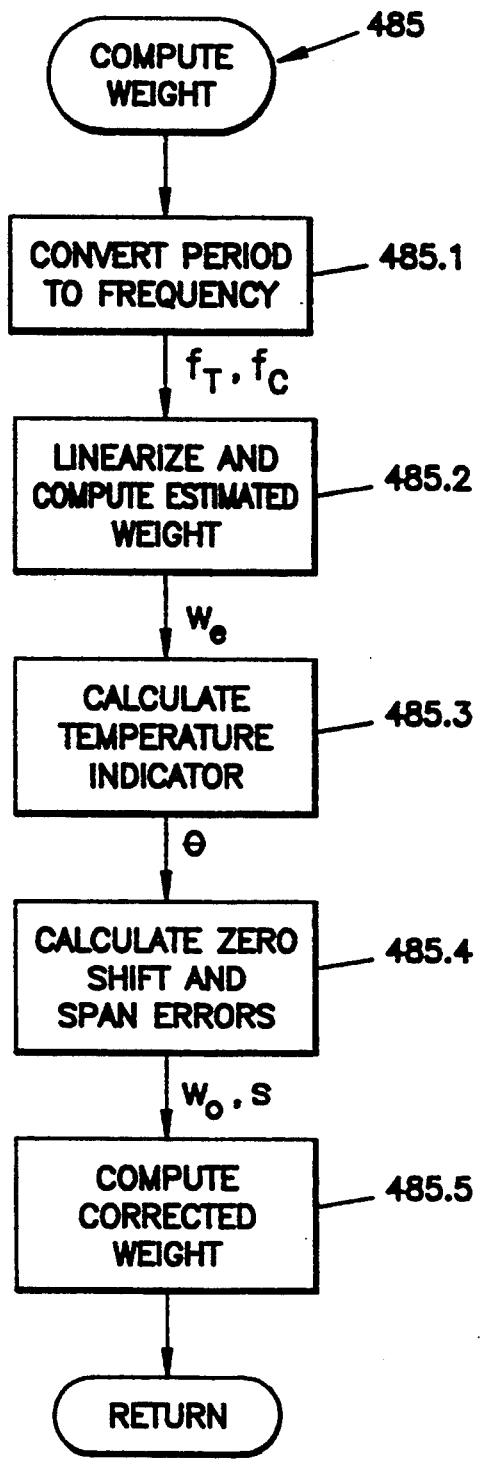

FIGS. 26a and 26b show the DO COMMAND command processor block 484 and COMPUTE WEIGHT block 485 in greater detail. DO COMMAND command processor block 484 generally operates to process commands stored in the command buffer, perform the necessary routines for executing the command which has been received, and sending out responses to commands or information across load cell bus 610. As can be seen in FIG. 26a, command processor 484 ("DO COMMAND") includes a command structure to determine which command has been sent to the load cell assembly over load cell bus 610. This is shown as a series of comparison blocks 484.1, 484.2, 484.3 and 484.4. Depending upon which command is found in the command buffer, these comparison blocks will divert control to the proper routine for handling these commands. For instance, if the current weight sensed by the load cell assembly is requested, block 484.5 will be initiated to send this information via the TXD routine across load cell bus 610. Further, should the raw frequencies obtained be requested (useful, for instance, during debugging), control will shift to block 484.6 to send this information across load cell bus 610. A number of other commands, shown, as an example, as block 484.7 may be included in this command structure.

These additional commands may include such commands as requests for information about the load cell assembly, such as its type, its number of divisions, its capacity, or the software version which is currently running. Also, self tests may be initiated, and results returned by controller 300. Also, in order to ensure that a proper load cell assembly is connected to load cell bus 610, a lock and key command structure can be included.

Also, a number of commands may be useful for controlling groups of load cell assemblies, such as when multiple load cells are used in the same base in applications where heavier objects are to be weighed than a single load cell could handle (such as, for example, a truck scale). The counting scale controlling software could assign a number of assemblies to a single group ID, then would be able to control these assemblies as a single base. Using a group ID, a single command from a control system could be used to request that all of the load cell assemblies having a common group ID store, or "snap", their current weight readings simultaneously. This would then enable separate commands to be sent to each load cell assembly in a group for it to return its stored weight reading. This is especially useful in situations where the weight at a precise instant is desired, since the control system will be able to read the weights stored in each assembly individually and at its leisure.

Commands for providing calibration data to the assembly are also included. This enables a load cell assembly to be calibrated in the factory, or at a later date, to give it its "personality". The particular calibration coefficients necessary are described, supra, in conjunction with FIG. 10. As can be seen in FIG. 26a, should a calibration command be received, the command processor 484 will check in block 484.8 if a calibration switch or jumper has been set before loading the calibration coefficients into nonvolatile memory in block 484.9. This calibration switch or jumper is preferably located on the printed circuit board for load cell controller 300, in a position in which it can be accessed. Whenever this switch is set to "off" or is open, the calibration memory will be protected from being lost or overwritten. Instead of, or in addition to, the hardware calibration switch or jumper, another calibration switch may also be implemented in software using a special lockout flag or code.

An explanation of the various commands, and the routines necessary for the operation therefor, are not discussed herein. The commands and functions which will be used in order to enable load cell controller 300 to communicate with the outside world can vary from different applications, and is merely a design choice. Given the above-described command structure, any of a number of commands could be programmed by one of ordinary skill in the art.

The compute weight routine 485 shown in FIG. 26b generally performs the functions of the linearization and temperature correction routines 310 and 312 described in conjunction with FIG. 10. The compute weight routine 485 essentially takes the respective outputs from the tension and compression queues, $QT_i$–$QT_{(i-m)}$ and $QC_j$–$QC_{(j-m)}$, and computes the corrected weight value W. The period-to-frequency conversion is performed in block 485.1, which computes $f_T$ and $f_C$ from the respective queue outputs. The functions in this block correspond to equations (1) and (2) discussed in relation to FIG. 10.

A linearization and estimated weight computation is performed in block 485.2, which computes the estimated weight, $W_e$, from the weighted difference of the tension and compression frequencies using equation (10) discussed in relation to FIG. 10.

The temperature indicator calculation is performed in block 485.3, which uses equations (13), (14), and (15) discussed with FIG. 10 to compute the temperature indicator $\theta$. Next, the zero shift $W_0$ and span error S are calculated from the temperature indicator and estimated weight $W_e$ in block 485.4, which corresponds to equations (19) and (20) discussed in relation to FIG. 10.

The corrected weight value W is next computed in block 485.5. This computation corresponds to equation (16) shown in relation to FIG. 10.

The weight computation routine 485 also uses a number of calibration coefficients, which are described in relation to FIG. 10, and which are provided by calibration commands which are processed by the command processor, 484. It is important to note that these calibration coefficients are preferably loaded into the load cell assembly during its manufacture. Therefore, these coefficients will be available to the compute weight routine 485, and will be preferably not be updated during the life of the assembly. However, should a load cell assembly need to be recalibrated, command processor 484 has the capability of storing new calibration coefficients.

The linearization, common-mode error rejection, and temperature correction provided by the compute weight routine 485 significantly improve the performance of load cell assembly 200. A properly calibrated load cell assembly which implements this routine should have a substantially linear response curve and should be substantially unaffected by temperature or any other largely common-mode effects such as anelastic creep, static hysteresis, elastic modulus, barametric pressure, and humidity, among others.

C. Performance

A load cell assembly constructed consistently with the invention is capable of exhibiting excellent precision and accuracy, and high tolerance of environmental effects. Table I shows the typical performance characteristics of such an assembly, designated the "working example", as compared to a prior art analog-type strain gauge device, the MK 16 load cell manufactured by Weigh-Tronix, Inc., the same assignee as in the present invention:

TABLE I

|  | Working Example | MK 16 System |
|---|---|---|
| Resolution | 1,000,000/Sec | 50,000/Sec |
| Accuracy | 10,000 d OIML | 3,000 d OIML |
| Creep (R-60) | 25 PPM | 70 PPM |
| Zero Return | 30 MS | 250 MS |
| Power | >10 MW | 592 MW |
| Speed of Response | 1X | 3X |

Figure 27:
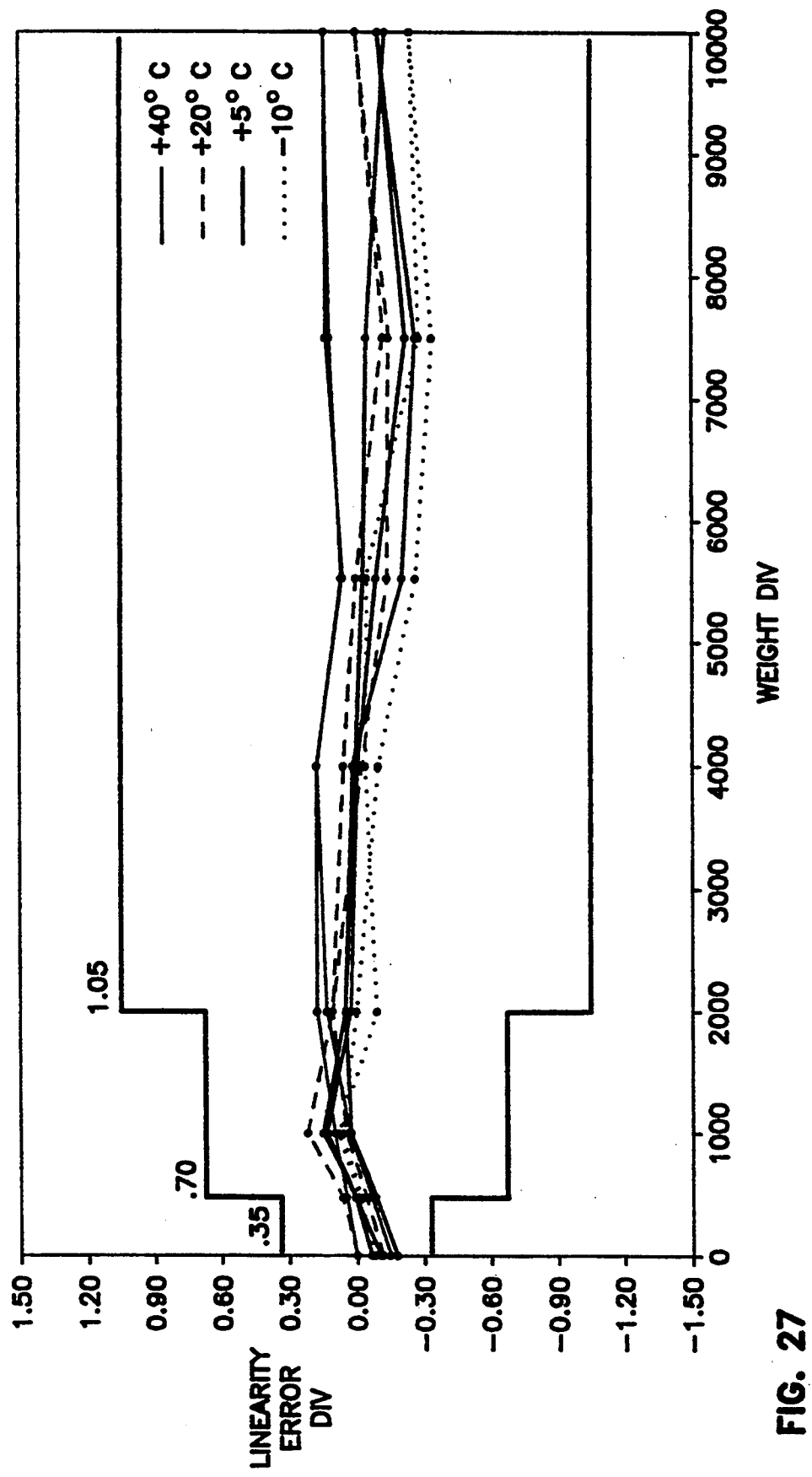
FIG. 27 is a graphical depiction of linearity error performance data for a load cell assembly consistent with the present invention.

The linearity and common-mode rejection of temperature and other environmental effects is shown for a preferred assembly in FIG. 27. This figure shows the results of a linearity error test run on a 25 kg capacity load cell assembly at −10° C., +5° C., +20° C. and +40° C., in accordance with Organisation Internationale De Métrologie Legale (OIML) and the protocol provided therein (see Page 10, Table 2, Class C R-60 (Ed. 1991)). Also shown in FIG. 27 is the error range necessary to comply with OIML standards. As can be seen in the figure, the preferred load cell assembly is well within this range.

Past analog-type load cells have typically been able to obtain a 6,000 division accuracy at best. One such cell manufactured by Huntleigh has obtained this accuracy, but at a narrower temperature range of +10° C. to +40° C.

On the other hand, load cell assemblies consistent with the present invention are capable of obtaining an accuracy better than 8,000 divisions over a broader temperature range of −10° C. to +40° C. Some load cell assemblies may be able to obtain accuracies greater than 10,000, 20,000, 25,000 divisions or higher, in a temperature operating range of +10° C. to +40° C. or better. In addition to accuracy, it can be seen that assemblies consistent with the present invention have a much greater internal resolution, have a lower creep (drift in reading over time), and have faster zero return and response times than prior analog-type weigh devices.

III. Electronic Aspects of Counting Scale

A. Functional Description

Control system 600 for preferred counting scale 70 operates to provide the primary operational control of counting scale 70. As discussed briefly above, and as will be discussed in much greater detail, control system 600 provides the user interface which enables counting scale 70 to be operated by a user. Further, control system 600 has capability for running self tests, for calibrating the scale, for configuring the operation of the scale, for running metrology tests, and for providing diagnostic capabilities.

In a normal operational mode, control system 600 communicates with the weighing devices attached to load cell bus 610, and provides weight and count readings therefrom. It enables a user to enter the piece weight by variety of methods. Configuration and selection of multiple bases can be provided, and control and configuration of external serial devices can also be controlled. While a preferred counting scale control system 600 is described below, one of ordinary skill in the art will appreciate that, due to the expandability of control system 600, any number of additional functions and capabilities could be programmed into counting scale 70.

B. Hardware Configuration

1. Control System

Figure 28:
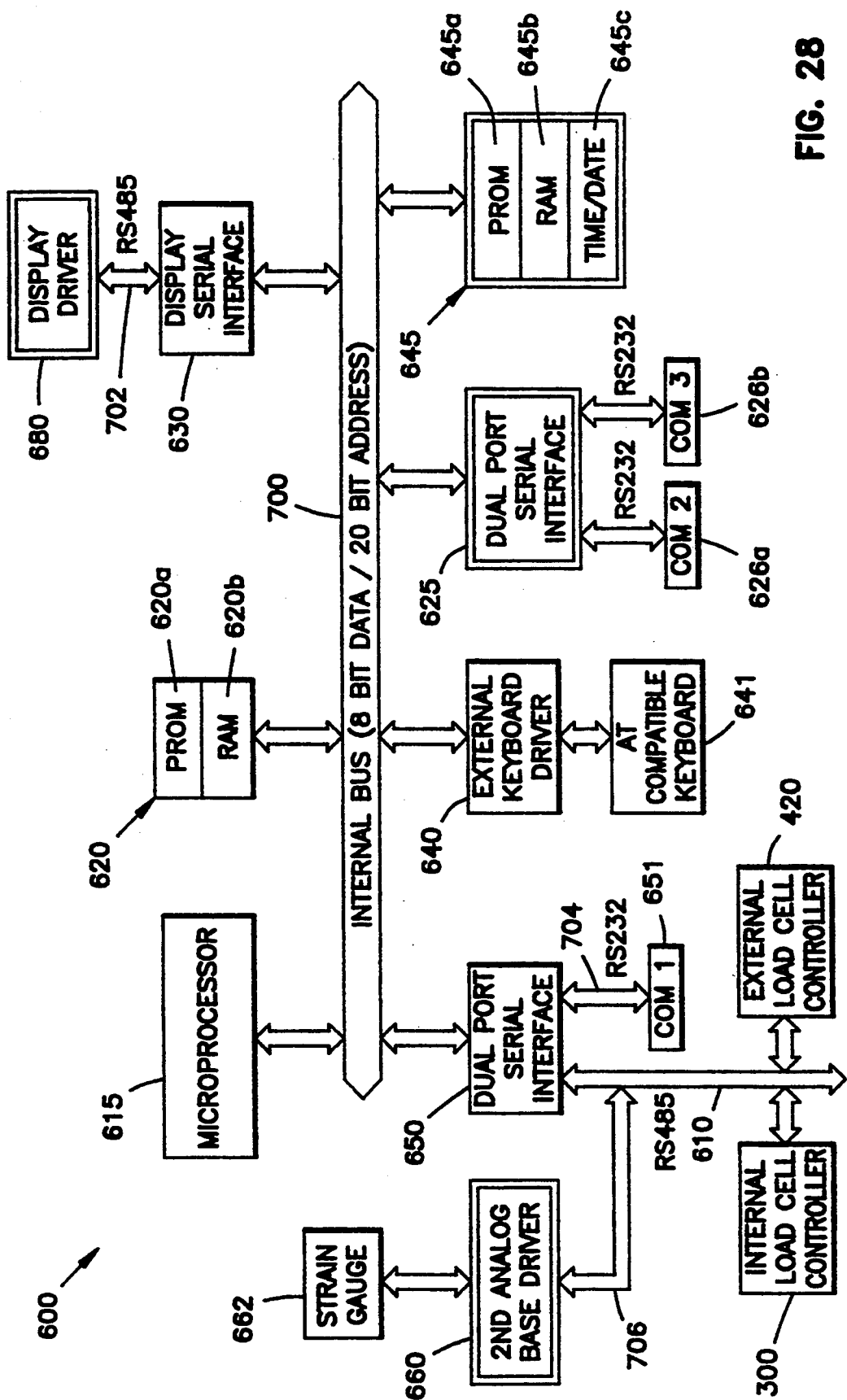
FIG. 28 is a functional block diagram of the counting scale control system portion of the counting scale of FIG. 1, consistent with a preferred embodiment of the invention.

Control system 600 for preferred counting scale 70 is shown generally in FIG. 28. Control system 600 contains a number of digital electronic devices interconnected by means of an internal bus 700. This bus contains an 8-bit data bus and a 20-bit address bus, for allowing information exchange between the various devices attached to the bus.

Primary control in control system 600 is provided by microprocessor 615. This microprocessor is preferably an 80C188 CMOS high integration 16-bit microprocessor, of the type manufactured by Intel and Advanced Micro Devices. Microprocessor 615 has the capability to address 1 Mb of memory over the 20 address lines connected to internal bus 700. Microprocessor 615 further has an 8-bit data bus, which is connected to the data bus in internal bus 700. The microprocessor further has a number of chip select connections that enable it to control a number of the other devices within control system 600. The configuration and pin connections necessary to configure microprocessor 615, such as the use of buffers to multiplex the data and address information selectively from the dual-function data/address connections on microprocessor 615, are well known in the art, and may be found, for instance, in the data sheets for the respective manufacturer of the microprocessor used. Further, one of skill in the art will appreciate that any number of commercially-available microprocessors may be used alternatively to the 80C188 in order to provide the necessary control in control system 600.

Addressable memory is provided to control system 600 by memory 620, which is connected to both the 8-bit data bus and the 20-bit address bus in internal bus 700. Memory 620 includes programmable read only memory (PROM) 620a, which provides the non-volatile storage for the program code necessary to operate microprocessor 615. PROM 620a is preferably a 27C020 integrated circuit chip, such as manufactured by Intel, which provides 256K×8 bits of addressing space. One skilled in the art will appreciate that, depending on the need for flexibility and/or the need for programming space, any of a number of alternative nonvolatile memory substitutes may be implemented in lieu of PROM 620a.

Data storage is provided by memory 620 through random access memory (RAM) 620b. This RAM is preferably a UPD431000 static RAM chip, which provides 128 K×8 bits of addressing space. One skilled in the art will appreciate that, depending upon the memory requirements and other considerations, any of a number of alternative static, dynamic, volatile, or nonvolatile random access memories may be used.

Control over keyboard/display unit 100 is provided through the display serial interface block 630. This block enables microprocessor 615 to communicate serially with the display driver 680, which is contained within keyboard/display unit 100, over RS485-compatible bus 702. Display driver 680 contains the various electronics necessary to drive the numeric and alphanumeric vacuum fluorescent displays, and it contains the driving circuitry for decoding the keyboard information. It will be discussed, infra, in relation to FIG. 29.

The display serial interface 630 is preferably controlled by a 16C450 universal asynchronous receiver/transmitter (UART), such as manufactured by National Semiconductor (not shown). The UART is connected to the internal bus 700 of the control system, and enables microprocessor 615 to send and receive byte-wide information to and from the UART. The UART performs serial-to-parallel conversion and vice versa in order to provide a serial data communication link with display driver 680.

As it is preferable to use an RS485-compatible protocol in communicating with display driver 680, an additional RS485 driver should also be used in conjunction with the UART. This RS485 driver is preferably a Linear Technology's LTC491 driver (not shown), similar to that used to provide serial communications in load cell controller 300. Connection of the UART and the RS485 driver to RS485-compatible serial bus 702 are well known in the art, and described in the data books for the respective devices. The display bus 702 preferably operates at a rate of 9600 bits/second. One skilled in the art will appreciate that a number of alternative rates and protocols could be implemented.

It is also preferable in this application to place the RS485 driver on the power supply board 500, rather than on the main printed circuit board used for control system 600. This is due to the fact that a number of different voltages, which are discussed later, must be provided to display driver 680 in order to run the vacuum fluorescent displays. By placing the RS485 driver on the power supply board, a single connection can be made between base 72 and keyboard/display unit 100. Further, all of the necessary FCC shielding requirements may be met using the same devices on the power supply board. The communication link between the RS485 driver and the UART in display serial interface 630 is preferably made through the connector between the main printed circuit board and the power supply board. This connection, being internal, does not need to be shielded to the same extent as the connector to the keyboard/display unit 100.

Display serial interface 630 preferably has an additional function of providing information transfer to and from a non-volatile memory containing calibration data from the scale. The preferred non-volatile memory is a 93C66 serial EEPROM (not shown). Control of this EEPROM is provided by the 16C450 UART in interface 630. Transfer to the EEPROM from the UART is provided by connecting the DTR output of the UART to the DI input of the EEPROM, and transfer from the EEPROM to the UART is provided by connecting the RI input of the UART to the DO output of the EEPROM. Chip select and clocking are provided by connecting OUT2 on the UART to CS on the EEPROM and connecting OUT1 on the UART to SK on the EEPROM, respectively. Control over storing the calibration data is provided by a jumper connected to DCD on the UART and a normally-open switch connected to DSR on the UART. The status of the jumper and switch can be read by microprocessor 615 by polling the modem status register of the UART. Likewise, control over information exchange between the microprocessor and the EEPROM can be accomplished by microprocessor 615 sending information through the UART's modem control register and receiving information through the UART's modem status register.

The particular operation for storing the calibration data will be discussed, infra. This particular connection through the UART was made simply due to the limited number of communication links available to microprocessor 615. Any number of alternative non-volatile storage options may be used to maintain proper calibration data storage.

Communication of control system 600 with load cell bus 610 and a separate RS232-compatible serial port is provided by dual port serial interface 650. This serial interface 650 is connected to the internal bus 700, and it provides the primary serial communications capability for microprocessor 615. The functions of dual port serial interface 650 are provided preferably by a National Semiconductor 16C452 dual UART (not shown). The 16C452 dual UART is essentially a two port version of the single port UART 16C450 used in display serial interface 630. This dual UART also has a parallel printer port, which is preferably not used, but which might be used should such a capability be desired for the counting scale.

Channel 1 of the 16C452 UART is configured as the load cell bus 610, which was shown in FIG. 17 and described, supra. As this is a RS485-compatible communications protocol, a Linear Technology's LTC491, or similar chip, is used in order to convert the serial data received and transmitted by the 16C452 dual UART into RS485-compatible signals (not shown). The operation of this load cell bus is discussed, supra, in relation to FIG. 17. Shown, for clarity in FIG. 28, are internal and external load cell controllers 300 and 420 connected to load cell bus 610.

The second channel for the 16C452 dual UART is a serial communications port to enable control system 600 to communicate with external devices such as printers, computers or other peripheral devices. It is preferable that this communications channel be RS232-compatible. In order to convert the serial data sent and received by the 16C452 dual UART, a RS232 driver, such as a MAX232 driver or the like, should be used between the UART and the communications port (not shown).

The RS232-compatible serial interface is shown on FIG. 28 as line 704, which is connected to an external connector 651, designated the COM1 port. It is this external connection which will provide connection to the various peripheral devices desired to be communicated with by control system 600. This connector is preferably a 9 pin RS232 connector, which is well known in the art.

It is preferable that any UART port operating in RS232-compatible format (for COM1, COM2 and COM3) be programmable through software to communicate at a rate of between 110 and 9600 bits/second. One skilled in the art will recognize that, depending upon the devices to be communicated with, any baud rate may be selected, so long as it is sufficiently fast to enable efficient communication between a device and control system 600.

Control system 600 further includes an external keyboard driver 640 which is also connected to internal bus 700. This external keyboard driver 640 is connected through a 5 pin MINIDIN connector, for connection to an external keyboard 641. This external keyboard is preferably an IBM ® PC/AT-compatible keyboard. This function allows a standard IBM ® PC/AT keyboard to be used in lieu of the keyboard on keyboard/display unit 100. External keyboard driver 640 is preferably an 8742AH AT-compatible keyboard driver integrated circuit (not shown). Its use as a keyboard driver, and the connections necessary therefor, are well known within the art.

It is preferable that microprocessor 615, memory 620, display serial interface 630, dual port serial interface 650, and external keyboard driver 640 be included on a single printed circuit board (the "main printed circuit board"), which the exception of the RS485 driver for display serial interface 630, which is preferably located on the power supply board for the reasons discussed above. Further, it is preferable that the 5 pin MINIDIN external keyboard connector, the 9 pin RS232 COM1 connector, and the 6 pin load cell bus connector be found on this main printed circuit board, and be accessible for a user through opening 74 in back panel 76. It is also preferable that keyboard connection 79 for the RS485 communications line with display driver 680 be located on the power supply board. This connection is an 11 pin MTA connector such as of the type manufactured by AMP, Inc. One skilled in the art will appreciate, however that different configurations and layouts of control system 600 on any number of printed circuit boards and connections therebetween, may be used alternatively to the single main printer circuit board described herein.

Control system 600 further has a number of optional features which may be included. A memory option to the control system provides additional memory 645 on a separate printed circuit board. While the configuration may vary for the particular application and features desired, memory 645 will include one or more of the following: PROM 645a, RAM 645b, time/date generator 645c. Each of these options, if installed, are connected to both the address and data buses in internal bus 700. PROM 645a is preferably a 27C010 EPROM. This EPROM may be used in order to provide custom program code for specific applications of the counting scale. Any size or type of non-volatile memory may be used in the alternative.

RAM 645b is preferably a UPD431000 static RAM similar to that used as the main RAM 620b. This RAM is further connected to a lithium battery back-up circuit which provides limited back-up powers to maintain the memory in static RAM 645b. This additional memory may be used, for instance, in order to provide a more expansive database of part numbers and piece weights. One skilled in the art will appreciate that various alternative volatile and nonvolatile writable memories may also be used.

Time/date generator 645c is preferably a Dallas Semiconductor DS1285 time/date chip, which is connected to the battery back-up circuit as well in order to maintain the current time and date during power-off conditions. The battery back-up circuit is preferably a Dallas Semiconductor DS1210 integrated chip which, in addition to switching to a lithium battery when a power down condition is sensed, also provides a chip select disable function to protect RAM 645b from losing its stored data.

The above PROM 645a, RAM 645b and time/date generator 645c are all optional functions, and are preferably located on a memory expansion printed circuit board having socketed connections for each of these chips. Thus, a counting scale may be customized for a particular application by using the same memory expansion board.

Another option for control system 600 is a communications option, which provides an additional printed circuit board having two additional RS232 communication ports. This is shown in FIG. 28 as dual port serial interface block 625, which is connected to the two additional communication ports COM2 and COM3, numbered 626a and 626b, respectively. Each of the COM2 and COM3 ports are connected through 9 pin RS232-compatible connectors on the back panel 76 of base 72.

The communications device necessary for the operation of dual port serial interface 625 is a National Semiconductor 16C452 UART (not shown), which is identical to the UART used in dual port serial interface 650. Further, in order to provide RS232 compatibility, a single Linear Technology's LT1134 RS232 driver is placed between the UART and COM2 and COM3 ports 626a and 626b. This LT1134 (not shown) is essentially a dual port version of the RS232 driver used in dual port serial interface 650. These two additional communication ports COM2 and COM3 are identical in function to the COM1 port, and may be used to connect with various external peripherals such as printers, computers, or the like.

A third option available for control system 600 is a second analog base driver circuit 660. This driver 660 enables an analog-type weight device to be hooked up to the load cell bus 610. Analog-type devices which are typically strain gauges are well known in the art. Driver 660 operates to provide a communications interface between such analog-type devices and control system 600. When this option is installed and a strain gauge or other analog-type device is hooked up to driver 660, control system 600 is able to communicate with the analog device just as if it were a digital-type load cell assembly such as load cell assembly 200.

The design of an analog-type driver is well known within the art, and will not be discussed herein. Suffice it to say, the necessary hardware for driver 660 includes such a well-known analog driver. It further includes a communications capability in order to connect to load cell bus 610. It also has a voltage converter circuit in order to provide the necessary voltages required for driving a strain gauge. In a preferred driver 660, a Motorola 68HC705C9 microcontroller or the like is used to provide the primary control for driver 660 (not shown). Besides performing the driving and analog-to-digital conversion necessary for obtaining a digital signal from an analog-type device, this microprocessor also includes software sufficient for communicating with control system 600 over load cell bus 610. Further, a RS485-compatible driver, such as an LTC491 (not shown) used in load cell controller 300, provides the compatible connection to load cell bus 610. In the preferred driver 660, an isolated DC to DC converter circuit (not shown) is used to take the +16 VDC power signal received from power supply 500, and provide a −5 to +5 VDC power supply for driving the analog-type device.

Each of the discussed options, memory option 645, communications option 625, and second analog base option 660, may all be on separate printed circuit boards. One skilled in the art, however, will recognize that any alternate layout and/or configuration of hardware may alternatively be used to implement the desired features.

2. Display Driver

Figure 29:
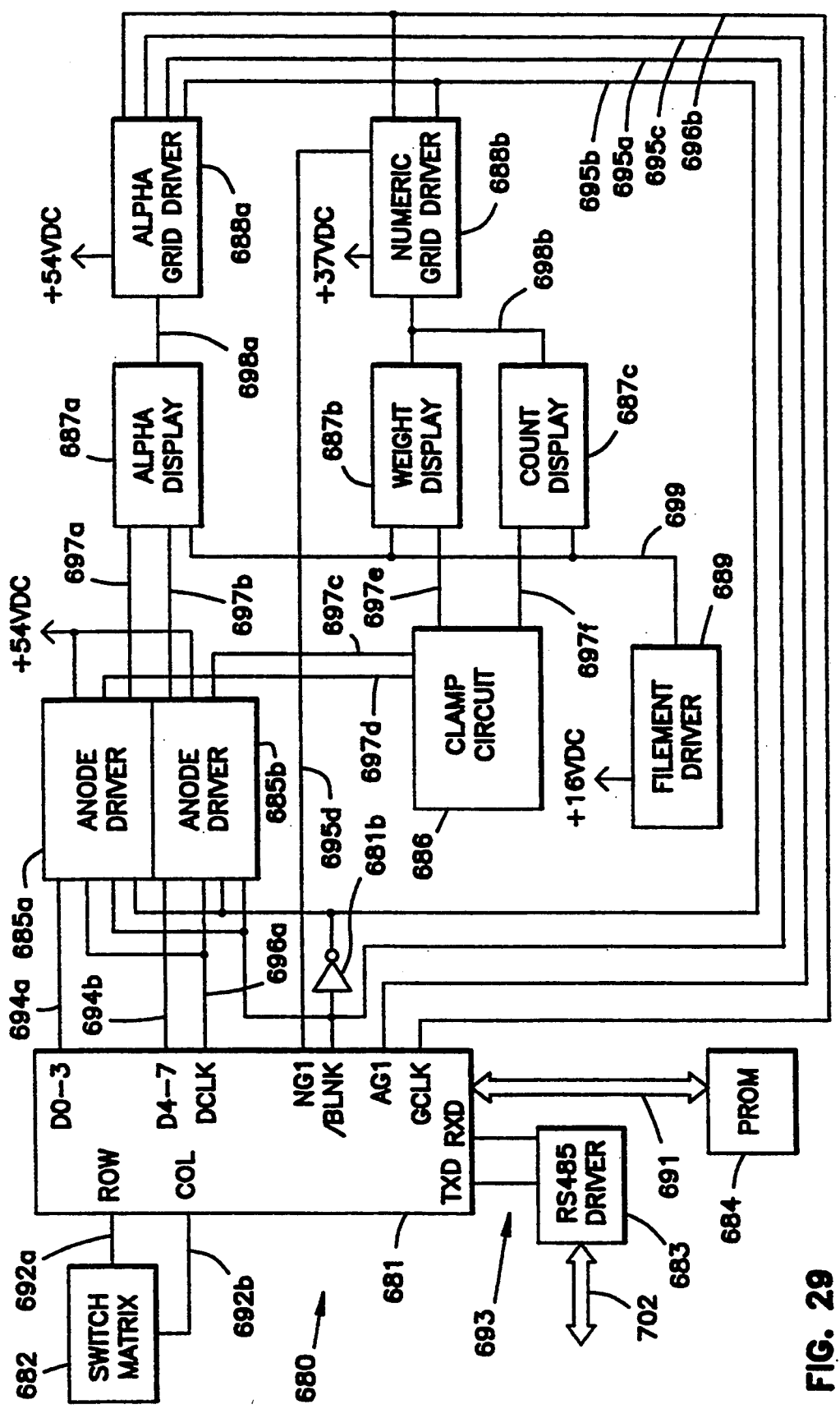
FIG. 29 is a schematic block diagram of the display driver shown in FIG. 28.

FIG. 29 shows the hardware components used in display driver 680. Primary control over the display is provided by microprocessor 681, which is preferably a Motorola 68HC11F1 microprocessor running at 2.4576 MHz and configured in expanded multiplexed mode. This microprocessor is similar to that used for load cell controller 300. One skilled in the art will appreciate that any suitable microprocessor may be used in lieu of the 68HC11F1 microprocessor.

The program code for operating microprocessor 681 is found in PROM 684. This PROM is preferably an Intel 27C256, a 32K×8 EPROM. One skilled in the art will appreciate that any suitable non-volatile storage device may be implemented to store the program memory for display driver 680. PROM 684 is connected to microprocessor 681 through address and data bus 691, which connects the respective address and data connections on microprocessor 681 and PROM 684.

Communication for the display driver 680 with the main control system 600 is provided, as discussed above, over RS485-compatible bus 702. The serial communications interface of microprocessor 681 provides this communications capability over its TXD transmit and RXD receive serial connections. In order to convert the NRZ format into the RS485 format, RS485 driver 683 is used between bus 702 and microprocessor 681. This driver is preferably a Linear Technology LTC491 RS485 driver chip (not shown) which is similar to that used on load cell controller 300. It is connected to the TXD and RXD connections on microprocessor 681 through lines 693. As communications over a RS485 bus are well known in the art, no discussion will be provided herein of the particular format and/or commands used to communicate with control system 600.

Display driver 680 has two primary functions. First, the display driver has the capability for sensing and decoding key depressions on keyboard/display unit 100. Second, display driver 680 is capable of driving the various displays on keyboard/display unit 100 to provide information to an operator.

The keyboard-decoding function of display driver 680 is provided by switch matrix 682. Switch matrix 682 is a conventional keyboard switch matrix which requires signals to be selectively applied to various rows in the matrix, so that a signal may be received over a column line in the matrix whenever a key is depressed. The operation of such a switch matrix is well known within the art. The preferred switch matrix for keyboard/display unit 100 is a 5 row×6 column switch matrix. Its row connections are connected across lines 692a in series with 1K resistors (not shown) to the ROW connection of microprocessor 681. This ROW connection is actually connected to port G of the microprocessor, at connections PG0-4. The return column signals are provided across lines 692b, which are connected to a 74HC540 inverting buffer (not shown), and which are further pulled up by 4.7K resistors (not shown). Lines 692b are connected to a COL connection on microprocessor 681, which is connected to connections PE1-5 of port E. Connected as such, microprocessor 681 is able to determine if a key has been pressed by selectively asserting one of PG0-4 and subsequently reading the signals obtained over PE 0-5. One skilled in the art will appreciate that various methods of decoding a keyboard may be used in lieu of the preferred matrix discussed above.

One optional improvement which may be implemented in relation to the keyboard is to provide a beeper circuit, which beeps whenever a key is depressed. This beeper circuit (not shown) is attached to the OC2 connection of port A on microprocessor 681, such that microprocessor 681 signals whenever a key is depressed.

The second function of display driver 680, that of controlling the various displays on keyboard/display unit 100, is generally known in the art. However, a brief description of the connections required for controlling these displays will be provided.

Alpha display 687a is preferably a Noritake DC40025C2 vacuum fluorescent display, corresponding to display 130 shown in FIG. 3. This display provides a 40 column×2 row array of 5×7 dot matrix characters. As discussed previously, this display provides legends for the soft keys, as well as data input and messages to the user.

Vacuum fluorescent displays such as this have three separate terminal groups which must be controlled in order for their operation. The first of these terminal groups are the anode terminals. Separate anode drivers 685a and 685b are used to control the anode terminals of display 687a. These drivers are preferably Supertex HV7708 high voltage drivers. Anode driver 685a provides forty lines 697a to alpha display 687a. Similarly, anode driver 685b provides thirty lines 697b to alpha display 687a. While these particular connections are not shown, one skilled in the art will recognize the particular connections necessary in order to control the PA-1-35 and PB1-35 connections on display 687a.

Microprocessor 681 controls which characters are being displayed by providing information across the data bus to anode drivers 685a and 685b. Bits 0-3 of the data bus on microprocessor 681 are connected across lines 694a to the DIN 1-4 connections on anode driver 685a. Similarly, bits 4-7 of the data bus are connected across line 694b to the DIN 1-4 connections of driver 685b. This enables microprocessor 681 to communicate and provide information to each of the drivers.

Microprocessor 681 also has a number of control lines for controlling these drivers. First, a DCLK signal is provided across line 696a to each of the drivers at their respective CLK connections. DCLK on microprocessor 681 is preferably the PG5 connection. It is this signal which provides the clocking for each of the drivers.

Microprocessor 681 also provides separate active-high and active-low blanking signals. The active-low blanking signal, /BLNK is preferably seen at connection 0C5 of port A. This signal, in turn, is connected to the active-low BL connections on anode driver 685a and 685b (not shown) over line 695a. Further, the /BLNK connection is sent through inverter 681b to form a BLNK signal which is active-high version of /BLNK. This inverter 681b is preferably implemented as part of the inverting buffer used in switch matrix 682 (not shown). Thus a separate inverter IC does not need to be used. The BLNK signal is connected to the LE connections of the anode drivers on line 695b. Thus configured, the single PG5 connection on microprocessor 681 provides a dual function blank request/output enable control. One skilled in the art will appreciate that separate connections may be used for this purpose.

Drivers 685a and 685b, being high voltage, require a 54 VDC power signal at their VPP inputs. This +54 VDC is provided by power supply 500.

The second terminal group on display 687a are the grid terminals. Control over these terminals is provided separately by an alpha grid driver 688a. Like the anode drivers 685a and 685b, grid driver 688a is preferably a Supertex HV7708 driver. However, this grid driver is configured to be loaded serially, by connecting its VIN-2-4 inputs to its DOUT1-3 outputs, respectively. This grid driver provides forty grid enable lines 698a, which are connected to the G1-40 connections on display 687a (not shown).

Control over grid driver 688a is provided by microprocessor 681 over two separate lines. First the clocking signal is provided at the microprocessor 681 OC3 connection (designated GCLK). This connection is connected to the CLK input of grid driver 688a over line 696b. Further, a grid control line AG1 (connection OC3) is connected across line 695c to the DIN1 connection of grid driver 688a. This line enables microprocessor 681 to request the next grid in the sequence to be selected.

Grid driver 688a is connected at its BL and LE inputs to /BLNK line 695a and BLNK line 695b, respectively.

This enables microprocessor 681 to control the blanking and enable of the grid driver similarly to anode drivers 685a and 685b. Also, similarly to the anode drivers, a +54 VDC signal is present at the VPP input of grid driver 688a, which is provided by power supply 500.

The final terminal group on alpha display 687a are the cathode, or filament terminals. This is controlled over lines 699 by filament driver 689. This driver has, as its input, a +16 VDC power signal received from power supply 500. This driver, in turn, generates an AC square wave having a frequency preferably of 1 KHz, and biased between −9 and +7 volts. The square wave is generated preferably by a 555 CMOS timer configured to free run as an astable oscillator. Such a configuration is well known in the art. In order to provide the necessary current required to drive display 687a, an amplifier circuit consisting of a BD138 PNP power transistor and a MTD3055E power MOSFET is preferably used. This configuration is preferred to a transformer connection which would be required should a transistor amplifier circuit not be used. The signal output by the filament driver is required for vacuum fluorescent displays, and is known in the art.

Display driver 680 further controls two additional displays, a weight display 687b and a count display 687c. These displays correspond, respectively, to displays 110 and 120 on keyboard/display unit 100. Weight display 687b is preferably a Noritake CP2053D 9 element×9 character vacuum fluorescent display. This display provides 7 digits, as well as the special characters in display 110 (shown in FIG. 3). Count display 687c is preferably a Noritake FG913D19 element×9 character vacuum fluorescent display. This display provides the 9 digits in count display 120 (shown in FIG. 3).

The anode terminals of weight and count displays 687b and 687c are controlled by anode drivers 685a and 685b. These drivers provide twelve and eight lines, respectively, over lines 697c and 697d, respectively. A clamp circuit 686 is connected between lines 697c-d and lines 697e and 697f, which are connected to weight and count displays 687b and 687c, respectively. Each of lines 697e and 697f provide ten control signals each for weight and count displays 687b and 687c, respectively. The particular connections are not described, as they are within the knowledge of one of ordinary skill in the art.

Clamp circuit 686 is used to clamp down the voltage provided by anode drivers 685a and 685b from approximately 53 volts to 37 volts. This 37 volts is required for weight and count displays 687b and 687c, rather than the 54 volts required for alpha display 687a. Clamp circuit 686 includes a TL783 +37 VDC regulator IC which provides a +37 VDC output. Each line in lines 697c and 697d is connected through a 2K resistor to a corresponding line in lines 697e and 697f. Further, each of lines 697e and 697f is connected to the anode of a clamping diode (not shown). The +37 VDC signal from the regulator is then applied to the cathodes of these diodes. Preferably these clamping diodes are packaged in BAV70 clamping diode packages, each of which contains two separate diodes. By providing the 37 VDC signal from the TL783 voltage regulator to the cathodes of the diodes, each of lines 697e and 697f is clamped down to +37 VDC.

The grid terminals on weight and count displays 687b and 687c are controlled by a single numeric grid driver 688b. This grid driver is preferably a UCN5810 10-bit grid driver. This driver provides nine grid enable lines 698b to each of weight and count displays 687b and 687c, at their respective G1-9 connections. Further, this grid driver is connected at its VBB input to the +37 VDC power supplied by the TL783 regulator in clamp circuit 686.

Numeric grid driver 688b is controlled by microprocessor 681 through the NG1 connection of microprocessor 681 (connection OC5). This connection is connected to the SDI connection on numeric grid driver 688b through line 695d. This serial data input line enables microprocessor 681 to request the next grid to be selected. Control is also provided by microprocessor 681 through grid clock line 696b, which is connected to the GCLK connection of microprocessor 681 (connection OC4) and the CLK connection of the grid driver 688b. This provides a clock control for microprocessor 681. Grid driver 688b is also connected to the BLNK line 695b, in order to enable a microprocessor 681 to request a blank from grid driver 688b.

Weight and count displays 687b and 687c are connected to filament driver 689 by lines 699. This provides the AC square wave signal required to operate the filaments of these displays.

The software necessary for configuring microprocessor 681 to control displays 687a-c is within the knowledge of one of ordinary skill in the art. Consequently, this particular code is not described herein.

3. Power Supply

Power supply 500 provides a number of power supply voltages to the various components in the scale. The power supply 500 has connections to both scale control system 600 and display driver 680. To control system 600, power supply 500 provides a +5 VDC power signal for operating the various integrated circuit devices in control system 600. It further provides a +7 VDC power signal, which control system 600 in turn provides to each of the load cell controllers on load cell bus 610. This +7 VDC signal received by each of the load cell controllers on load cell bus 610 is subsequently converted to +5 VDC for the operation of these controllers. Power supply 500 also provides a +16 VDC power signal to control system 600, which is used by the second analog base driver 660, for operation of an optional strain gauge base.

Power supply 500 also provides a number of voltages to display driver 680 on keyboard/display unit 100. First, a +5 VDC power signal is provided to operate the integrated circuit devices in display driver 680. Further, a +16 VDC power signal is provided in order to run the filament driver 689. A +54 VDC power signal is also provided in order to operate the anode and grid drivers 685a-b and 688a-b.

Power supply 500 is preferably capable of operating on either 110 VAC or 220 VAC, in order to operate in various countries of the world. Power supply 500 also preferably has the necessary filtering and ESD protection which is required in order to comply with FCC, UL and other international standards, all of which are well known within the art.

The particular devices and connections therebetween for power supply 500 are not discussed here. The particular construction of a power supply for providing the various power signals to the scale is well known within the art. In fact, such a power supply can be designed by a CAD system or a software program, such as is available from National Semiconductor. All that is required of power supply 500 is that it provides the +5 VDC, +7 VDC, +16 VDC and +54 VDC power signals to the control system 600 and display driver 680.

As discussed earlier, power supply 500 also carries the serial data transmitted between control system 600 and display driver 680. Since the power supply 500 must provide three separate voltage power signals to display driver 680, it is preferable that the serial data information from control system 600 be sent to display driver 680 through the same connection as that used by power supply 500, so that a single external connector may be used to connect keyboard/display unit 100 to base 72. It is preferable that control system 600 send and receive serial data in the NRZ format to and from power supply 500, and that a RS485 driver, such as an LTC491 (the same as used on display driver 680 and load cell controller 300) be used to convert between the NRZ and RS485 formats. The advantage of this configuration is that the filtering necessary to comply with FCC regulations may be performed in power supply 500 alone for the display connection, rather than having separate filtering on power supply 500 and control system 600. One skilled in the art will recognize, however, that the RS485 driver could be implemented in control system 600, rather than power supply 500, without altering the functional characteristics of the communication between display driver 680 and control system 600.

C. Software Configuration

The program code necessary to operate control system 600 is preferably created using a high-level language such as the C programming language. One skilled in the art will appreciate that a number of suitable programming languages would be suitable for programming the code for control system 600.

Figure 30:
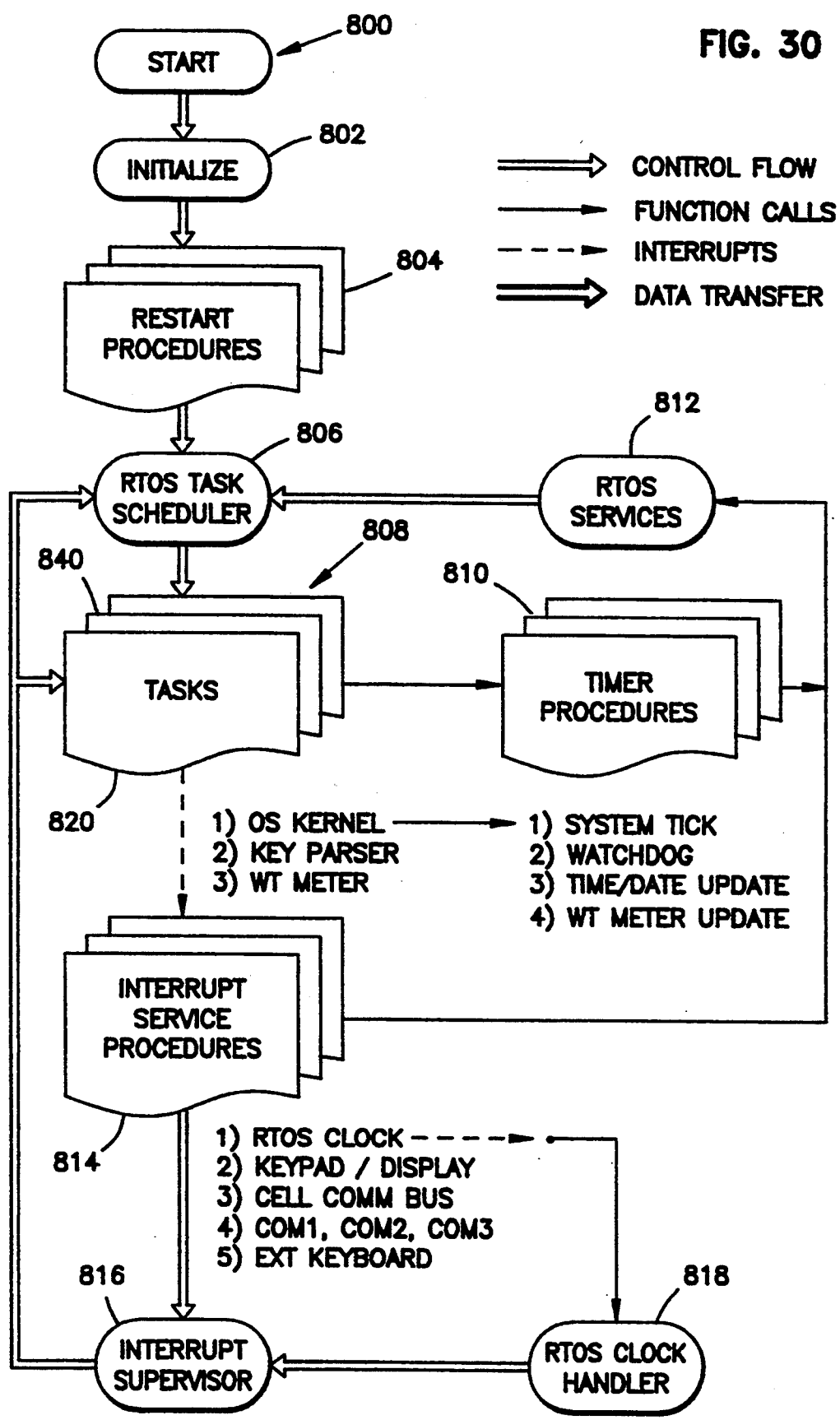
FIG. 30 is a top level dataflow diagram of the preferred counting scale control system of FIG. 28, consistent with a preferred embodiment of the invention.

FIG. 30 shows a top level data flow diagram for the operation of control system 600. Upon power-up this top level control 800 proceeds first to initialization routines 802 which perform the necessary functions for the start up of control system 600. The initialization routines provide the opportunity to perform system hardware specific setup and initialization before launching the real time operating system and application programs. Some of the initialization functions include loading a startup boot vector, setting up a stack, relocating initialized data from ROM to RAM, clearing unitialized data, loading an interrupt vector table, setting up system timers and counters, setting up a system real time clock, and setting up peripheral device controllers, among others.

After initialization, control system 600 proceeds to a number of restart procedures 804, which are further housekeeping functions that are accessed during power-up and during warm system resets. The resart procedures provide a means for performing various system setups before launching the application. They differ from the hardware initialization described above in that they include more system level initialization. In addition, at this level, there are RTOS services that are available for use. Some of the restart functions include initializing individual task timers, initializing RTOS internal variables, and launching an RTOS task scheduler. In addition, for debugging purposes, the restart functions have the capability of determining whether the software is resident in the target hardware for a counting scale, or whether the software is being used as a virtual scale on a personal computer such as the IBM ® PC. If the software is being used on a PC, several additional functions are performed.

Control system 600 is preferably a task-driven system. As such, it primarily performs a number of tasks in a parallel, or pseudo-parallel manner. Such multi-tasking operating systems for embedded systems are well known in the art, and the operation of such sytems will not be discussed in great detail herein.

Control system 600 has a number of tasks 808 which are each enabled and are run concurrently by control system 600. The allocation of processor time to each of these tasks is controlled by a RTOS (Real Time Operating System) task scheduler 806, such as the Kadak AMX Multitasking Executive Kernel that has been developed by Kadak Products Ltd. of Vancouver, B.C., Canada. This scheduler essentially allocates time between the various tasks to create a pseudo-parallel control.

The task scheduler 806 has a number of RTOS services 812 which are available to be used by an interrupt service routine (ISR). The RTOS services include such functions as task scheduling (pre-emptive, time slicing, etc.), timer control (create, start, stop, read, delete, etc.), clock control (set, read, format calendar time/date, etc.), interrupt control (begin, end, install ISR's, etc.), task control (create, start, stop, end, delete, start with conditions or messages, get status, wake up a task, etc.), message passing (create/delete a message exchange, send a message to a task, get a message, etc.), semaphore management (create, delete, get, wait, etc.) and resource management (reserve, release, free, etc.).

The various tasks 808 include an OS kernel, which provides many of the low-level hardware controls. This kernel accesses the timer procedures 810 which control the various timers in control system 600. Among these procedures, a system tick procedure is provided which reestablishes a counter value used to generate a next system tick, which is the standard fixed interval unit of time in the multi-tasking system. In the preferred embodiment, this system tick is about 50 ms. Further, a watchdog procedure is provided to maintain the watchdog timer so that the system will not be reset due to the watchdog timer expiring.

Also, the timer procedures include a time/date update which maintains the system time/date clock. Also, a weight meter update is provided which provides a periodic means of recalculating the weight and count values that are output to the user displays, which occurs about six to eight times per second in the preferred counting scale.

Other tasks provided in control system 600 include a key parser task 820, which controls the user interface of the scale, and a weight meter task 840 which controls the weight and count readings provided by scale 70 and performs the necessary mathematical operations necessary for obtaining these readings from the data provided over load cell bus 610. Each of these tasks will be discussed in greater detail below. Control system 600 further provides a cell communications task which periodically interrogates all of the load cells on the load cell bus and requests and stores raw cell counts measured by the load cells.

Also, control system 600 has a number of interrupt service procedures 814 which divert control flow for various low-level control procedures. Among these interrupts include the RTOS clock interrupt, which is controlled by RTOS clock handler 818. This routine updates the clock used in the RTOS task scheduler.

Also, additional interrupts are provided to control the communications with keyboard/display unit 100, the load cell bus 610, the various serial ports COM1, COM2, and COM3, as well as the external keyboard. An interrupt supervisor 816 is also included. Each ISR which needs to use any RTOS services must so inform the interrupt supervisor, and each ISR must inform the interrupt supervisor when it is complete. This enables the interrupt supervisor to return control directly to a task, or to request the task scheduler to suspend the interrupted task and execute another higher priority task if one has become ready for execution while the prior interrrupt was being serviced.

Thus configured, at a bond level control system 600 operates by the task scheduler 806 allocating processor time between the various tasks 808, such that each task is performed substantially concurrently. Interrupts will then divert program flow in order to perform communications with external devices, update timers, or perform other low-level housekeeping procedures.

The actual program code necessary to implement this type of task-driven control system is not provided herein, as the code necessary for this system is known in the art.

The key parser task will now be described in more detail. This task is shown as task 820 in FIG. 31. This task functions to handle the user interface for counting scale 70. It operates to handle key depressions and perform the proper procedures for handling that key depression.

Figure 31:
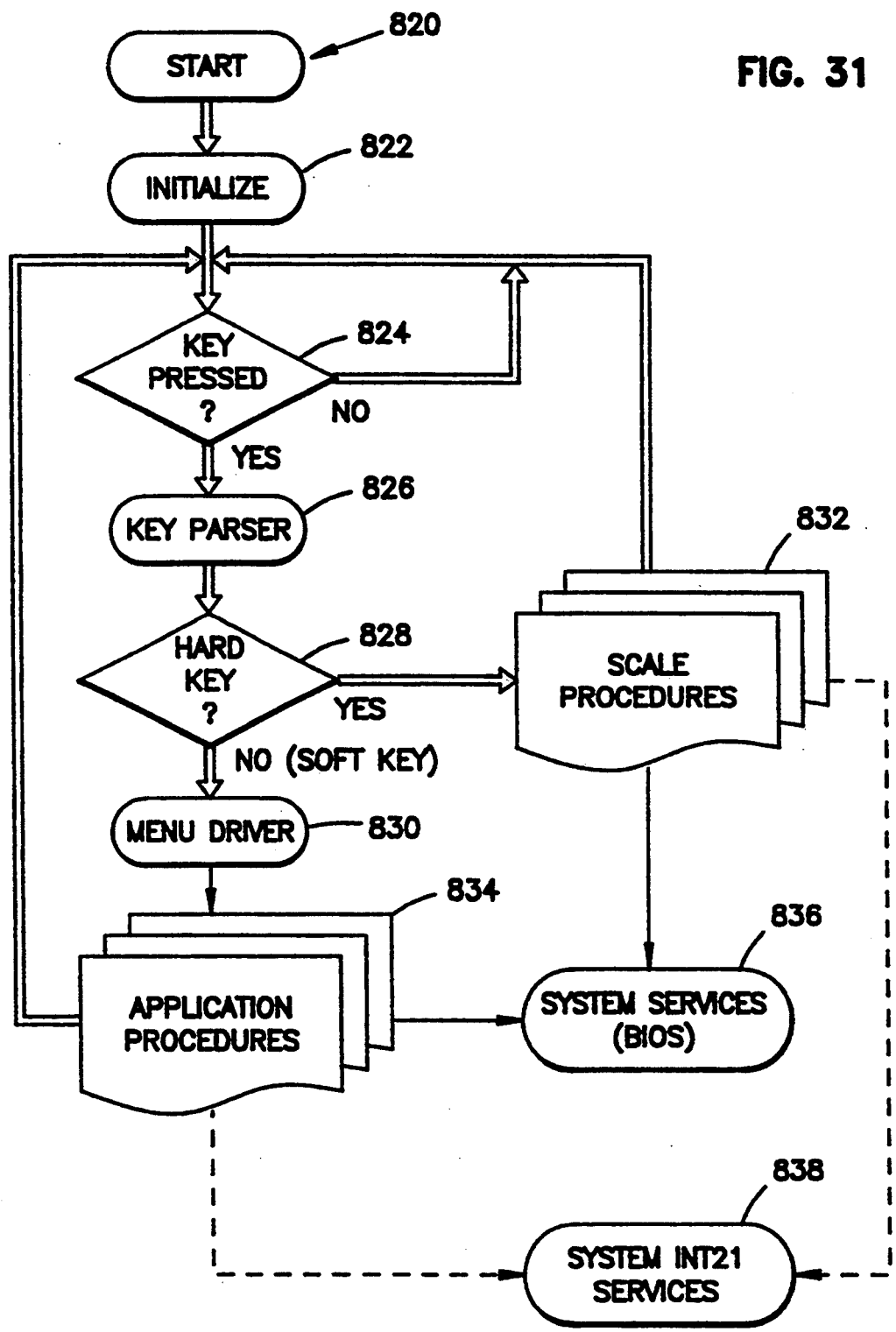
FIG. 31 is a dataflow diagram of the KEY PARSER task shown in FIG. 30.

As can be seen in FIG. 31, the key parser task 820 begins with an initialization routine 822. This initialization routine performs such functions as presetting system variables; establishing a floating point stack; determining whether the software is running on target hardware or a PC; loading system variables from nonvolatile memory; scanning, logging online, and establishing communications with load cells; determining an appropriate application parser task to run; and launching the appropriate task, among others. Once initialized, this task repeatedly checks for a key depression in block 824, and waits in a loop until a key has been pressed, and has been flagged by one of the low-level keyboard handlers. Once a key has been pressed, control passes to a key parser routine 826, which determines which key has been pressed. Block 828 determines whether or not the depressed key was a hard key. If the key pressed was a hard key, control goes to the proper scale procedure 832 which handles that particular key. Separate procedures exist for handling the TEST key, the RESET key, the ZERO key, the TARE key, the T/CLR key, the ESC key, as well as the numeric keys 0-9, the DECIMAL POINT key, the CLEAR key, and the ENTER key.

The various scale procedures 832 have access to a number of system services 836 in the BIOS. These services, which will be discussed later, provide the low-level control over communication with various devices.

If a key depression is not a hard key, but is rather a soft key, control is diverted instead to a menu driver 830. This menu driver is capable of controlling which menu is displayed for the various soft keys. If a soft key has been pressed which selects another menu, the menu driver 830 will reconfigure the soft keys and display this new menu. Further, if a soft key has been pressed which requires specific processing, menu driver 830 will call one of a number of application procedures 834 which handle the control over the various functions which are accessible through the menu system. Further, each of these application procedures 834 has access to the same system services 836 in the BIOS.

The various application procedures 834 control the functions accessible through the menu system by the soft keys. For instance, procedures are provided for handling the accumulator function, the piece weight selection, or the serial communications function. Application procedures are also included to control the menu system for the various other modes besides the normal mode of counting scale 70. This will include such modes as the calibration mode, the configuration mode, the test mode, the metrology mode, and the service mode. The service mode, which is also designated the engine, provides diagnostic tests for the hardware in the system.

Both the application procedures 834 and the scale procedures 832 can be interrupted, in which control flow will be diverted to system interrupt services 838. The interrupt services include functions for handling the system tick, the system time/date clock, keypad entry, display output, load cell communications, keyboard entry, general purpose serial I/O, and low level system software functions, among others.

The particular code necessary to perform the operations of the key parser task is not described herein. This necessary code could be generated by a worker in the art, and any particular code is a design choice.

Figure 32:
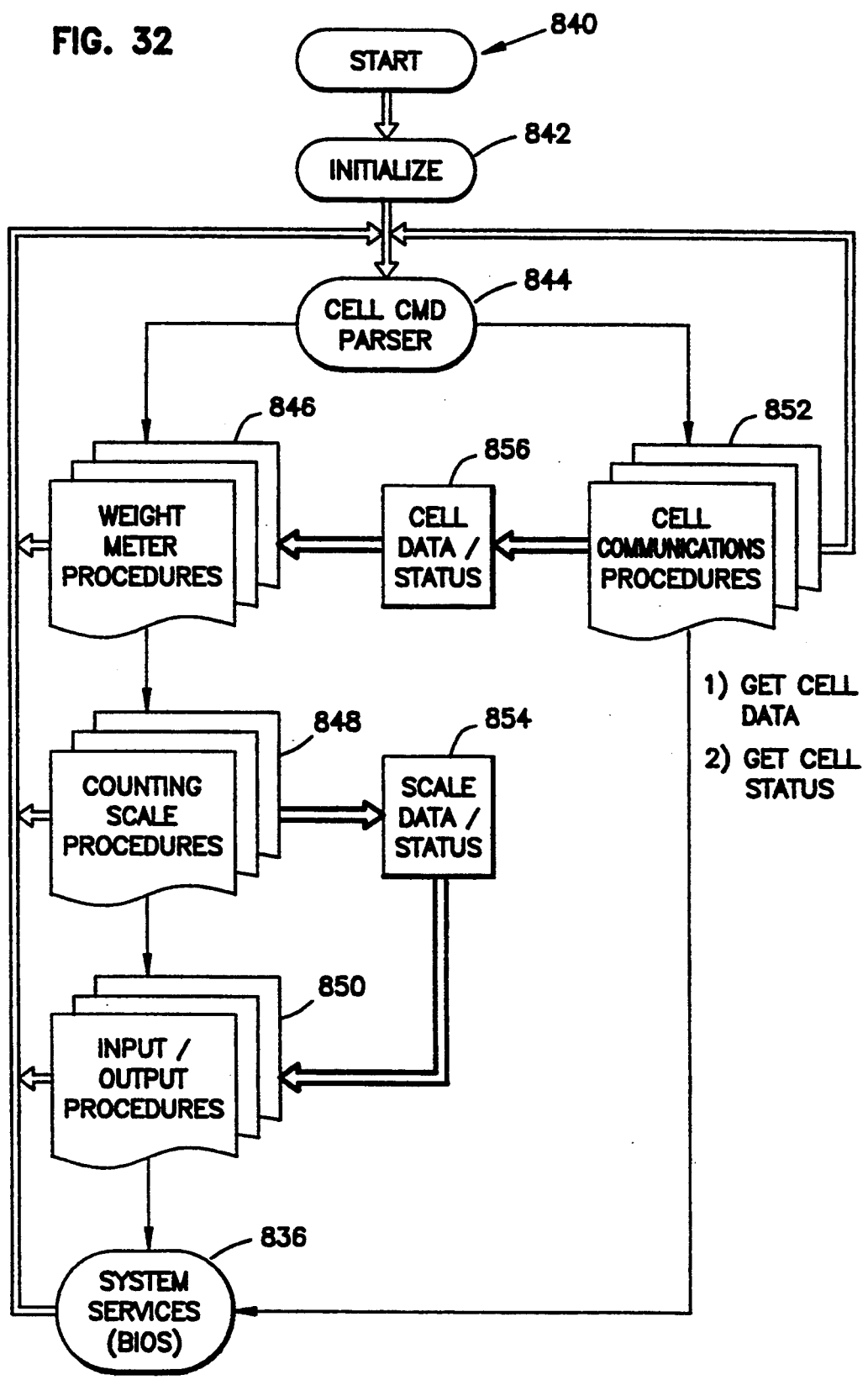
FIG. 32 is a dataflow diagram of the WEIGHT METER task shown in FIG. 30.

The weight meter task is Shown as task 840 in FIG. 32. This task performs the basic communications with the load cell assemblies or other weighing devices connected to load cell bus 610, as well as the basic mathematical computations necessary to provide weight and count information to a user from the raw data provided therefrom, taking into account the various units, offsets and other features selected by user. This task also starts in an initialization block 842, which performs such initialization routines such as setting up a floating point stack and setting up a number of local working variables including tolerance and other limits.

Once initialized, the weight meter task diverts control to a cell command parser 844, which performs the master control for the task. This parser 844 is capable of calling a number of procedures to perform cell communications and to process and format data received from the weighing devices. Also, this parser 844 is capable of providing formatted and processed data to other tasks within the control system 600.

A group of cell communications procedures 852 are provided to cell command parser 844 to provide the communications between the control system 600 and the various weighing devices on load cell bus 610. These procedures 852 are able to request load cell assemblies or other weighing devices on the bus to provide data or status information. Also, the procedures 852 are able to provide command and control the various devices on the bus. All of the data and status information which is received by communications procedures 852 is stored in a cell data/status data block 856, for access by other components of control system 600. The protocol for communication with load cells on the bus is proprietary; however, one skilled in the art will appreciate that any known communication protocol may be implemented so long as both the control system and the various load cells are capable of producing and receiving the same commands.

Figure 33:
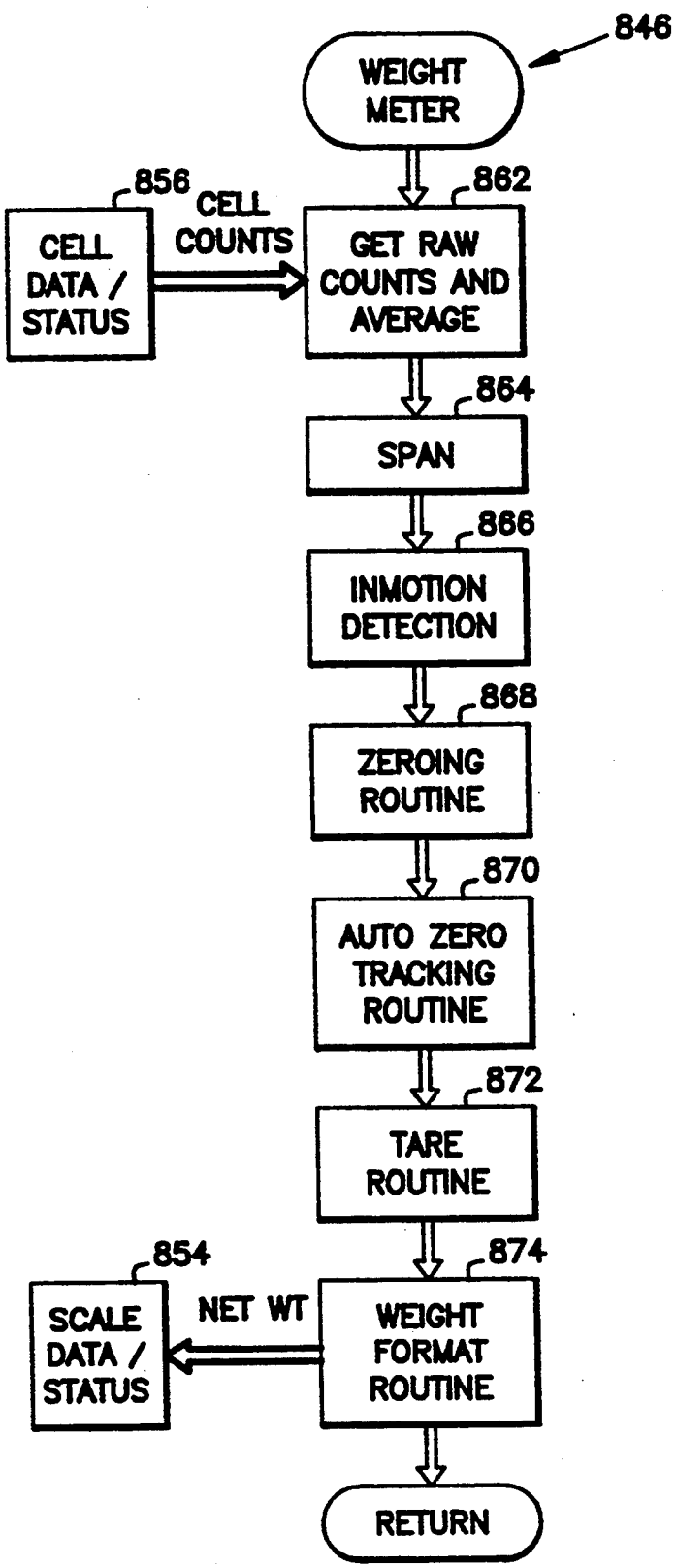
FIG. 33 is a dataflow diagram of the Weight Meter procedures shown in FIG. 32.

The cell command parser 844 also has access to a number of weight meter procedures 846. These procedures also have access to the cell data/status data block 856. These various procedures are used to format and compute a weight value to be displayed or printed given the information received from the cells. These weight meter procedures are shown as block 846 in FIG. 33.

The weight counts received from any of the load cell assemblies are provided from data block 856 to weight meter procedures 846. Routine 862 obtains these raw counts and averages them to obtain more stable readings. Preferably, the number of readings averaged is configurable to provide SLOW, NORMAL, and FAST response times. For NORMAL mode, it is preferable to store and average eight successive readings to obtain an averaged count value.

The Span routine 864 performs much of the calibration work by applying a span factor coefficient to the averaged count value. This span factor coefficient may be found during scale calibration when the scale capacity and displayed resolution are known by taking raw counts from a load cell under no applied load and full capacity. The span factor coefficient is the difference of these two counts. In normal operation the weight meter routine will apply this coefficient to a zero-corrected count value to obtain a value which is a proportion of the full capacity of the scale.

The Inmotion Detection routine 866 determines whether or not the scale is in motion (i.e., whether the weight counts are changing due to an object being placed on the scale). By comparing the change in weight counts with a set of pre-defined limits, a flag may be set to inhibit certain functions from occuring when the scale is in motion, such as the computing piece weight function, the zeroing function, or the printing displayed weight function, among others.

The Zeroing routine 868 will zero the scale if the ZERO key has been pressed and if no motion was detected by the Inmotion Detection routine 866. This routine establishes a new zero weight reference point from which subsequent measurements are made. It is similar to a tare routine in that it allows container or other extraneous weights to be eliminated from the weight measurement; however, the zeroing function allows for an auto zero tracking function.

The Auto Zero Tracking routine 870 operates to track out zero drift from scale readings. It operates to subtract out very small changes in the value that may occur due to temperature drift or small amounts of product buildup on the scale between readings, by sensing when a running average of zero readings begins drifting away from the true zero.

The Tare routine 872 will operate to subtract out the tare value which has been stored by control system 600. This tare value is used to remove from the weight reading the weight of any containers which are placed on the scale. It is similar to the zero function in that container weight is removed from a weight reading; however, it differs in that a new zero reference value is not established, so that, for instance, a gross weight value can be determined on demand after the product weight has been measured. Also, auto zero tracking is typically not active in the case of the tare function.

A Weight Format routine 874 operates to format the weight value which has been computed using the other routines, for display and printing purposes. This weight value is also stored in order to enable the count routines to compute the count from this weight value. The output of this weight format routine is a net weight value which is provided to a scale data/status data block 854 for use by other routines in the system.

The above weight meter procedures are common in many counting scales. Consequently, no program code is provided herein as the functions provided by these routines are known in the art, and one of ordinary skill could reduce each of these routines to the necessary program code.

Returning to FIG. 32, a number of counting scale procedures 848 are also provided, and which are also accessible by cell command parser 844. These counting scale procedures control the count values which are displayed to a user. These various procedures have access to the scale data/status data block 854 to obtain weight readings and to provide count readings to the rest of the control system 600.

Figure 34:
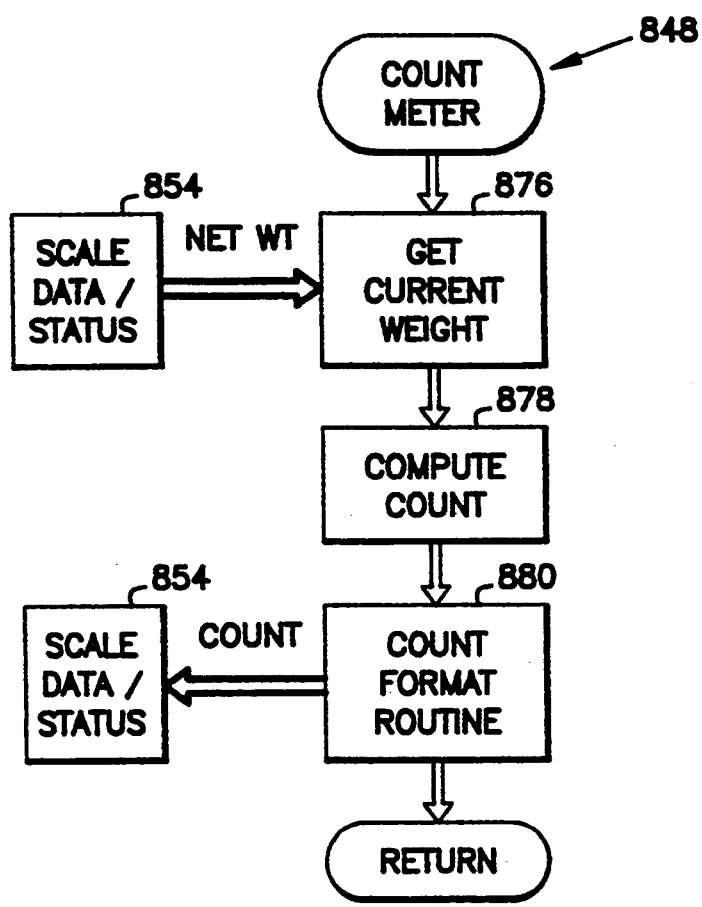
FIG. 34 is a dataflow diagram of the Count Meter procedures shown in FIG. 32.

The various counting scale procedures are shown in FIG. 34 as count meter procedures 848. The Get Current Weight routine 876 simply obtains the net weight reading from scale data/status block 854. The Compute Count routine 878 computes the count value from this net weight, by using the current piece weight which is stored in the system. This piece weight can be obtained from a number of methods, as described above. The Count Format routine 880 operates to format the count obtained, for the purposes of displaying on keyboard/display unit 100, for printing to external devices, and for the accumulation function. The output of this routine is the count value, which is stored in scale data/status block 854.

Again returning to FIG. 32, a number of input/output procedures 850 are provided and accessible by counting scale procedures 848. These procedures also have access to the scale data/status data block 854, and they include such functions as rounding, display formatting, piece weight entry, piece weight lookup and count accumulating.

Weight meter task 840 also has access to the systems services 836 provided in the BIOS of control system 600.

Many of the mathematical functions provided by weight meter task 840 are common to all counting scales. Further, the communications procedures for communicating with load cell assemblies on load cell bus 610 are commonly-known communication controls. Therefore, no program code for weight meter task 840 is provided herein, as it could be generated by one of ordinary skill in the art.

Figure 35:
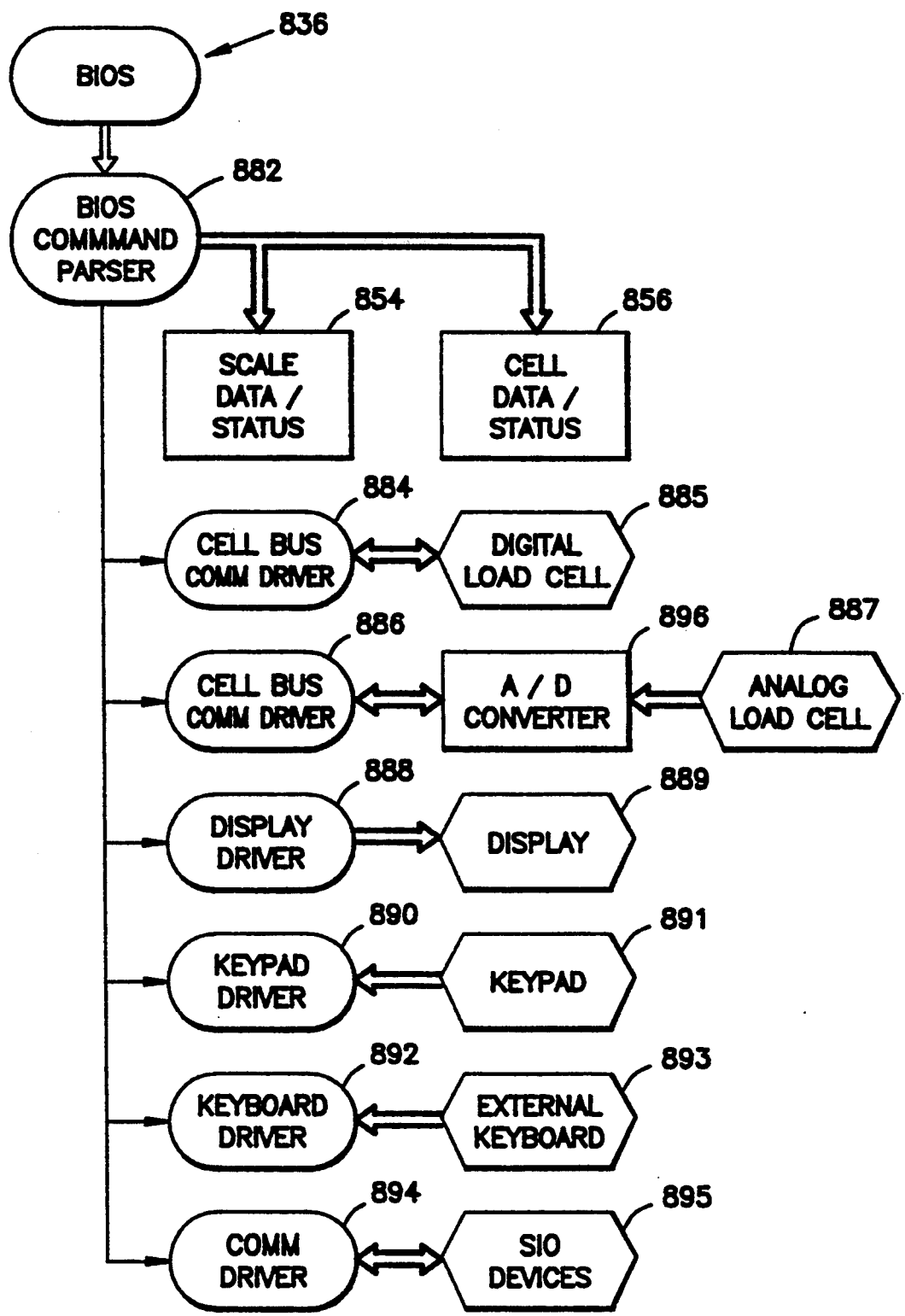
FIG. 35 is a dataflow diagram of the BIOS System Services shown in FIGS. 31 and 32.

The various systems services provided by the BIOS of control system 600 are shown in FIG. 35. These BIOS functions are low-level control routines for providing communication with various internal and external devices connected to counting scale 70. The BIOS command parser 882 provides the interface between the higher level application routines and the various BIOS routines. The scale and cell data/status data blocks 854 and 856 are also accessible by the BIOS.

As can be seen in FIG. 35, the load cell bus driver is shown as block 884. This block is shown connected to a digital load cell 885. Further, another cell bus driver 886 is shown connected through an A/D converter 896 to an analog load cell 887. Both of these drivers are shown in this Figure to demonstrate the communications over load cell bus 610. As shown here, digital load cell 885 corresponds to load cell assembly 200 or any other load cell assembly connected to the bus. Further, the A/D converter 896 corresponds to the second analog base option 660, and the analog load cell 887 corresponds to strain gauge 662. Both load cell bus drivers 884 and 886 communicate over load cell bus 610, and are shown separately only for explanatory purposes. As discussed above, any device connected to load cell bus 610 is preferably controlled in the same manner, so drivers 884 and 886 are preferably the same routine.

Display driver 888 is a routine for communicating with display 889, which corresponds to display driver 680 and keyboard/display unit 100. Further, keypad driver 890 is shown communicating with a keypad 891 which corresponds to the keyboard in keyboard/display unit 100, also controlled by display driver 680. Both display driver 888 and keypad driver 890 communicate with display driver 680 over the RS485 bus 702. Their communication with the display and keypad are shown separately only for explanatory purposes.

Keyboard driver 892 is shown connected to an external keyboard 893. This keyboard driver 892 communicates with the external keyboard driver 640 in the control system hardware. This enables an AT-type external keyboard to be controlled by control system 600.

COM driver 894 is shown connected to serial input/output devices 895. This COM driver communicates with the UARTs used in dual port serial interface 650 and 625, to provide communications over the three RS232 COM ports.

These various BIOS low-level drivers operate using commonly-known communication protocols with external devices. Consequently, no program code for these drivers is provided herein, as the choice of code used to implement these drivers is one of design choice.

As can be seen from the discussions above, control system 600 is a complex integrated operating system for controlling all aspects of the counting scale 70. Not shown is a counting scale engine, which separately provides various diagnostic capabilities under the service mode for servicing and other requirements. This engine is preferably accessed by separate DIP switches provided on counting scale 70, or through a password-protected menu structure accessible through the TEST key on keyboard/display unit 100. It generally contains all of the diagnostic capabilities necessary to test all of the hardware configurations in the counting scale. Such hardware diagnostic routines are well known within the art, and will not be discussed in greater detail herein.

One skilled in the art will appreciate that, using the control organization shown for control system 600, counting scale 70 can be configured to provide any number of functions. Further, it is easily expandable by adding separate tasks and/or routines to provide the additional functions. As the program code necessary for implementing all of these tasks is quite voluminous, it is not provided herein. One of ordinary skill in the art could generate the necessary program code for implementing the various functions necessary for a counting scale given this control organization.

D. Operational Description

The control system 600 of counting scale 70, when the scale is turned on, preferably cycles through a number of self tests, and enters a normal mode, which provides most of the functions necessary for the day-to-day use of counting scale 70. Other modes, such as the calibration mode, the configuration mode, the metrology mode, or the service mode are accessed through DIP switches located within the base of counting scale 70, or through the TEST key. These other modes are necessary only for advance control of the counting scale, such as during servicing, calibration, or initial set-up of the scale on site.

All of these modes which are accessible by a user are preferably controllable through the soft keys on keyboard/display unit 100. The particular implementation and menu structure for all of these modes is primarily a design choice, and therefore within the ordinary skill of the art. Thus, the particular menu structures, and the code necessary for their implementation are not provided herein. However, for ease of illustration of the various concepts which are preferably incorporated into preferred menu structures, a discussion will now be provided of a preferred normal mode menu structure 900, shown in FIGS. 36A–36C. Further, legend 901 in FIG. 36A explains the function of each type of block in the figures.

Figure 36A:
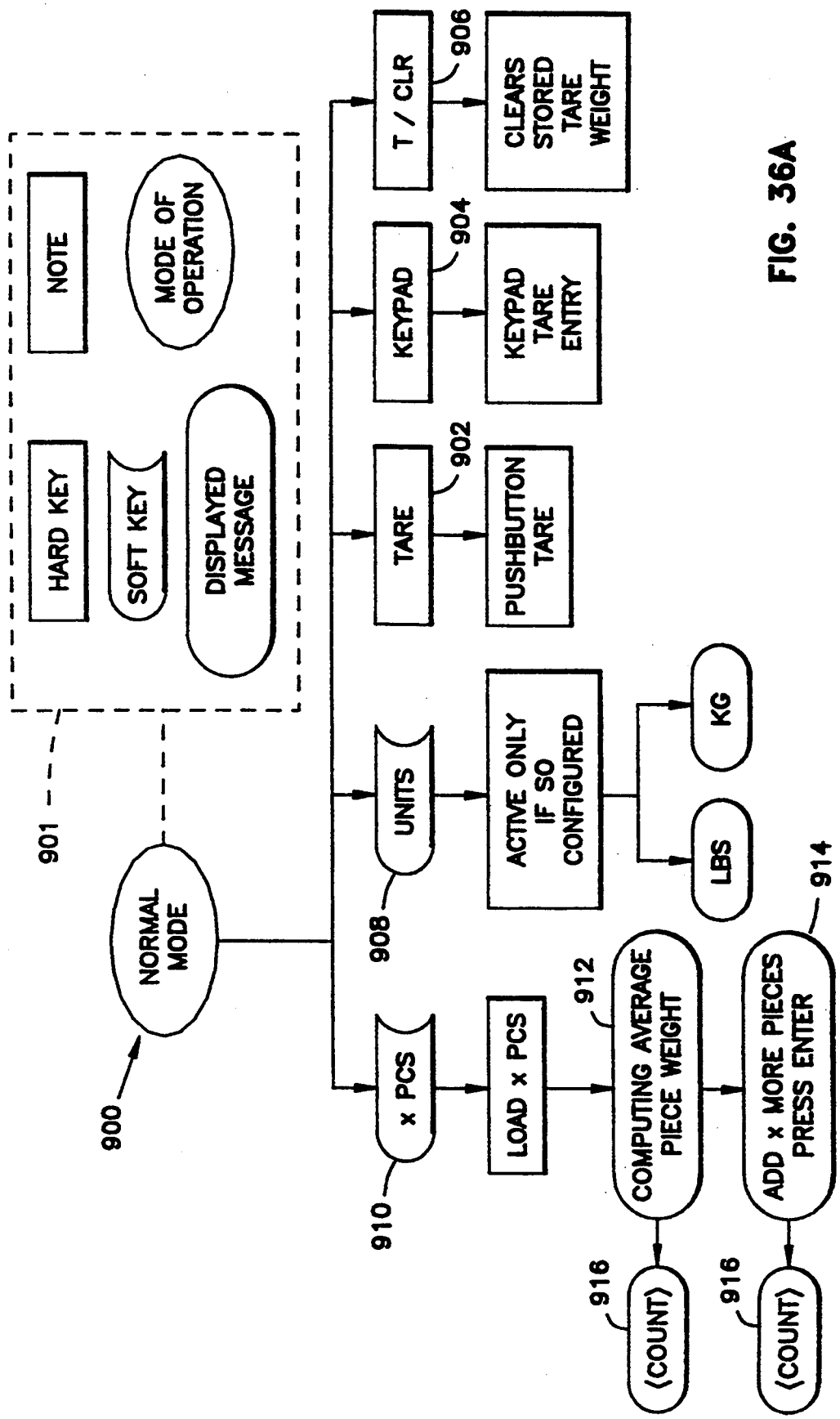
FIGS. 36A, 36B and 36C are menu state transition diagrams of a preferred Normal Mode menu structure for the counting scale control system of FIG. 28, consistent with a preferred embodiment of the invention.

In the normal mode, a number of hard keys may be pressed to perform commonly-used functions. Referring to FIG. 36A, the TARE key 902, the keypad keys 904, and the T/CLR key 906 are shown for providing the tare control functions. Regardless of the state of the scale, TARE key 902 sets the tare value at whatever weight is currently sensed, as long as the weight reading is stable (no motion) and the weight reading is not zero. Alternatively, the keypad keys (0–9, ".") can be used instead to input a new tare value. The ENTER and CLEAR keys are activated in this mode, and pressing the ENTER key with a numerical value entered sets the tare at that entered value. The T/CLR key 906, on the other hand, clears out any tare value which has been previously stored.

Keypad keys 904 consist of the 0–9 keys and the decimal point key ("."). By pressing any of these keys in the normal mode, the control system 600 requests tare entry, so that when the ENTER key is pressed, the tare is set to be the value entered. These keys are also used whenever input is requested from a user, such as part numbers, piece weights, etc.

Figure 36B:
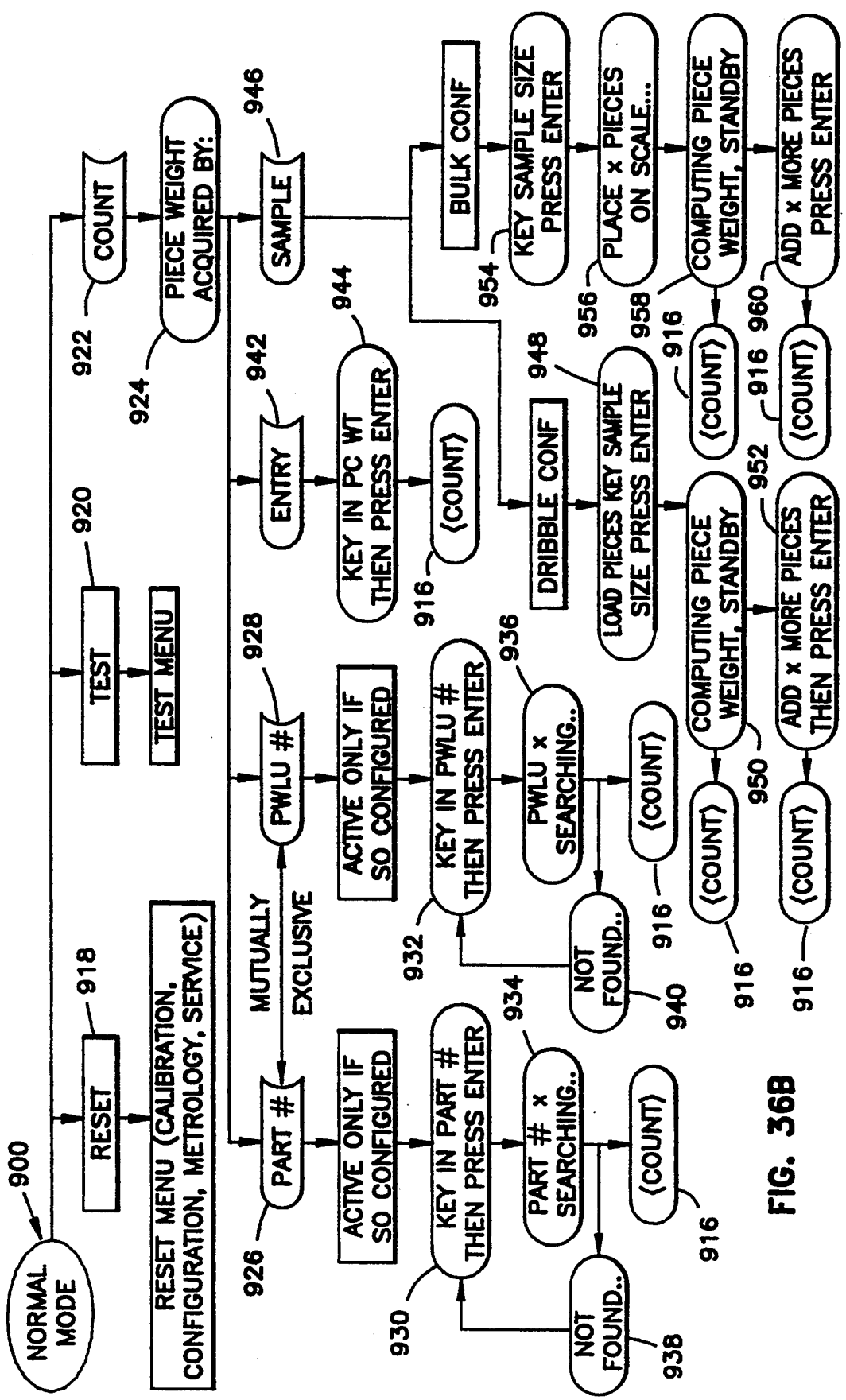

Referring to FIG. 36B two other hard keys are listed, the RESET key 918 and the TEST key 920. The RESET key 918 resets the scale, and if any of the DIP switches inside scale 70 (not shown) are set to other than the normal mode, the scale restarts in the selected mode, such as the calibration mode, the configuration mode, the metrology mode, or the service mode. This reset function is preferably not a "hardware" reset, but rather operates to reset a number of working variables such as the tare, piece weight, accumulator, transaction count, and sample key mode, among others. It preferably does not, however, reset the zero of the scale or the currently selected base or clear out any of the databases.

The TEST key 920 forces control system 600 into a test menu. In this test menu, several simple diagnostic tests may be run to check for the proper operation of the scale. Some of these tests include display tests, keypad tests, and basic memory tests. The test menu also enables a user to enter the current time and date, or to find out information on the software version that is installed. It is also preferable for the test menu to include access to a number of password-protected commands. Upon the proper entry of a user, technician, or factory password, a user is able to access additional advanced functions. For example, it is preferable that upon the entry of a user password, the print format may be changed or a database editor may be entered to enter or change entries in a database. Also, upon the entry of a technician password, a technician is able to force control system 600 into one of the configuration, calibration, metrology, or service modes, or to change passwords. Also, upon the entry of a factory password, a cold initialization routine can be initiated such that calibration and other configuration data which has been stored in non-volatile memory is replaced with manufacturing defaults stored in the read only memory.

Other hard keys include the ZERO key (not shown) and ESCAPE key (also not shown). The ZERO key zeros the weight reading on the scale by establishing a new zero weight reference point from which subsequent measurements will be made. It is also enables auto zero tracking to correct for minor drifts away from this zero weight reference point. The ESCAPE key enables a user to escape from whatever function is currently selected, and to back up through the menu structure.

Figure 36C:
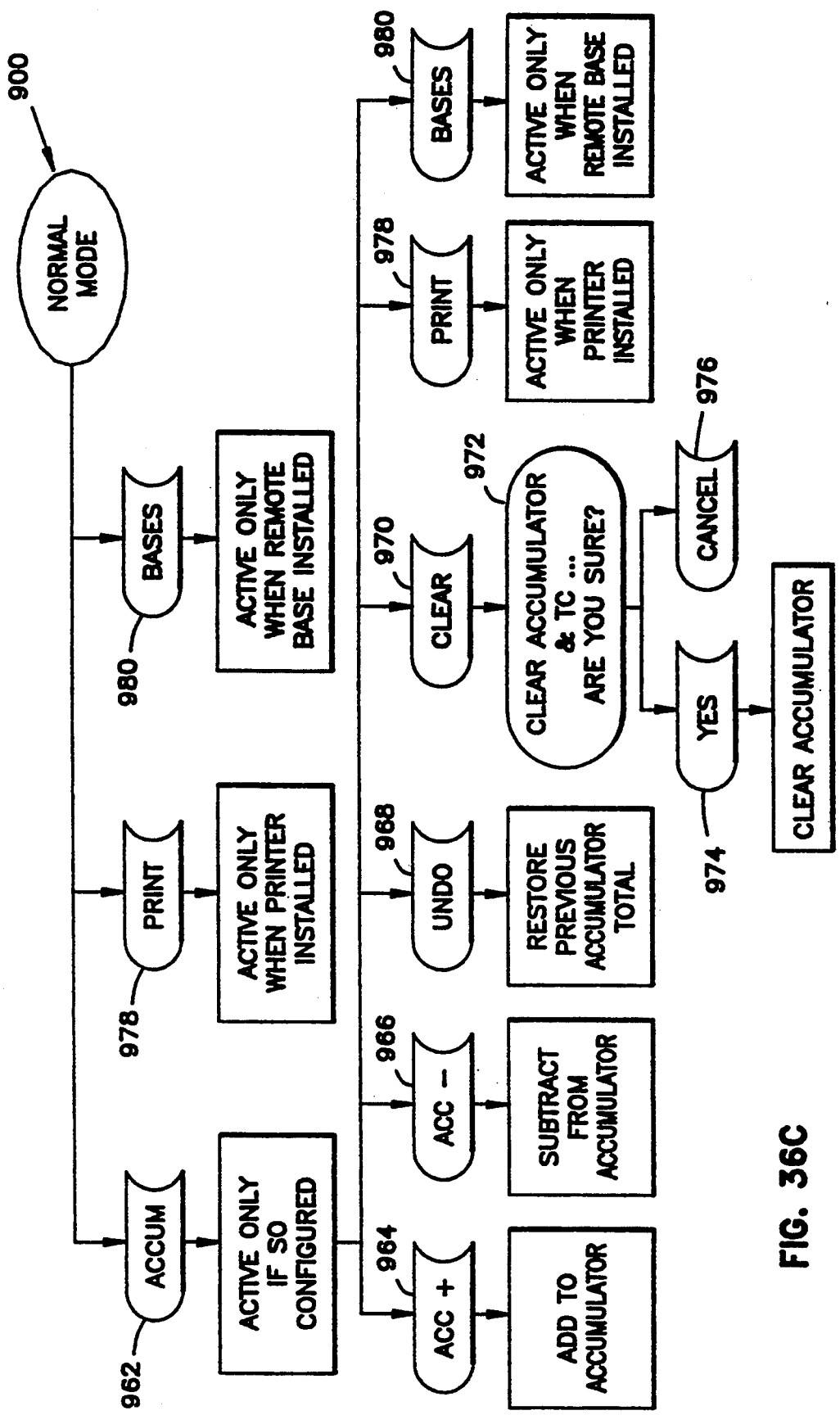

In addition to the various hard keys, the soft keys in keyboard/display unit 100 are initially configured as shown in FIGS. 36A–36C. The particular correspondence between a key and the soft key function that is defined and displayed on the alphanumeric display is not important. Whichever function is assigned to a particular key on keyboard/display unit 100 is merely a design choice.

As seen in FIG. 36A, a "UNITS" key 908 is configured so that the units of measurement are toggled between pounds and kilograms if the scale is so configured. This key may be disabled, and the function not displayed, if the scale is not configured to switch between units, such as in countries in which english pounds are never used.

The "X PCS" key 910 is configured to enable a quick piece weight calculation. The "X" for the display of this key is preferably 5, 10, 25 or 50. If no pieces have been placed on the scale (i.e. the weight reading is zero) when this key is pressed, the number of pieces "X" toggles to display the next of these values. If, however, the scale is in bulk mode and the user places the required number of pieces on the scale before pressing this key, a quick piece weight value is computed. The display indicates "computing average piece weight" in block 912. Once the average piece weight has been calculated, a new count value is computed, and the display updated, in block 916. However, if the minimum accuracy level which has been selected for the scale in the configuration mode is not met by adding these pieces, the scale requests in block 914 to add more pieces and press ENTER, so that a valid piece weight can be calculated. Then, a new count value is computed in block 916.

Referring now to FIG. 36B, the "COUNT" key 922 command structure is shown. This key 922 changes the display to a new menu which enables the piece weight to be entered from a variety of sources. In this menu, the top line of the display states "PIECE WEIGHT ACQUIRED BY:" as shown in block 924. Further, the soft keys are programmed to include an "ENTRY" key 942 and a "SAMPLE" key 946. Further, depending upon the configuration which is set by the user, either a 'PART#" key 926 of "PWLU#" key 928 is displayed. The first of these keys, key 926, allows a database search to be performed on a part number, while the second of these keys, key 928, allows database to be searched by a piece weight look-up number internal to the scale.

The "ENTRY" soft key 942 prompts the user to "KEY IN PC WT, THEN PRESS ENTER" in block 944. Once a user has then entered a piece weight, the count is updated in block 916 based upon this new piece weight.

If the user presses the "SAMPLE" key 946, either a dribble sample or a bulk sample routine is initiated, depending upon which configuration has been chosen by the user. If the dribble sample mode has been chosen, the system prompts the user to "LOAD PIECES, KEY SAMPLE SIZE, PRESS ENTER" in block 948. Once the pieces have been loaded and the sample size has been keyed in, the system prompts the user "COMPUTING PIECE WEIGHT, STAND BY" in block 950. If the minimum accuracy has been met, the system proceeds to block 916 to update the count value based upon this new piece weight. If, however, the minimum accuracy has not been met, the system proceeds to block 952 to prompt the user to "ADD X MORE PIECES, PRESS ENTER". The control system computes the necessary additional number of pieces for meeting this minimum accuracy. Once these pieces have been added and the ENTER key has been pressed, the count value is then updated in block 916.

If the bulk sample mode has been selected by a user, a different protocol is followed. First, the user is prompted to "KEY SAMPLE SIZE, PRESS ENTER" in block 954. Once this sample size has been entered, the user is prompted to "PLACE X PIECES ON SCALE", in block 956 ("x" being the sample size entered). Once the control system senses that pieces have been placed on the scale, the user is prompted with "COMPUTING PIECE WEIGHT, STAND BY" in block 958. The control system waits for this value to stabilize, and if the minimum accuracy is met, the count is updated with this new piece weight in block 916. If, however, the minimum accuracy has not been met, the user is prompted to "ADD X MORE PIECES, PRESS ENTER" in block 960. The number of pieces required is computed by the scale in order to meet minimum accuracy. Once these pieces have been added, and the ENTER key pressed, the count is updated with this new piece weight in block 916.

The "minimum accuracy" which has been discussed above is preferably selectable by a user in the configuration mode. This accuracy will also depend upon the type of weighing device (internal or external digital load cell assembly, or analog strain gauge) which is selected. For a digital load cell assembly, the options for minimum accuracy are in the range of 90% to 99%.

If a "PART#" key 926 is enabled, the user is prompted to "KEY IN PART # THEN PRESS ENTER" in block 930 when this key is pressed. This part number is a field in the records stored in a piece weight database. This database can be either an internal database, an expanded database using the memory option of control system 600, or an external database accessed through a serial port. This part number might be a manufacturer's code for the particular parts to be counted. Therefore, counting scale 70 is able to use part numbers used in other facets of a manufacturing process to access piece weight data. No cryptic or scale-specific record numbers need be learned or remembered in order to call up a piece weight.

Once the part number is keyed in, the system prompts the user with "PART NUMBER X SEARCHING..." in block 834 (X being the numbered keyed in). If this part number is found, the piece weight is updated with the piece weight stored in the database, and the count is then updated in block 916. If, however, the part number is not found, the user is advised of this in block 938, and control is returned to block 930. As configured, a large number of parts can be stored in the database, and their piece weights may be found easily from these numbers.

If the "PWLU #" key 928 is enabled, the user is prompted with "KEY IN PWLU # THEN PRESS ENTER" in block 932, whenever the key is pressed. This piece weight lookup number (PWLU) is a record number in the scale's database. Once this value has been input, the user is prompted with "PWLU X SEARCHING ..." (X being the value entered) in block 936. If the particular record is found, the piece weight is updated with the piece weight stored in that record, and the count is updated in block 916. If, however, the record is not found, the user is advised as so in block 940, and control is returned to block 932.

Therefore, it can be seen that the piece weight can be input and updated quickly and easily through a number of ways by the user interface. This is especially useful when a counting scale is to be used to count a wide variety of parts during the typical session.

Referring now to FIG. 36C, additional soft keys are programmed, including "ACCUM" key 962, "PRINT" key 978, and "BASES" key 980. The "PRINT" key 978 is active only when a printer is installed. If no printer is installed, this key is programmed and "PRINT" is not displayed. Pressing this key outputs the current weight and count values to a printer, in the format selected elsewhere by the user.

The "BASES" key 980 is active only when a remote base is installed. If only one base, the internal load cell assembly, is installed, then this legend is not displayed, and the key is not active. If more than one base is available, this legend is displayed, and the currently selected base is indicated. Pressing key 980 toggles the current base between those currently available. The configuration and selection of these bases is performed in a configuration mode, and is not discussed further herein.

The "ACCUM" key 962 is also active only if a technician has configured the scale as such. This key reconfigures all of the soft keys to a new menu which provides a number of accumulator functions for keeping running tallies of total weights, counts and transactions.

In the accumulator menu, the top line of the display shows a total accumulator count, a total weight count, and a total transaction count (tc). Also, the current base which is selected is displayed. In this mode, a running count and weight can be maintained over several readings. During this accumulator menu, the "PRINT" key 978 and "BASES" key 980 are provided if currently activated.

When this menu is selected by pressing key 962, a new set of soft keys are available to the user. An "ACC+" key 964 is available to add the current count value to the accumulator value. An "ACC−" key 966 likewise is available to subtract the current count value from the accumulator. An "UNDO" key 968 removes the last count value that was added or subtracted from the accumulator.

A "CLEAR" key 970 prompts the user with "CLEAR ACCUMULATOR & TC ... , ARE YOU SURE?" in block 972. The user is then provided with a "YES" soft key 974 and a "CANCEL" soft key 976. By pressing the "YES" key 974, the accumulators and transaction counter are cleared. Pressing the "CANCEL" key 976 exits this function without clearing the accumulator.

It can be seen that in the normal mode, all of the most common functions necessary for the day to day operation of counting scale 72 are provided to a user. Thus, relatively little expertise on the system is required in order to operate the scale. This reduced learning curve is preferred when a number of different operators use the scale. The more advanced functions such as calibration, diagnostics, and configuration, are not accessible by all operators of the scale.

The more advanced functions of the scale are not described in detail herein. One skilled in the art would be able to program control system 600 to provide these or any other advanced functions given the structure provided herein. In addition, while the menu structure of normal mode 900 shown in FIG. 36A-36C is preferred, one skilled in the art will appreciate that any of a number of alternative menu structures, and any other additional functions, could be provided as an alternative to that disclosed herein. The structure shown in FIGS. 36A-36C is merely for illustration, and shows only one way of providing access to the scale's operations.

E. Performance

Counting scales consistent with the present invention exhibit greater accuracy than prior art counting scales. In a standard deviation test, which measures the standard deviation of the error for a number of weight samples, it was found that a counting scale constructed consistent with the invention was able to obtain a standard deviation error nearly three times better than the best prior art counting scale tested.

Forty data samples each were taken on a Toledo 8572 and a Toledo Mettler SM, manufactured by Toledo Scales, and a Setra Super Count, manufactured by Setra, all of which are commercially-available counting scales in the art. Likewise, forty data samples were taken on a counting scale constructed consistently with the present invention.

Each sample was taken as follows: a known weight of 0.1% of the full scale capacity of the scale being tested (e.g. 0.1 lbs. for a 100 lb. scale) was placed on the scale. A piece weight was computed by telling the scale that 100 pieces were on the scale. Next, the 0.1% full scale weight was removed, and a known weight of 50% of the full scale capacity (e.g. 50 lbs. for a 100 lb. scale) was placed on the scale, which would give an expected count of 50,000. The count value displayed was then recorded. After forty such readings were taken as described above, a standard deviation of the forty samples could be computed.

Under these conditions, the standard deviations were as follows: 150 for the Toledo 8572, 133 for the Setra Super Count, and 62 for the Toledo Mettler SM. The counting scale of the invention obtained a standard deviation of 21, nearly three times better than the best of the other scales tested. Moreover, separate tests were run on the counting scale of the invention using sample weights of 0.05% FS and 0.024% FS. At 0.05% FS, the standard deviation was still 37, and at 0.024% FS the standard deviation was 94.

Therefore, it may be seen that the present invention provides significant improvements in accuracy and resistance to environmental effects over the prior art.

The above discussion, examples and embodiments illustrate our current understanding of the invention. However, one skilled in the art will appreciate that various changes may be made without departing from the spirit and scope of the invention. Therefore, the invention resides wholly in the claims hereafter appended.

We claim:

1. A load cell assembly comprising:
   (a) a load cell capable of being subjected to an applied force;
   (b) first and second transducers operatively mounted on the load cell, each transducer having a resonant frequency that varies with the applied force;
   (c) means for driving the first and second transducers at their resonant frequencies, respectively, for providing first and second frequency signals; and
   (d) means for providing a force value indicative of the applied force on the load cell comprising:
      (i) converting means, operatively connected to receive the first and second frequency signals, for converting the first and second frequency signals to first and second values, respectively, wherein the converting means comprises a time base frequency counter and first and second input capture latches operatively connected to receive an output of the counter, wherein the first and second latches have gate inputs operatively connected to receive gating signals from the first and second frequency signals, respectively; whereby the first and second values provided by the converting means are representative of one or more periods of the first and second frequency signals, respectively:
      (ii) means operatively connected to receive the first and second values for linearizing and rejecting common-mode effects therefrom to provide a linearized difference value; and
      (iii) means operatively connected to receive the linearized difference value for rejecting temperature effects therefrom to provide the force value.

2. The load cell assembly of claim 1, wherein the counter is free running, and wherein the first value provided by the converting means is representative of the difference between two values latched by the first latch and the second value provided by the converting means is representative of the difference between two values latched by the second latch.

3. The load cell assembly of claim 2, further comprising first and second queues operatively connected to receive outputs latched by the first and second latches, respectively, wherein the first and second values provided by the converting means are representative of averages of m entries in the first and second queues, respectively.

4. The load cell assembly of claim 1, further comprising first and second frequency dividers operatively connected to receive the first and second frequency signals and to provide first and second gating signals to the gate inputs of the first and second latches, respectively, the first and second gating signals being representative of the first and second frequency signals divided by n, respectively; whereby the first and second values are representative of an average of n oscillations of the first and second frequency signals, respectively.

5. A load cell assembly comprising:
   (a) a load cell capable of being subjected to an applied force;
   (b) first and second transducers operatively mounted on the load cell, each transducer having a resonant frequency that varies with the applied force;
   (c) means for driving the first and second transducers at their resonant frequencies, respectively, for providing first and second frequency signals; and
   (d) means for providing a force value indicative of the applied force on the load cell comprising:
      (i) converting means operatively connected to receive the first and second frequency signals for converting the first and second frequency signals to first and second values, respectively;
      (ii) means operatively connected to receive the first and second values for linearizing and rejecting common-mode effects therefrom to provide a linearized difference value, wherein the means for linearizing and rejecting common-mode effects comprises:
         (1) means for scaling the first and second values to obtain first and second scaled values, respectively, such that changes in sensitivity of the first and second transducers are substantially similar; and
         (2) means for taking the difference of the first and second scaled values to obtain the linearized difference value; whereby the linearized difference value is linearized and common-mode errors have been rejected therefrom; and
      (iii) means operatively connected to receive the linearized difference value for rejecting temperature effects therefrom to provide the force value.

6. A load cell assembly comprising:
   (a) a load cell capable of being subjected to an applied force;
   (b) first and second transducers operatively mounted on the load cell, each transducer having a resonant frequency that varies with the applied force;
   (c) means for driving the first and second transducers at their resonant frequencies, respectively, for providing first and second frequency signals; and
   (d) means for providing a force value indicative of the applied force on the load cell comprising:
      (i) converting means operatively connected to receive the first and second frequency signals for converting the first and second frequency signals to first and second values, respectively;
      (ii) means operatively connected to receive the first and second values for linearizing and rejecting common-mode effects therefrom to provide a linearized difference value, wherein the means for linearizing and rejecting common-mode effects comprises:
         (1) means for providing a first frequency change value representative of the difference between the first value and a first dead load value, the first dead load value being representative of the resonant frequency of the first transducer when no force is applied to the load cell;
         (2) means for providing a second frequency change value representative of the difference between the second value and a second dead load value, the second dead load value being representative of the resonant frequency of the second transducer when no force is applied to the load cell;
         (3) means for generating an unscaled difference value representative of the difference between the first frequency change value and a scaled second frequency change value, the scaled second frequency change value being representative of the second frequency change value scaled by a first scaling factor; and
         (4) means for generating the linearized difference value which is representative of the unscaled difference value scaled by a second scaling factor; and (iii) means operatively connected to receive the linearized difference value for rejecting temperature effects therefrom to provide the force value.

7. The load cell assembly of claim 6, wherein $W_e$ is the linearized difference value, $f_T$ is the first value, $f_C$ is the second value, $f_{T0}$ is the first dead load frequency value, $f_{C0}$ is the second dead load frequency value, q is the first scaling factor, C is the second scaling factor, $a_0$, $a_1$, and $a_2$ are first linearization coefficients, and $b_0$, $b_1$, and $b_2$ are second linearization coefficients, and wherein:

(a) the linearized difference value is representative of the applied force on the load cell at a calibrating temperature;

(b) the first value is related to the linearized difference value by the equation:

$$f_T = a_0 + a_1 W_e + a_2 W_e^2;$$

(c) the second value is related to the linearized difference value by the equation:

$$f_C = b_0 + b_1 W_e + b_2 W_e^2;$$

(d) the first scaling factor is related to the first and second linearization coefficients by the equation:

$$q = \frac{a_2}{b_2};$$

(e) the second scaling factor is related to the first and second linearization coefficents and the first scaling factor by the equation:

$$C = \frac{1}{a_1 + q b_1};$$

(f) the first dead load frequency value $f_{T0}$ is equivalent to $a_0$, and the second dead load frequency value $f_{C0}$ is equivalent to $b_0$; and (f) the linearized difference value is related to the first and second values by the equation:

$$W_e = C[(f_T - f_{T0}) - q(f_C - f_{C0})].$$

8. The load cell assembly of claim 7, further comprising means for calibrating the assembly comprising:

(a) means for obtaining a plurality of first and second sample values from a plurality of known forces at the calibrating temperature, each first sample value being representative of the first value obtained when the load cell is subjected to one of the known forces, each second sample value being representative of the second value obtained when the load cell is subjected to one of the known forces;

(b) means for generating the first linearization coefficients from the plurality of first sample values and the plurality of known forces, comprising means for curve-fitting the plurality of first sample values to the plurality of known forces using the equation in step (b) of claim 7; and (c) means for generating the second linearization coefficients from the plurality of second sample values and the plurality of known forces, comprising means for curve-fitting the plurality of second sample values to the plurality of known forces using the equation in step (c) of claim 7.

9. A load cell assembly comprising:

(a) a load cell capable of being subjected to an applied force;

(b) first and second transducers operatively mounted on the load cell, each transducer having a resonant frequency that varies with the applied force;

(c) means for driving the first and second transducers at their resonant frequencies, respectively, for providing first and second frequency signals: and (d) means for providing a force value indicative of the applied force on the load cell comprising:

(i) converting means operatively connected to receive the first and second frequency signals for converting the first and second frequency signals to first and second values, respectively;

(ii) means operatively connected to receive the first and second values for linearizing and rejecting common-mode effects therefrom to provide a linearized difference value; and (iii) means operatively connected to receive the linearized difference value for rejecting temperature effects therefrom to provide the force value, wherein the means for rejecting temperature effects comprises means for correcting for zero shift error and means for correcting for span error.

10. The load cell assembly of claim 9, wherein the temperature rejecting means comprises:

(a) means for providing a temperature indicator representative of the error in the first and second values due to temperature effects;

(b) means for generating a zero shift error from the temperature indicator;

(c) means for generating a span error from the temperature indicator; and (d) means for generating the force value comprising means for subtracting the zero shift error from the linearized difference value to provide a shifted difference value, and means for scaling the shifted difference value by the span error.

11. The load cell assembly of claim 10, wherein $\theta$ is the temperature indicator, $W_e$ is the linearized difference value, $f_T$ is the first value, $f_C$ is the second value, $a_0$, $a_1$, and $a_2$ are first linearization coefficients, and $b_0$, $b_2$, and $b_2$ are second linearization coefficients, and wherein the temperature indicator is related to the first and second values and the linearized difference value by the equation:

$$\theta = f_T + f_C - (a_0 + a_1 W_e + a_2 W_e^2) - (b_0 + b_1 W_e + b_2 W_e^2).$$

12. The load cell assembly of claim 10, wherein $\theta$ is the temperature indicator, W is the force value, $W_0$ is the zero shift error, S is the span error, $z_1$ and $z_2$ are zero shift coefficients, and $s_1$ and $s_2$ are span error coefficients, and wherein:

(a) the zero shift error is related to the temperature indicator by the equation:

$$W_0 = z_1 \theta + z_2 \theta^2;$$

(b) the span error is related to the temperature indicator by the equation:

$$S = s_1 \theta + s_2 \theta^2;$$

and (c) the force value is related to the linearized difference value by the equation:

$$W = (W_e - W_0)(1 - S).$$

13. The load cell assembly of claim 12, further comprising means for calibrating the assembly for temperature comprising:
   (a) means for obtaining a plurality of dead load and full scale sample temperature indicators at a plurality of temperatures; each dead load sample temperature indicator being representative of the temperature indicator obtained when the load cell is subjected to dead load force at one of the plurality of temperatures, and each full scale sample temperature indicator being representative of the temperature indicator obtained when the load cell is subjected to substantially full scale force at one of the plurality of temperatures;
   (b) means for obtaining a plurality of sample zero shift and span errors at the plurality of temperatures; each sample zero shift error being representative of the zero shift error obtained when the load cell is subjected to dead load force at one of the plurality of temperatures, and each sample span error being representative of the span error obtained when the load cell is subjected to substantially full scale force at one of the plurality of temperatures;
   (c) means for generating the zero shift coefficients from the plurality of dead load sample temperature indicators and the plurality of sample zero shift errors, comprising means for curve-fitting the plurality of sample zero shift errors to the plurality of dead load sample temperature indicators using the equation in step (a) of claim 12; and
   (d) means for generating the span error coefficients from the plurality of full scale sample temperature indicators and the plurality of sample span errors, comprising means for curve-fitting the plurality of sample span errors to the plurality of full scale sample temperature indicators using the equation in step (b) of claim 12.

14. The load cell assembly of claim 9 further comprising means operatively connected to receive the force value for processing and displaying the force value.

15. The load cell assembly of claim 14, wherein the processing and displaying means comprises means for communicating with a counting scale control system in a counting scale, wherein commands and data may be exchanged between the assembly and the counting scale control system.

16. The load cell assembly of claim 9, wherein the load cell comprises:
   (a) a load cell body having an interior opening defined by an upper wall and a lower wall joined by first and second side walls;
   (b) a base positioned within the opening and affixed to at least one of the opening walls;
   (c) a first cantilever beam affixed to the base;
   (d) a second cantilever beam affixed to the base; and
   (e) wherein the first transducer is affixed between the first cantilever beam and the base and the second transducer is affixed between the second cantilever beam and the base.

17. The load cell assembly of claim 16 wherein the first and second transducers comprise quartz crystal double-ended tuning fork resonators.

18. The load cell assembly of claim 16 wherein the first and second cantilever beams are positioned parallel to each other within the plane of the load cell interior opening and parallel to the base.

19. The load cell assembly of claim 16 wherein the first and second transducers are connected to the driving means by electrical leads having a dampening coating.

20. The load cell assembly of claim 16, wherein the load cell further comprises a load beam spanning across the interior opening from the base to an opposing wall, and wherein the first and second transducers are affixed between the load beam and the first and second cantilevered beams, respectively.

21. A load cell controller for use in a load cell assembly having a load cell capable of being subjected to an applied force, the load cell having first and second transducers operatively mounted thereon, each transducer having a resonant frequency that varies with the applied force, the controller comprising:
   (a) means capable of driving first and second transducers at their resonant frequencies, respectively, for providing first and second frequency signals; and
   (b) means capable of providing a force value indicative of an applied force on a load cell comprising:
      (i) converting means operatively connected to receive the first and second frequency signals for converting the first and second frequency signals to first and second values, respectively;
      (ii) means operatively connected to receive the first and second values for linearizing and rejecting common-mode effects therefrom to provide a linearized difference value, wherein the means for linearizing and rejecting common-mode effects comprises:
         (1) means for scaling the first and second values to obtain first and second scaled values, respectively, such that changes in sensitivity of the first and second transducers are substantially similar; and
         (2) means for taking the difference of the first and second scaled values to obtain the linearized difference value; whereby the linearized difference value is linearized and common-mode errors have been rejected therefrom; and
      (iii) means operatively connected to receive the linearized difference value for rejecting temperature effects therefrom to provide the force value.

22. The load cell controller of claim 21 wherein the means for rejecting temperature effects comprises means for correcting for zero shift error and means for correcting for span error.

23. The load cell controller of claim 21, wherein the converting means comprises a time base frequency counter and first and second input capture latches operatively connected to receive an output of the counter, wherein the first and second latches have gate inputs operatively connected to receive gating signals from the first and second frequency signals, respectively; whereby the first and second values provided by the converting means are representative of one or more periods of the first and second frequency signals, respectively.

24. A method for providing a force value indicative of an applied force on a load cell of the type having first and second transducers operatively mounted thereon, each transducer having a resonant frequency that varies with the applied force, and means for driving the first and second transducers at their resonant frequencies and providing first and second frequency signals therefrom, respectively, the method comprising the steps of:

(a) converting the first and second frequency signals to first and second values, respectively, wherein the converting step comprises the steps of:
  (i) providing a time base frequency counter and first and second input capture latches operatively connected to receive an output of the counter, wherein the first and second latches have gate inputs operatively connected to receive gating signals from the first and second frequency signals, respectively; and
  (ii) generating the first and second values, wherein the first and second values are representative of one or more periods of the first and second frequency signals, respectively;
(b) rejecting common-mode and non-linearity effects from the first and second values and providing a linearized difference value therefrom; and
(c) rejecting temperature effects from the linearized difference value and providing the force value therefrom.

25. The method of claim 24, wherein the counter is free running, and wherein the step of generating the first and second values comprises the steps of:
(a) computing the first value from a difference between two values latched by the first latch; and
(b) computing the second value from a difference between two values latched by the second latch.

26. The method of claim 24, wherein the step of generating the first and second values comprises the steps of:
(a) computing the first value from an average of a plurality of values latched by the first latch; and
(b) computing the second value from an average of a plurality of values latched by the second latch.

27. The method of claim 24, wherein the step of providing a time base frequency counter and first and second input capture latches further comprises the step of generating the first and second gating signals from the first and second frequency signals, the first and second gating signals being representative of the first and second frequency signals divided by n, respectively; whereby the first and second values are representative of an average of n oscillations of the first and second frequency signals, respectively.

28. A method for providing a force value indicative of an applied force on a load cell of the type having first and second transducers operatively mounted thereon, each transducer having a resonant frequency that varies with the applied force, and means for driving the first and second transducers at their resonant frequencies and providing first and second frequency signals therefrom, respectively, the method comprising the steps of:
(a) converting the first and second frequency signals to first and second values, respectively;
(b) rejecting common-mode and non-linearity effects from the first and second values and providing a linearized difference value therefrom, wherein the step of rejecting common-mode and non-linearity effects comprises the steps of:
  (i) scaling the first and second values to obtain first and second scaled values, respectively, such that changes in sensitivity of the first and second transducers are substantially similar; and
  (ii) taking the difference of the first and second scaled values to obtain the linearized difference value; whereby the linearized difference value is linearized and common-mode errors have been rejected therefrom; and
(c) rejecting temperature effects from the linearized difference value and providing the force value therefrom.

29. A method for providing a force value indicative of an applied force on a load cell of the type having first and second transducers operatively mounted thereon, each transducer having a resonant frequency that varies with the applied force, and means for driving the first and second transducers at their resonant frequencies and providing first and second frequency signals therefrom, respectively, the method comprising the steps of:
(a) converting the first and second frequency signals to first and second values, respectively;
(b) rejecting common-mode and non-linearity effects from the first and second values and providing a linearized difference value therefrom, wherein the step of rejecting common-mode and non-linearity effects comprises the steps of:
  (i) providing a first frequency change value representative of the difference between the first value and a first dead load value, the first dead load value being representative of the resonant frequency of the first transducer when no force is applied to the load cell;
  (ii) providing a second frequency change value representative of the difference between the second value and a second dead load value, the second dead load value being representative of the resonant frequency of the second transducer when no force is applied to the load cell;
  (iii) generating an unscaled difference value representative of the difference between the first frequency change value and a scaled second frequency change value, the scaled second frequency change value being representative of the second frequency change value scaled by a first scaling factor; and
  (iv) generating the linearized difference value which is representative of the unscaled difference value scaled by a second scaling factor; and
(c) rejecting temperature effects from the linearized difference value and providing the force value therefrom.

30. The method of claim 29, wherein $W_e$ is the linearized difference value, $f_T$ is the first value, $f_C$ is the second value, $f_{T0}$ is the first dead load frequency value, $f_{C0}$ is the second dead load frequency value, q is the first scaling factor, C is the second scaling factor, $a_0$, $a_1$, and $a_2$ are first linearization coefficients, and $b_0$, $b_1$, and $b_2$ are second linearization coefficients, and wherein:
(a) the linearized difference value is representative of the applied force on the load cell at a calibrating temperature;
(b) the first value is related to the linearized difference value by the equation:

$$f_T = a_0 + a_1 W_e + a_2 W_e^2;$$

(c) the second value is related to the linearized difference value by the equation:

$$f_C = b_0 + b_1 W_e + b_2 W_e^2;$$

(d) the first scaling factor is related to the first and second linearization coefficients by the equation:

$$q = \frac{a_2}{b_2};$$

(e) the second scaling factor is related to the first and second linearization coefficents and the first scaling factor by the equation:

$$C = \frac{1}{a_1 + qb_1};$$

(f) the first dead load frequency value $f_{T0}$ is equivalent to $a_0$, and the second dead load frequency value $f_{C0}$ is equivalent to $b_0$; and (f) the linearized difference value is related to the first and second values by the equation:

$$W_e = C[(f_T - f_{T0}) - q(f_C - f_{C0})].$$

31. The method of claim 29, further comprising the step of calibrating the load cell comprising the steps of:
(a) obtaining a plurality of first and second sample values from a plurality of known forces at the calibrating temperature, each first sample value being representative of the first value obtained when the load cell is subjected to one of the known forces, each second sample value being representative of the second value obtained when the load cell is subjected to one of the known forces;
(b) generating the first linearization coefficients from the plurality of first sample values and the plurality of known forces by curve-fitting the plurality of first sample values to the plurality of known forces using the equation in step (b) of claim 31; and
(c) generating the second linearization coefficients from the plurality of second sample values and the plurality of known forces by curve-fitting the plurality of second sample values to the plurality of known forces using the equation in step (c) of claim 30.

32. A method for providing a force value indicative of an applied force on a load cell of the type having first and second transducers operatively mounted thereon, each transducer having a resonant frequency that varies with the applied force, and means for driving the first and second transducers at their resonant frequencies and providing first and second frequency signals therefrom, respectively, the method comprising the steps of:
(a) converting the first and second frequency signals to first and second values, respectively;
(b) rejecting common-mode and non-linearity effects from the first and second values and providing a linearized difference value therefrom; and
(c) rejecting temperature effects from the linearized difference value and providing the force value therefrom, wherein the step of rejecting temperature effects comprises the steps of:
(i) providing a temperature indicator representative of the error in the first and second values due to temperature effects;
(ii) generating a zero shift error from the temperature indicator;
(iii) generating a span error from the temperature indicator;
(iv) subtracting the zero shift error from the linearized difference value to provide a shifted difference value; and (v) scaling the shifted difference value by the span error to generate the force value.

33. The method of claim 32, wherein $\theta$ is the temperature indicator, $W_e$ is the linearized difference value, $f_T$ is the first value, $f_C$ is the second value, $a_0$, $a_1$, and $a_2$ are first linearization coefficients, and $b_0$, $b_1$, and $b_2$ are second linearization coefficients, and wherein the temperature indicator is related to the first and second values and the linearized difference value by the equation:

$$\theta = f_T + f_C - (a_0 + a_1 W_e + a_2 W_e^2) - (b_0 + b_1 W_e + b_2 W_e^2).$$

34. The method of claim 32, wherein $\theta$ is the temperature indicator, $W$ is the force value, $W_0$ is the zero shift error, $S$ is the span error, $z_1$ and $z_2$ are zero shift coefficients, and $s_1$ and $s_2$ are span error coefficients, and wherein:
(a) the zero shift error is related to the temperature indicator by the equation:

$$W_0 = z_1\theta + z_2\theta^2;$$

(b) the span error is related to the temperature indicator by the equation:

$$S = s_1\theta + s_2\theta^2;$$

and
(c) the force value is related to the linearized difference value by the equation:

$$W = (W_e - W_0)(1 - S).$$

35. The method of claim 34, further comprising the step of calibrating the load cell for temperature comprising the steps of:
(a) obtaining a plurality of dead load and full scale sample temperature indicators at a plurality of temperatures; each dead load sample temperature indicator being representative of the temperature indicator obtained when the load cell is subjected to dead load force at one of the plurality of temperatures, and each full scale sample temperature indicator being representative of the temperature indicator obtained when the load cell is subjected to substantially full scale force at one of the plurality of temperatures;
(b) obtaining a plurality of sample zero shift and span errors at the plurality of temperatures; each sample zero shift error being representative of the zero shift error obtained when the load cell is subjected to dead load force at one of the plurality of temperatures, and each sample span error being representative of the span error obtained when the load cell is subjected to substantially full scale force at one of the plurality of temperatures;
(c) generating the zero shift coefficients from the plurality of dead load sample temperature indicators and the plurality of sample zero shift errors by curve-fitting the plurality of sample zero shift errors to the plurality of dead load sample temperate indicators using the equation in step (a) of claim 34; and
(d) generating the span error coefficients from the plurality of full scale sample temperature indicators and the plurality of sample span errors by curve-fitting the plurality of sample span errors to the plurality of full scale sample temperature indicators using the equation in step (b) of claim 34.

* * * * *